United States Patent
Hosoya et al.

(10) Patent No.: US 7,467,238 B2
(45) Date of Patent: *Dec. 16, 2008

(54) DISK CONTROLLER AND STORAGE SYSTEM

(75) Inventors: Mutsumi Hosoya, Fujimi (JP); Naoki Watanabe, Hachioji (JP); Shuji Nakamura, Yokohama (JP); Yasuo Inoue, Odawara (JP); Kazuhisa Fujimoto, Kokubunji (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 445 days.

This patent is subject to a terminal disclaimer.

(21) Appl. No.: 11/249,174

(22) Filed: Oct. 11, 2005

(65) Prior Publication Data
US 2006/0085570 A1    Apr. 20, 2006

Related U.S. Application Data

(63) Continuation-in-part of application No. 10/826,471, filed on Apr. 16, 2004, now Pat. No. 7,231,469, and a continuation-in-part of application No. 10/820,964, filed on Apr. 7, 2004.

(30) Foreign Application Priority Data

Feb. 10, 2004    (JP)    ............................. 2004-032810
Feb. 16, 2004    (JP)    ............................. 2004-038459

(51) Int. Cl.
*G06F 13/28*    (2006.01)
(52) U.S. Cl. .......................................... 710/22; 710/23
(58) Field of Classification Search .................... 710/22
See application file for complete search history.

(56) References Cited

U.S. PATENT DOCUMENTS

| | | | |
|---|---|---|---|
| 5,140,592 A | 8/1992 | Idleman et al. | |
| 5,201,053 A | 4/1993 | Benhase et al. | |
| 5,206,943 A | 4/1993 | Callison et al. | |
| 5,249,279 A | 9/1993 | Schmenk et al. | |

(Continued)

FOREIGN PATENT DOCUMENTS

DE    10 2004 013112    6/2005

(Continued)

*Primary Examiner*—Niketa I Patel
*Assistant Examiner*—Zachary K Huson
(74) *Attorney, Agent, or Firm*—Mattingly, Stanger, Malur & Brundidge, PC.

(57) ABSTRACT

A disk controller has a channel adapter having a connection interface to a host computer or a disk drive; a memory adapter for temporarily storing data to be transferred between the host computer and disk drive; a processor adapter for controlling operations of the channel adapter and memory adapter; and a switch adapter for configuring an inner network by interconnecting the channel adapter, memory adapter and processor adapter, wherein the channel adapter, memory adapter, processor adapter and switch adapter each include a DMA controller for performing a communication protocol control of the inner network; and packet multiplex communication is performed among the DMA controllers provided in the adapters. The disk controller can realize a high transfer efficiency and a low cost while retaining a high reliability. A storage system includes an interface unit having an interface with a server or hard drives, a memory unit, a processor unit, and an interconnection.

9 Claims, 39 Drawing Sheets

U.S. PATENT DOCUMENTS

| | | |
|---|---|---|
| 5,257,391 A | 10/1993 | DuLac et al. |
| 5,511,227 A | 4/1996 | Jones |
| 5,548,788 A | 8/1996 | McGillis et al. |
| 5,574,950 A | 11/1996 | Hathorn et al. |
| 5,729,763 A | 3/1998 | Leshem |
| 5,740,465 A | 4/1998 | Matsunami et al. |
| 5,761,534 A | 6/1998 | Lundberg et al. |
| 5,949,982 A | 9/1999 | Frankeny et al. |
| 5,974,058 A | 10/1999 | Burns et al. |
| 6,108,750 A | 8/2000 | Yamamoto et al. |
| 6,148,349 A | 11/2000 | Chow et al. |
| 6,330,626 B1 | 12/2001 | Dennin et al. |
| 6,385,681 B1 | 5/2002 | Fujimoto et al. |
| 6,401,149 B1 | 6/2002 | Dennin et al. |
| 6,535,953 B1 | 3/2003 | Kakiuchi |
| 6,542,951 B1 | 4/2003 | Sangveraphunski et al. |
| 6,542,961 B1 | 4/2003 | Matsunami |
| 6,581,137 B1 | 6/2003 | Sandorfi |
| 6,601,134 B1 | 7/2003 | Yamagami et al. |
| 6,604,155 B1 | 8/2003 | Chong |
| 6,609,164 B1 | 8/2003 | Kallat |
| 6,611,879 B1 | 8/2003 | Dobecki |
| 6,631,433 B1 | 10/2003 | Paluzzi |
| 6,636,933 B1 | 10/2003 | MacLellan et al. |
| 6,651,130 B1 | 11/2003 | Thibault |
| 6,671,767 B2 | 12/2003 | Furuumi et al. |
| 6,684,268 B1 | 1/2004 | Paluzzi |
| 6,711,632 B1 | 3/2004 | Chow et al. |
| 6,779,071 B1 | 8/2004 | Kallat et al. |
| 6,792,506 B2 | 9/2004 | Solomon et al. |
| 6,813,689 B2 | 11/2004 | Baxter, III |
| 6,816,916 B1 | 11/2004 | Black et al. |
| 6,820,171 B1 | 11/2004 | Weber et al. |
| 6,834,326 B1 | 12/2004 | Wang et al. |
| 6,865,643 B2 | 3/2005 | Baxter, III |
| 6,868,479 B1 | 3/2005 | Thibault et al. |
| 6,877,059 B2 | 4/2005 | Solomon et al. |
| 6,889,301 B1 | 5/2005 | Wilson et al. |
| 6,901,468 B1 | 5/2005 | Paluzzi |
| 6,910,102 B2 | 6/2005 | Matsunami et al. |
| 6,961,788 B2 | 11/2005 | Kanai et al. |
| 6,970,972 B2 | 11/2005 | Hosoya |
| 6,985,994 B2 | 1/2006 | Kanai et al. |
| 2001/0054120 A1 | 12/2001 | Horikawa et al. |
| 2002/0087751 A1 | 7/2002 | Chong |
| 2002/0188786 A1 | 12/2002 | Barrow et al. |
| 2003/0046460 A1 | 3/2003 | Inoue et al. |
| 2003/0061297 A1 | 3/2003 | Fujimoto |
| 2003/0084237 A1 | 5/2003 | Yoshida et al. |
| 2003/0131192 A1 | 7/2003 | Nakamura et al. |
| 2003/0140192 A1 | 7/2003 | Thibault et al. |
| 2003/0182502 A1 | 9/2003 | Kleiman et al. |
| 2003/0182516 A1 | 9/2003 | Fujimoto |
| 2003/0188032 A1 | 10/2003 | Solomon et al. |
| 2003/0188098 A1 | 10/2003 | Baxter, III |
| 2003/0188099 A1 | 10/2003 | Baxter, III |
| 2003/0188100 A1 | 10/2003 | Solomon et al. |
| 2003/0191892 A1 | 10/2003 | Fujimoto et al. |
| 2003/0204649 A1 | 10/2003 | Kanai et al. |
| 2003/0229757 A1 | 12/2003 | Hosoya et al. |
| 2004/0024951 A1 | 2/2004 | Aruga |
| 2004/0098529 A1 | 5/2004 | Sangveraphunski et al. |
| 2004/0103244 A1 | 5/2004 | Fujimoto et al. |
| 2004/0111485 A1 | 6/2004 | Mimatsu et al. |
| 2004/0111560 A1 | 6/2004 | Takase et al. |
| 2004/0123028 A1 | 6/2004 | Kanai et al. |
| 2004/0139260 A1 | 7/2004 | Steinmetz et al. |
| 2004/0139365 A1 | 7/2004 | Hosoya |
| 2004/0177182 A1 | 9/2004 | Metevier et al. |
| 2004/0186931 A1 | 9/2004 | Maine |
| 2004/0193760 A1 | 9/2004 | Matsunami et al. |
| 2004/0193973 A1 | 9/2004 | Porat et al. |
| 2004/0199719 A1 | 10/2004 | Valin et al. |
| 2004/0205269 A1 | 10/2004 | Stolowitz |
| 2004/0243386 A1 | 12/2004 | Stolowitz et al. |
| 2004/0257857 A1 | 12/2004 | Yamamoto et al. |
| 2005/0010715 A1 | 1/2005 | Davies et al. |
| 2005/0021884 A1 | 1/2005 | Jeddeloh |
| 2005/0021888 A1 | 1/2005 | Yatziv et al. |
| 2005/0060443 A1 | 3/2005 | Rosner |
| 2005/0071424 A1 | 3/2005 | Baxter, III |
| 2005/0071556 A1 | 3/2005 | Walton et al. |
| 2005/0076177 A1 | 4/2005 | Mori |
| 2005/0080946 A1 | 4/2005 | Hosoya |

FOREIGN PATENT DOCUMENTS

| | | |
|---|---|---|
| EP | 1353264 A2 | 10/2003 |
| GB | 2063532 A | 6/1981 |
| GB | 2359709 | 8/2001 |
| GB | 2 366 049 | 2/2002 |
| JP | 05-242006 | 9/1993 |
| JP | 07-056693 | 3/1995 |
| JP | 07-200187 | 8/1995 |
| JP | 07-210320 | 8/1995 |
| JP | 09-198308 | 7/1997 |
| JP | 10-105347 | 4/1998 |
| JP | 2000-298641 | 10/2000 |
| JP | 2003-263279 | 9/2003 |
| WO | 88/03679 | 5/1988 |
| WO | WO88/03679 A | 5/1988 |
| WO | 91/13404 | 9/1991 |
| WO | WO93/01553 | 1/1993 |
| WO | 02/03387 | 1/2002 |
| WO | WO02/46888 | 6/2002 |
| WO | WO03/036493 A | 5/2003 |
| WO | WO03/043254 A | 5/2003 |
| WO | WO03/083638 A | 10/2003 |

DISK CONTROLLER OF INVENTION

DLE STRUCTURE USED BY INVENTION

DMAC STRUCTURE USED BY INVENTION

CHANNEL ADAPTER STRUCTURE USED BY INVENTION

PROCESSOR ADAPTER STRUCTURE USED BY INVENTION

MEMORY ADAPTER STRUCTURE USED BY INVENTION

SWITCH ADAPTER STRUCTURE USED BY INVENTION

PACKET STRUCTURE USED BY INVENTION

PACKET FLOW USED BY INVENTION

PROTOCOL USED BY INVENTION

MULTIPLEX COMMUNICATION TRANSFER PROTOCOL

DMA SEQUENCE FIELD UPDATE FLOW DURING
SUB-DMA TRANSMISSION

DMA SEQUENCE FIELD CONFIRMATION FLOW DURING
DMA SUB-STATUS RECEPTION

DISK CONTROLLER OF INVENTION

NETWORK CONFIGURATION OF CONVENTIONAL DISK CONTROLLER

PACKET STRUCTURE USED BY CONNECTION TYPE
COMMUNICATION SYSTEM

CONVENTIONAL PACKET FLOW

CONVENTIONAL PROTOCOL

NON-MULTIPLEX COMMUNICATION TRANSFER PROTOCOL

DISK CONTROLLER AND STORAGE SYSTEM

CROSS-REFERENCES TO RELATED APPLICATIONS

This application is continuation-in-part of both U.S. patent application Ser. No. 10/826,471, filed Apr. 16, 2004 and U.S. Ser. No. 10/820,964, filed Apr. 7, 2004. U.S. Ser. No. 10/826,471 claims priority from Japanese Patent Application No. JP2004-038459, filed Feb. 16, 2004. U.S. Ser. No. 10/820,964 claims priority from Japanese Patent Application No. JP2004-032810, filed Feb. 10, 2004. The entire disclosures of the above applications are incorporated herein by reference.

BACKGROUND OF THE INVENTION

The present invention relates to a disk controller for controlling a plurality of disk drives, and more particularly to a high reliability disk controller using connection-less type multiplex communication. The present invention further relates to a storage system which can expand the configuration scalably from small scale to large scale.

U.S. Pat. No. 6,601,134 and No. 2003046460 disclose a storage system. A disk sub-system (hereinafter simply called a "sub-system") using magnetic disk drives as storage media has an input/output performance lower by three to four digits than that of a main storage of a computer using semiconductor storages as storage media. A lot of effort has been put into reducing this difference, i.e., improving the input/output performance of the sub-system. One method of improving the input/output performance of the sub-system is to use a disk controller which controls a plurality of magnetic disk drives into which data is distributively stored.

For example, a conventionally known disk controller such as shown in FIG. 16 has a plurality of channel adapters 2100 which execute data transfer between a host computer and a disk drive; a plurality of cache memory adapters 2300 for temporarily storing data to be transferred between the host computer and disk drive; a plurality of control memory adapters 2301 for storing control information on the operation of the disk controller; and a plurality of switch adapters 2400 for establishing connections between the cache memory adapters and channel adapters. The channel adapters 2100 and cache memory adapters 2300 are interconnected by a data system inner network via the switch adapters 2400. The channel adapters 2100 and control memory adapters 2301 are interconnected by a control system inner network. With these network connections, all the channel adapters 2100 can access the cache memory adapters 2300 and control memory adapters 2301.

Each channel adapter 2100 has: data link engines (DLEs) 2110 for executing packet transfer in the data system internal network; DMA controllers (DMACs) 2120 for executing DMA transfer in the data system inner network; a selector 2115 for interconnecting DLEs 2110 and DMACs 2120; protocol engines (PE) 2130 for controlling communication between the host computer and disk drive; ports 2140 for connection to the host computer or disk drive; DLEs 2210 for executing packet transfer in the control system inner network; DMACs 2220 for DMA transfer in the control system inner network; micro-processors (MPs) 2230 for controlling the operation of the disk controller; and a selector 2125 for interconnecting DMACs 2120 and PEs 2130 or MPs 2230.

The cache memory adapter 2300 and control memory adapter 2301 each have: DLEs 2310 for executing DMA transfer in the data system internal network or control system internal network; DMACs 2320 for executing DMA transfer in each inner network; memory controllers (MCs) 2330; memory modules (MMs) 2340; a selector 2315 for interconnecting DLEs 2310 and DMACs 2320; and a selector 2325 for interconnecting DMACs 2320 and MCs 2330.

The switch adapter 2400 has: DLEs 2410 for executing packet transfer in the data system inner network; DMACs 2420 for executing DMA transfer in the data system inner network; and a selector 2430 for interconnecting DMACs 2420.

Data transfer between the adapters is realized by cooperative operations of DMACs in the respective adapters. As an example of this, with reference to FIGS. 18 and 19, description will be made on an outline operation of DMA transfer of data from the host computer to the cache memory adapter 2300 in the disk controller.

When a WRITE request is issued from the host computer via the connection port 2140, MP 2230 calculates an area of the cache memory adapter for temporarily storing WRITE data, and notifies the calculated result to DMAC 2120 in the channel adapter as a DMA list 2600. DMAC 2120 issues requests 2605 for acquiring paths to the cache memory adapters necessary for DMA transfer. Since the WRITE data is stored in a plurality of cache memory adapters (two cache memory adapters having DMAC 2321 and DMAC 2322) in order to improve the reliability, a plurality of path establishing requests are issued. After necessary paths are established, DMAC 2120 transfers the WRITE data to DMAC 2420 at the relay point switch, in accordance with the contents of the DMA list 2600. In this case, the WRITE data is transferred from the host computer by dividing it into a data amount having a predetermined size.

DMAC 2420 of the switch adapter 2400 generates DMA sub-requests 2611 and 2612 for DMACs 2321 and 2322 of the cache memory adapters, in accordance with the transfer requests sent from DMAC 2120 of the channel adapter 2100. In response to the requests 2611 and 2612, DMACs 2321 and 2322 return sub-statuses 2621 and 2622 which are the request completion notices. After DMAC 2120 of the channel adapter confirms the sub-statuses 2621 and 2622, it issues the next DMA sub-request. When the sub-statuses of all the DMA sub-requests are returned, DMAC 2120 issues release requests 2625 for the established paths to the cache memory adapters, and returns a completion status 2630 to MP 2230 to thereby complete the process for the DMA list 2600. During the DMA transfer, MP 2230 accesses the control memory adapter 2301 when necessary. In this case, similar DMA transfer is performed between DMAC 2220 of the channel adapter 2100 and DMAC 2320 of the control memory adapter 2301.

FIG. 17 shows the structure of a packet used by DMA transfer. A command packet 2520 has: an address field 2521 for indicating a targeting DMAC; an address field 2522 for indicating an initiating DMAC; memory address fields 2523 and 2524 for indicating memory addresses at which transfer data is stored; and an error check code 2525.

The path establishing request 2605 is issued by using the command packet 2520. A data packet 2530 has: an address field 2531 for indicating a targeting DMAC; an address field 2532 for indicating an initiating DMAC; transfer data 2533; and an error check code 2535. The DMA sub-request is issued by using the data packet 2530.

FIG. 20 illustrates a transfer protocol for the path request command 2605 and DMA sub-request 2610. In order to facilitate a failure recovery process, processes are all executed by non-multiplex communication. Namely, after it is confirmed that the sub-status 2620 for the DMA sub-request 2610 is returned, the next DMA sub-request 2610 is issued.

Storage systems for storing data to be processed by information processing systems are now playing a central role in information processing systems. There are many types of storage systems, from small scale configurations to large scale configurations.

For example, the storage system with the configuration shown in FIG. 40 is disclosed in U.S. Pat. No. 6,385,681. This storage system is comprised of a plurality of channel interface (hereafter "IF") units 5011 for executing data transfer with a computer (hereafter "server") 5003, a plurality of disk IF units 5016 for executing data transfer with hard drives 5002, a cache memory unit 5014 for temporarily storing data to be stored in the hard drives 5002, a control information memory unit 5015 for storing control information on the storage system (e.g., information on the data transfer control in the storage system 5008, and data management information to be stored on the hard drives 5002), and hard drives 5002. The channel IF unit 5011, disk IF unit 5016 and cache memory unit 5014 are connected by the interconnection 5041, and the channel IF unit 5011, disk IF unit 5016 and control information memory unit 5015 are connected by the interconnection 5042. The interconnection 5041 and the interconnection 42 are comprised of common buses and switches.

According to the storage system disclosed in U.S. Pat. No. 6,385,681, in the above configuration of one storage system 5008, the cache memory unit 5014 and the control memory unit 5015 can be accessed from all the channel IF units 5011 and disk IF units 5016.

In the prior art disclosed in U.S. Pat. No. 6,542,961, a plurality of disk array system 4 are connected to a plurality of servers 5003 via the disk array switches 5005, as FIG. 41 shows, and the plurality of disk array systems 5004 are managed as one storage system 5009 by the means for system configuration management 5060, which is connected to the disk array switches 5005 and each disk array system 5004.

BRIEF SUMMARY OF THE INVENTION

With regard to the disk controller as described above, DMA transfer in a conventional disk controller described in the above-cited Patent documents is performed by connection type non-multiplex communication because of easy implementation. Namely, DMAC establishes the paths necessary for the execution of DMA transfer, and during DMA transfer the paths are occupied (connection type communication). Moreover, until the sub-status for the DMA sub-transfer immediately before is confirmed, the next DMA sub-request cannot be executed (non-multiplex communication).

A conventional disk controller has therefore a low use efficiency of the inner network paths, which may hinder the performance improvement. In order to satisfy the conditions that the necessary path bandwidth is reserved at the limited path use efficiency, a complicated inner network configuration is required such as implementation of both the data system inner network and control system inner network, resulting in a high cost.

A feature of the present invention is to provide a disk controller using connection-less type multiplex communication, capable of addressing issues of the prior art, realizing a high transfer efficiency (performance) while retaining a high reliability equivalent to that of a conventional disk controller, and realizing a low cost.

In accordance with an aspect of the present invention, a disk controller includes: a channel adapter having a connection interface to a host computer or a disk drive; a memory adapter for temporarily storing data to be transferred between the host computer and disk drive; a processor adapter for controlling operations of the channel adapter and memory adapter; and a switch adapter for configuring an inner network by interconnecting the channel adapter, memory adapter and processor adapter, wherein: the channel adapter, memory adapter, processor adapter and switch adapter each include a DMA controller for performing a communication protocol control of the inner network; and packet multiplex communication is performed among the DMA controllers provided in the adapters.

According to the invention, by adopting connection-less type multiplex communication, multiplex becomes possible not only during one DMA sub-transfer (as will be later described, transfer state of the sub-DMA and sub-status shown in FIG. 11) but also during a plurality of sub-DMA transfers (alternative transfer state of sub-DMA 615 and sub-DMA 616 shown in FIG. 11). The path use efficiency can be improved considerably and it is not necessary to separately provide a control system inner network and a data system inner network as in the case of a conventional disk controller. Accordingly, the cache memory adapter and control memory adapter are integrated to a memory adapter. Since the path use efficiency is improved, the path use limitation is relaxed so that the processor in the channel adapter can be used in the processor adapter which is independent from the channel adapter. A disk controller can be realized which has a high performance and a low cost and is excellent in scalability.

With regard to the storage system as described above, companies now tend to suppress initial investments for information processing systems while expanding information processing systems as the business scale expands. Therefore the scalability of cost and performance for expanding the scale with a reasonable investment as the business scale expands, while maintaining a small initial investment is demanded for storage systems. Here the scalability of cost and performance of prior art will be examined.

The performance required for a storage system (number of times of input/output of data per unit time and data transfer volume per unit time) is increasing each year. So in order to support performance improvements in the future, the data transfer processing performance of the channel IF unit 5011 and the disk IF unit 5016 of the storage system disclosed in U.S. Pat. No. 6,385,681 must also be improved.

In the technology of U.S. Pat. No. 6,385,681 however, all the channel IF units 5011 and all the disk IF units 5016 control data transfer between the channel IF unit 5011 and the disk IF unit 5016 via the cache memory unit 5014 and the control information memory unit 5015. Therefore if the data transfer processing performance of the channel IF unit 5011 and the disk IF unit 5016 improves, the access load to the cache memory unit 5014 and the control information memory unit increases. This results in an access load bottleneck, which makes it difficult to improve performance of the storage system 5008 in the future. In other words, the scalability of performance cannot be guaranteed.

In the case of the technology of U.S. Pat. No. 6,542,961, on the other hand, the number of connectable disk array system 5004 and servers 5003 can be increased by increasing the number of ports of the disk-array-switch 5005 or by connecting a plurality of disk-array-switches 5005 in multiple stages. In other words, the scalability of performance can be guaranteed.

However, in the technology of U.S. Pat. No. 6,542,961, the server 5003 accesses the disk array system 5004 via the disk-array-switches 5005. Therefore in the interface unit with the server 5003 of the disk-array-switch 5005, the protocol between the server and the disk-array-switch is transformed to a protocol in the disk-array-switch, and in the interface unit with the disk array system 4 of the disk-array-switch 5005, the protocol in the disk-array-switch is transformed to a protocol between the disk-array-switch and the disk array system, that is, a double protocol transformation process is generated. Therefore the response performance is poor compared with the case of accessing the disk array system directly, without going through the disk-array-switch.

If cost is not considered, it is possible to improve the access performance in U.S. Pat. No. 6,385,681 by increasing the scale of the cache memory unit 5014 and the control information memory unit. However, in order to access the cache memory unit 5014 or the control information memory unit 5015 from all the channel IF units 5011 and the disk IF units 5016, it is necessary to manage the cache memory unit 5014 and the control information memory unit 5015 as one shared memory space respectively. Because of this, if the scale of the cache memory unit 5014 and the control information memory unit 5015 is increased, decreasing the cost of the storage system in a small scale configuration is difficult, and providing a storage system with a small scale configuration at low cost becomes difficult.

To solve the above problems, one aspect of the present invention is comprised of the following configuration. Specifically, the present invention is a storage system comprising an interface unit that has a connection unit with a computer or a hard disk drive, a memory unit for storing data to be transmitted/received with the computer or hard disk drive and control information, a processor unit that has a microprocessor for controlling data transfer between the computer and the hard disk drive, and a disk unit, wherein the interface unit, memory unit and processor unit are mutually connected by an interconnection.

In the storage system according to the present invention, the processor unit instructs data transfer concerning reading data or writing data requested from the computer by the processor unit exchanging control information between the interface unit and the memory unit.

A part or all of the interconnection may be separated into an interconnection for transferring data or an interconnection for transferring control information. The interconnection may be further comprised of a plurality of switch units.

Another aspect of the present invention is comprised of the following configuration. Specifically, the present invention is a storage system wherein a plurality of clusters are connected via a communication network. In this case, each cluster further comprises an interface unit that has a connection unit with a computer or a hard disk drive, a memory unit for storing data to be read/written from/to the computer or the hard disk drive and the control information of the system, a processor unit that has a microprocessor for controlling read/write of the data between the computer and the hard disk drive, and a disk unit. The interface unit, memory unit and processor unit in each cluster are connected to the respective units in another cluster via the communication network.

The interface unit, memory unit and processor unit in each cluster may be connected in the cluster by at least one switch unit, and the switch unit of each cluster may be interconnected by a connection path. Each cluster may be interconnected by interconnecting the switch units of each cluster via another switch.

As another aspect, the interface unit in the above mentioned aspect may further comprise a processor for protocol processing. In this case, protocol processing may be performed by the interface unit, and data transfer in the storage system may be controlled by the processor unit.

DETAILED DESCRIPTION OF THE INVENTION

Disk Controller

Embodiments of a disk controller of this invention will be described in detail with reference to FIGS. 1 to 15.

Figure 1:
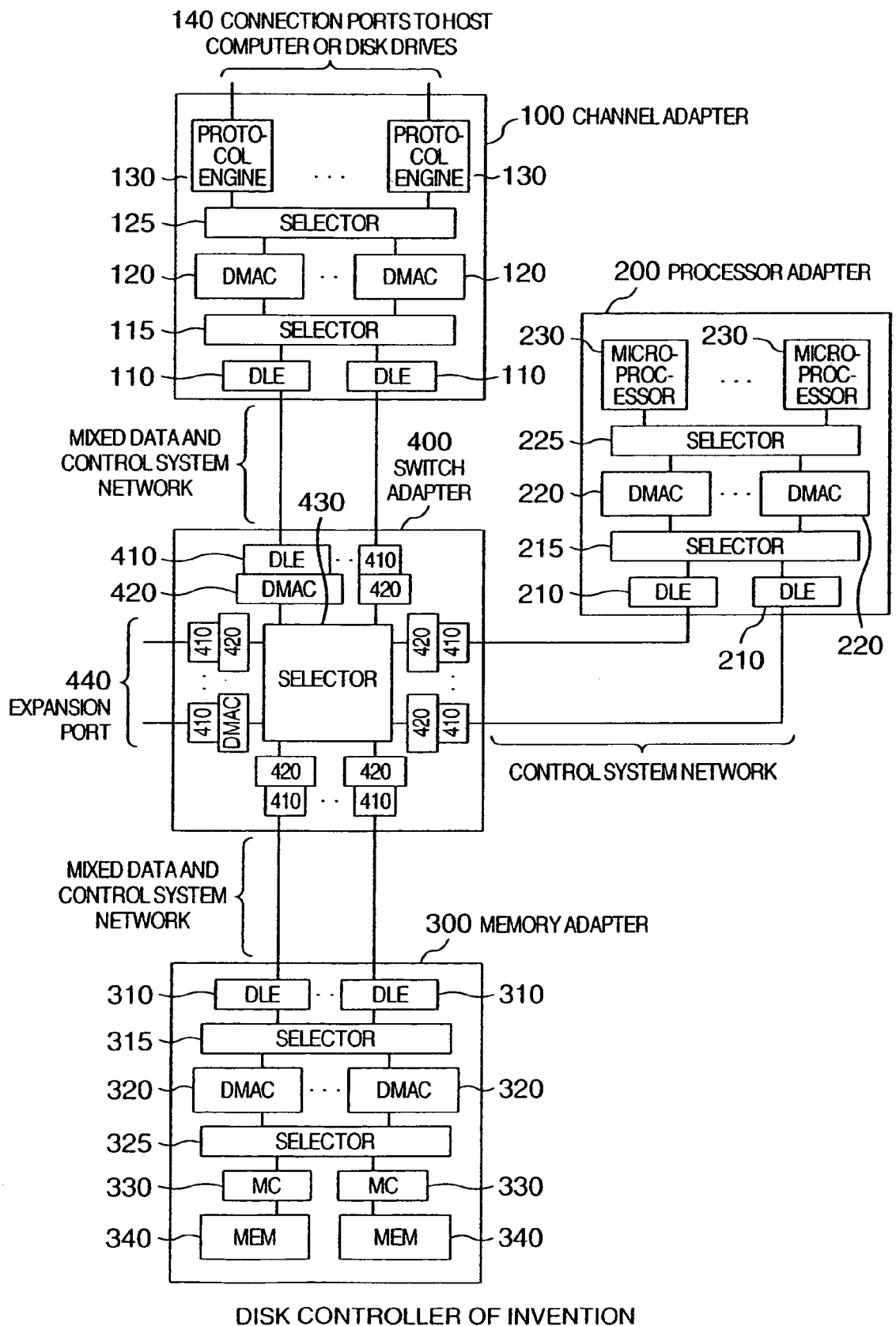
FIG. 1 is a diagram showing the overall structure of a disk controller according to an embodiment of the invention.

FIG. 1 is a diagram showing the overall structure of a disk controller according to an embodiment of the invention. The disk controller of this embodiment has: a channel adapter 100 having an interface 140 for connection to a host computer or a disk drive; a memory adapter 300 for temporarily storing data to be transferred between the host computer and disk drive; a processor adapter 200 for controlling the operations of the channel adapter 100 and a memory adapter 300; and a switch adapter 400 constituting an inner network by interconnecting the channel adapter 100, memory adapter 300 and processor adapter 200.

The channel adapter 100, processor adapter 200, memory adapter 300 and switch adapter 400 have DMA controllers (DMACs) 120, 220, 320 and 420, respectively, the DMA controllers performing a communication protocol control of the inner network. Switch adapters can be connected each other by their expansion ports 440. DMACs execute DMA transfer with involvement data link engines (DLEs) 110, 210, 310 and 410, respectively. Connection-less type packet multiplex communication shown in FIG. 11 is performed among these DMA controllers.

Figure 11:
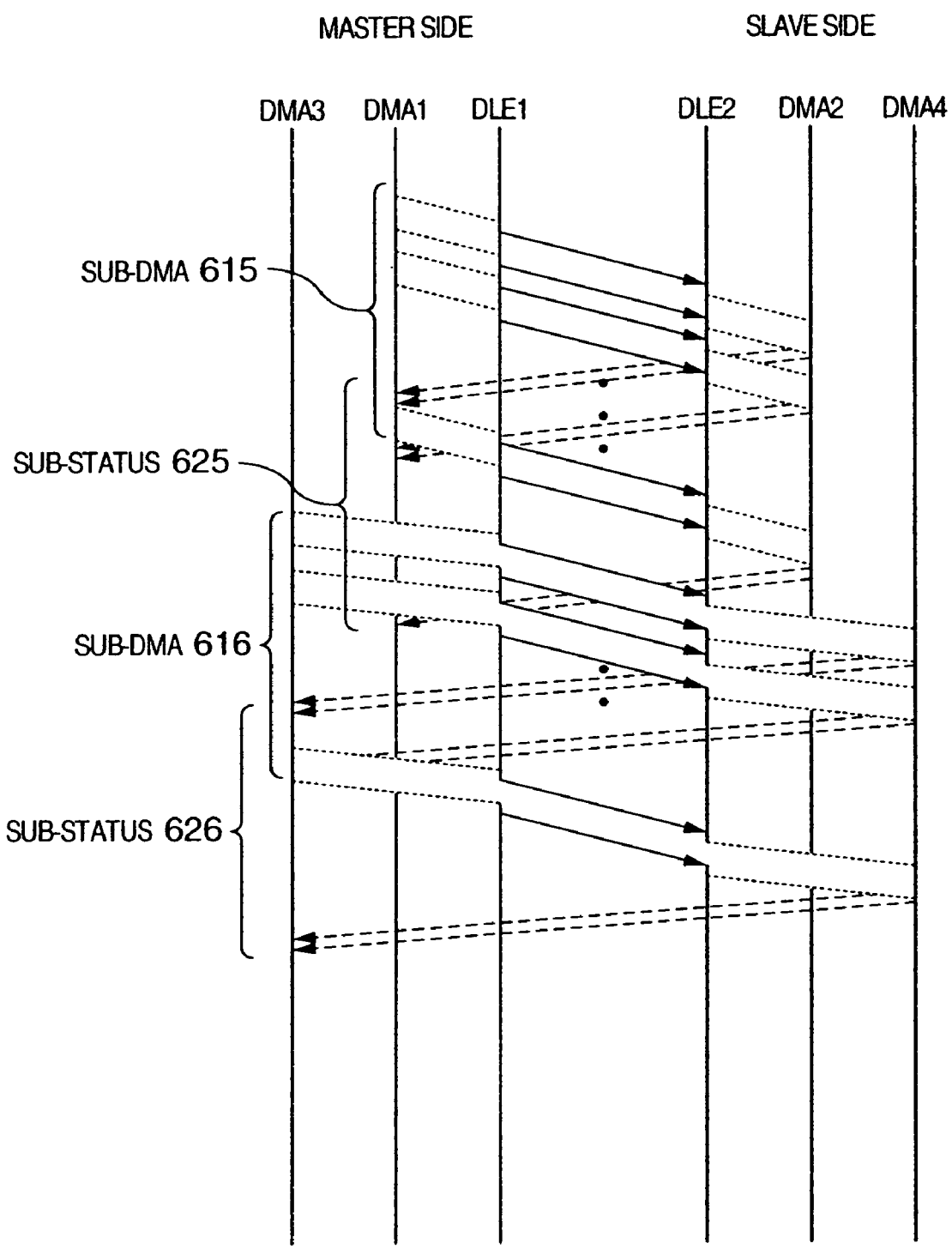
FIG. 11 is a diagram illustrating a multiplex communication transfer protocol used by the disk controller according to the embodiment.

FIG. 11 is a diagram illustrating a multiplex communication transfer protocol used by the disk controller according to the embodiment of the invention. As shown in FIG. 11, without confirming a sub-status for a DMA sub-request, the next DMA sub-request is issued (multiplex communication, i.e., multiplex communication during one DMA sub-transfer). In addition, DMA transfer between DMA1 and DMA2 and DMA transfer between DMA3 and DMA4 share the same path between DLE1 and DLE2 (connection-less type communication). In the example shown in FIG. 11, a sub-DMA 615 and a sub-DMA 616 are alternately transferred by sharing the same path between DEL1 and DLE2 to perform multiplex communication. As will be understood from the description of FIG. 8 to be later given, the connection-less type multiplex communication becomes possible by adopting the packet structure that contains information (TASK ID) for the sequence control of a destination, data and a DMA sub-request.

In the example shown in FIGS. 1 and 11, adopting the connection-less type multiplex communication allows multiplex not only during one DMA sub-transfer but also during a plurality of DMA sub-transfers. Therefore, the path use efficiency can be improved greatly (because data transfer can be performed without a time interval between paths). It is quite unnecessary to separately implement the control system inner network and data system internal network as made conventionally. It is therefore possible to use the memory adapter integrating the cache memory adapter and control memory adapter, and moreover to use the processor adapter independent from the channel adapter because the path use limit is relaxed. A disk controller of a low cost and excellent in scalability and flexibility can therefore be achieved.

Figure 2:
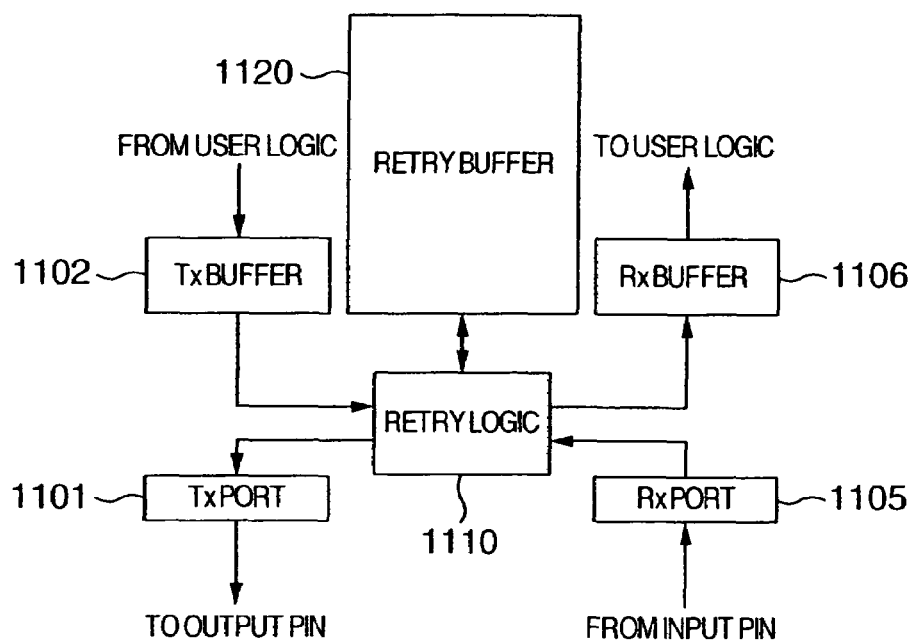
FIG. 2 is a diagram showing an example of the specific structure of a data link engine used by each adapter of the disk controller according to the embodiment.
Figure 5:
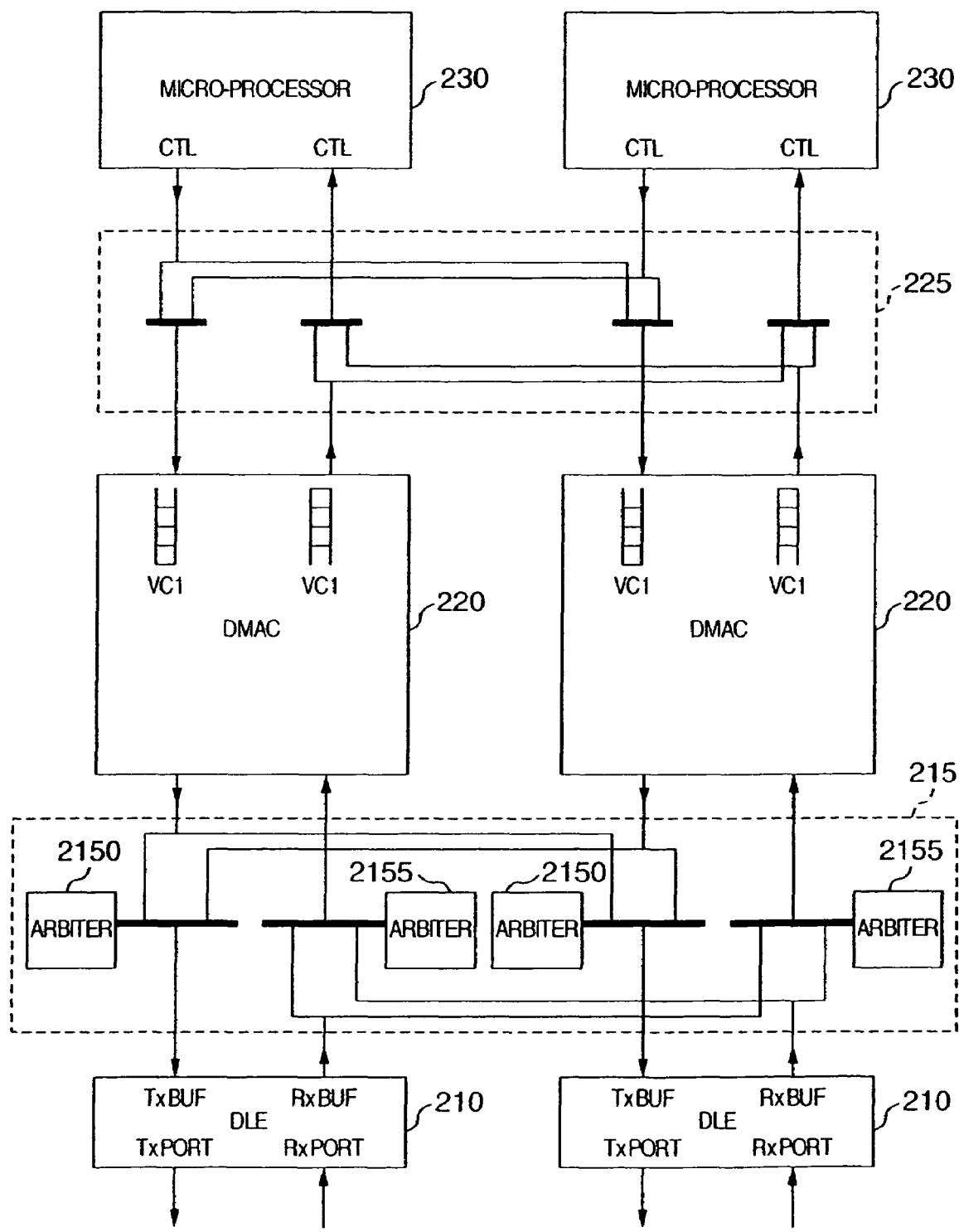
FIG. 5 is a diagram showing the structure of a processor adapter of the disk controller according to the embodiment.

FIG. 5 is a diagram showing an example of the specific structure of a processor adapter of the disk controller according to the embodiment of the invention, and FIG. 2 is a diagram showing the specific structure of a data link engine used by the processor adapter. The structure of the data link engine (DLE) shown in FIG. 2 can be applied not only to the processor adapter but also to other adapters.

The processor adapter 200 shown in FIG. 5 has: microprocessors (MPs) 230; a plurality of DMA controllers 220 and one or more data link engines (DLEs) 210. A selector 225 interconnects MPs 230 and DMACs 220, and a plurality of DMA controllers 220 share DLEs 210 via the selector 215. Namely, the number of DMACs is usually much larger than the number of DLEs.

Since a DMA arbiter 2150 of the selector 215 arbitrates requests from a plurality of DMA controllers 220, DMA transfer from a plurality of DMACs via the same DLE 210 can be executed at the same time (connection-less communication). Reception data from DLE 210 is distributed by a DLE arbiter 2155 to a target DMAC 220.

As shown in FIG. 2, DLE has a transmission port 1101, a transmission buffer 1102, a reception port 1105, a reception buffer 1106, a retry logic 1110 and a retry buffer 1120. The retry buffer and retry logic perform a process of realizing error free transfer at the data link. Namely, a packet sent from the transmission buffer to the transmission port is stored in the retry buffer 1120 by the retry logic 1110. A status representative of whether the packet reached correctly is returned to the reception port, and if an error is reported, the packet is again sent from the retry buffer by the retry logic. The DLE structure shown in FIG. 2 allows a data link error control in the packet unit and realizes multiplex communication.

With the example of the structure shown in FIGS. 5 and 2, connection-less type multiplex communication becomes possible and a disk controller can be realized which has a high performance and is flexible and simple and of a low cost.

Figure 3:
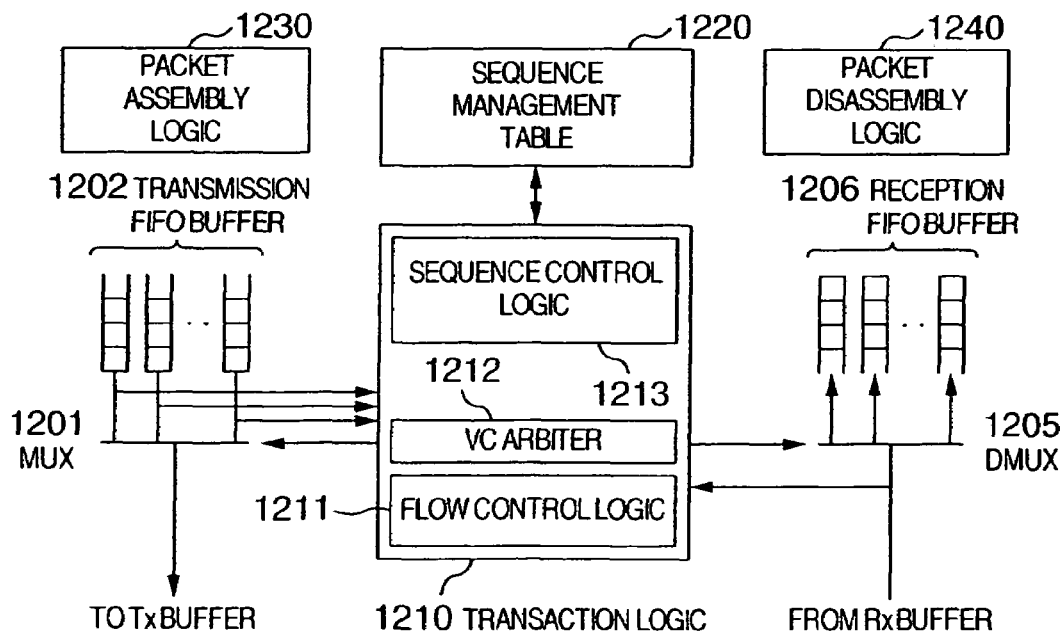
FIG. 3 is a diagram showing an example of the specific structure of a DMA controller used by each adapter of the disk controller according to the embodiment.
Figure 4:
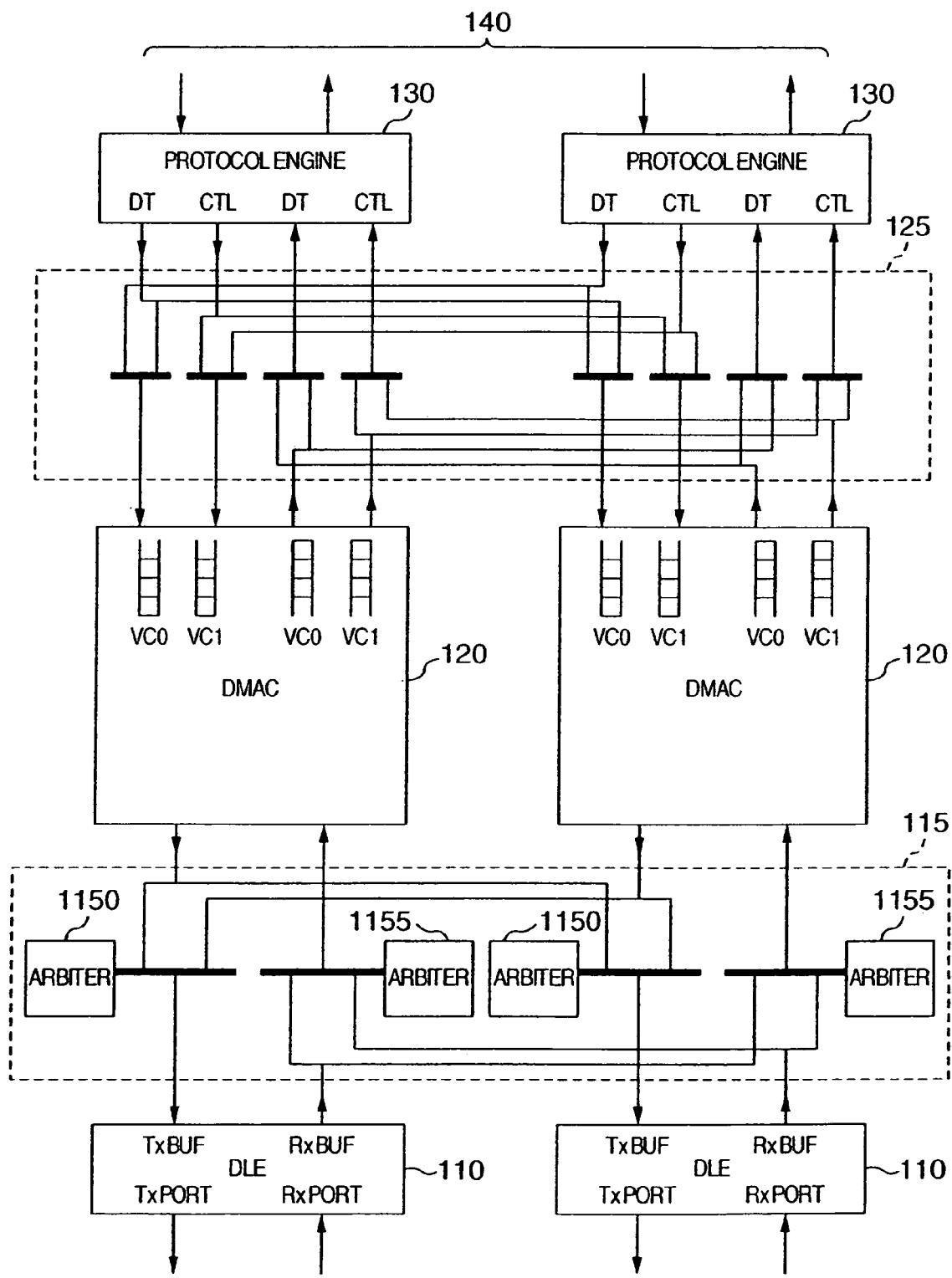
FIG. 4 is a diagram showing the structure of a channel adapter of the disk controller according to the embodiment.

FIG. 4 is a diagram showing an example of the specific structure of the channel adapter of the disk controller according to the embodiment of the invention, and FIG. 3 is a diagram showing an example of the specific structure of the DMA controller used by the channel adapter. The structure of the DMA controller (DMAC) shown in FIG. 3 is applicable not only to the channel adapter but also to other adapters.

The channel adapter shown in FIG. 4 has protocol engines 130, DMACs 120 and DLEs 110. PE 130 and DMAC 120 are connected by a selector 125, and DMAC 120 and DLE 110 are connected by a selector 115. Each DMA controller 120 has a plurality of reception FIFO buffers VC0 and VC1 and a plurality of transmission FIFO buffers VC0 and VC1.

The DMA controller 120 shown in FIG. 3 is constituted of a multiplexer 1201, transmission FIFO buffers 1202, a demultiplexer 1205, reception FIFO buffers 1206, a transaction logic 1210, a sequence management table 1220, a packet assembly logic 1230 and a packet disassembly logic 1240. An arbiter 1212 arbitrates contention of transmission data among a plurality of transmission FIFO buffers 1202 and the multiplexer 1201 selects the transmission data.

Similarly, the demultiplexer 1205 selects reception data under the control by the arbiter 1212 and stores it in a proper FIFO buffer among a plurality of reception FIFO buffers 1206. The packet assembly logic 1230 and packet disassembly logic 1240 are logic circuits for assembling and disassembling the packet. The sequence control logic 1213 and sequence management table 1220 manage the DMA sequence of DMA sub-transfers, the description of this operation being later given.

With the example shown in FIGS. 4 and 3, a plurality of buffers VC0 and VC1 can be used for each DLE. For example, one DLE can use a mixture of the control system inner network and data system inner network (for example, VC0 is used for the data system inner network, and VC1 is used for the control system network). The arbiter 1212 can operate to set a priority order to a plurality of buffers. For example, if the control system inner network is set to have a priority over the data system inner network, it is possible to avoid a longer access delay time of the control system inner network otherwise caused by a mixture of both the networks. Namely, with this arrangement, it is possible to realize a disk controller of a simpler inner network configuration and both the performance improvement and low cost.

Figure 6:
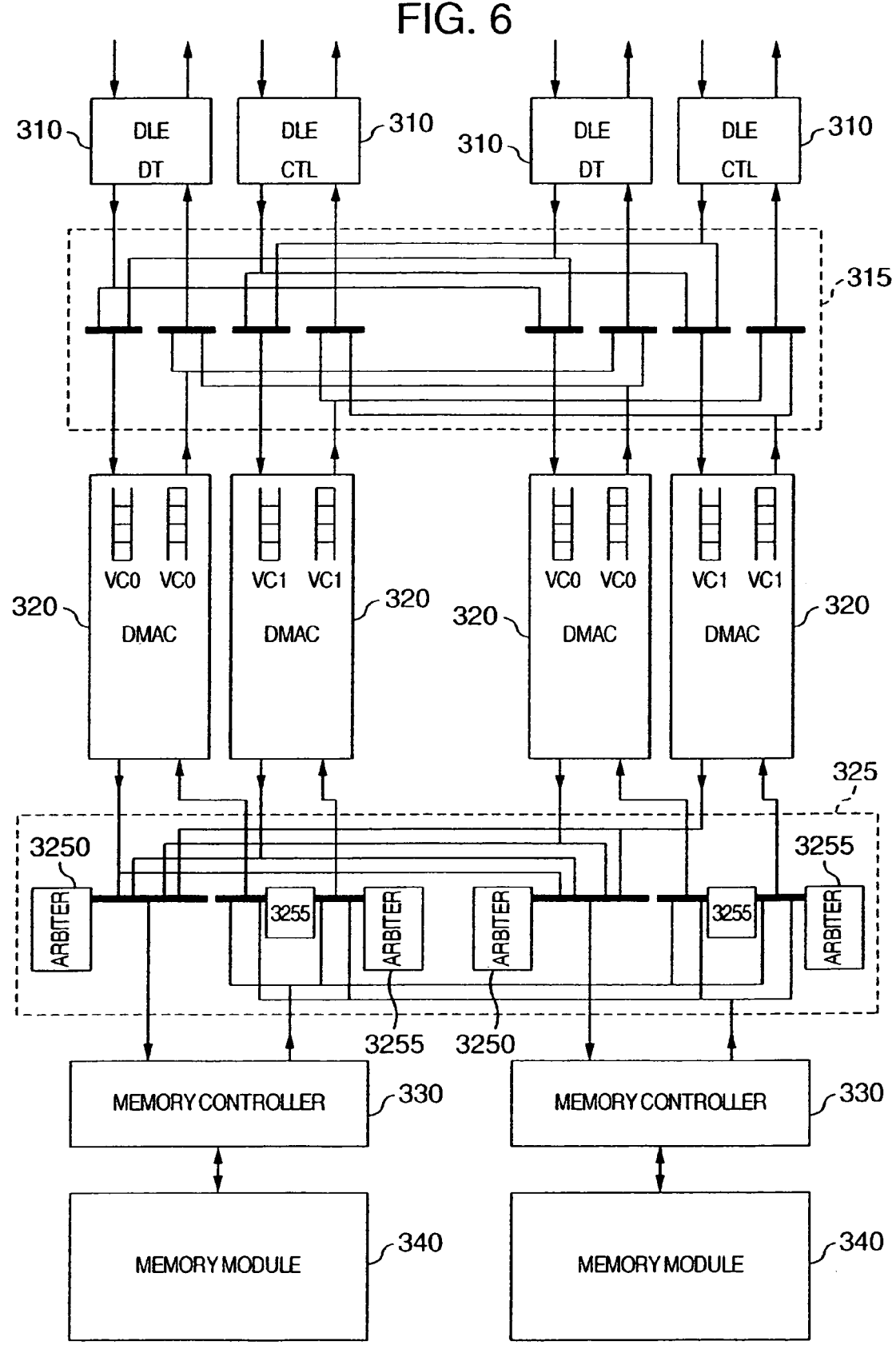
FIG. 6 is a diagram showing the structure of a memory adapter of the disk controller according to the embodiment.

FIG. 6 is a diagram showing an example of the specific structure of the memory adapter of the disk controller according to the embodiment of the invention. The memory adapter shown in FIG. 6 has memory modules (MMs) 340, memory controllers (MCs) 330, DMACs 320 and DLEs 310. MC 330 and DMAC 320 are interconnected by a selector 325, and DMAC 320 and DLE 310 are interconnected by a selector 315. Each DMA controller (DMAC) 320 has a reception buffer (VC0 or VC1) and a transmission buffer (VC0 or VC1). Contention of transmission data is arbitrated among a plurality of transmission FIFO buffers VC0 and among a plurality of transmission FIFO buffers VC1 to transfer data to DLE 310. Similarly, contention of reception data is arbitrated among a plurality of reception FIFO buffers VC0 and among a plurality of reception FIFO buffers VC1 to store data in a proper reception FIFO.

Arbiters 3250 and 3255 arbitrate the contention conditions between DMAC 320 and MC 330. One MC can therefore be shared by a plurality of DMACs, and the priority order control among DMACs can be realized as the function of the arbiters. For example, if DMACs for the control system inner network and DMACs for the data system inner network are provided and the DMACs for the control system inner network are set to have a priority over the data system inner network, then accesses to the control system inner network can be suppressed from being influenced by interference of the operation of the data system inner network.

With the structure shown in FIG. 6, a plurality of DMACs can be used in correspondence with one DLE. For example, one DLE has a mixture of the control system inner network and data system inner network. A plurality of DMACs can be used in correspondence with one MC allowing a mixture of the control system memory and data system memory. With this structure therefore, it becomes possible to realize a disk controller of a simpler inner network structure, satisfying both the performance improvement and low cost.

Figure 8:
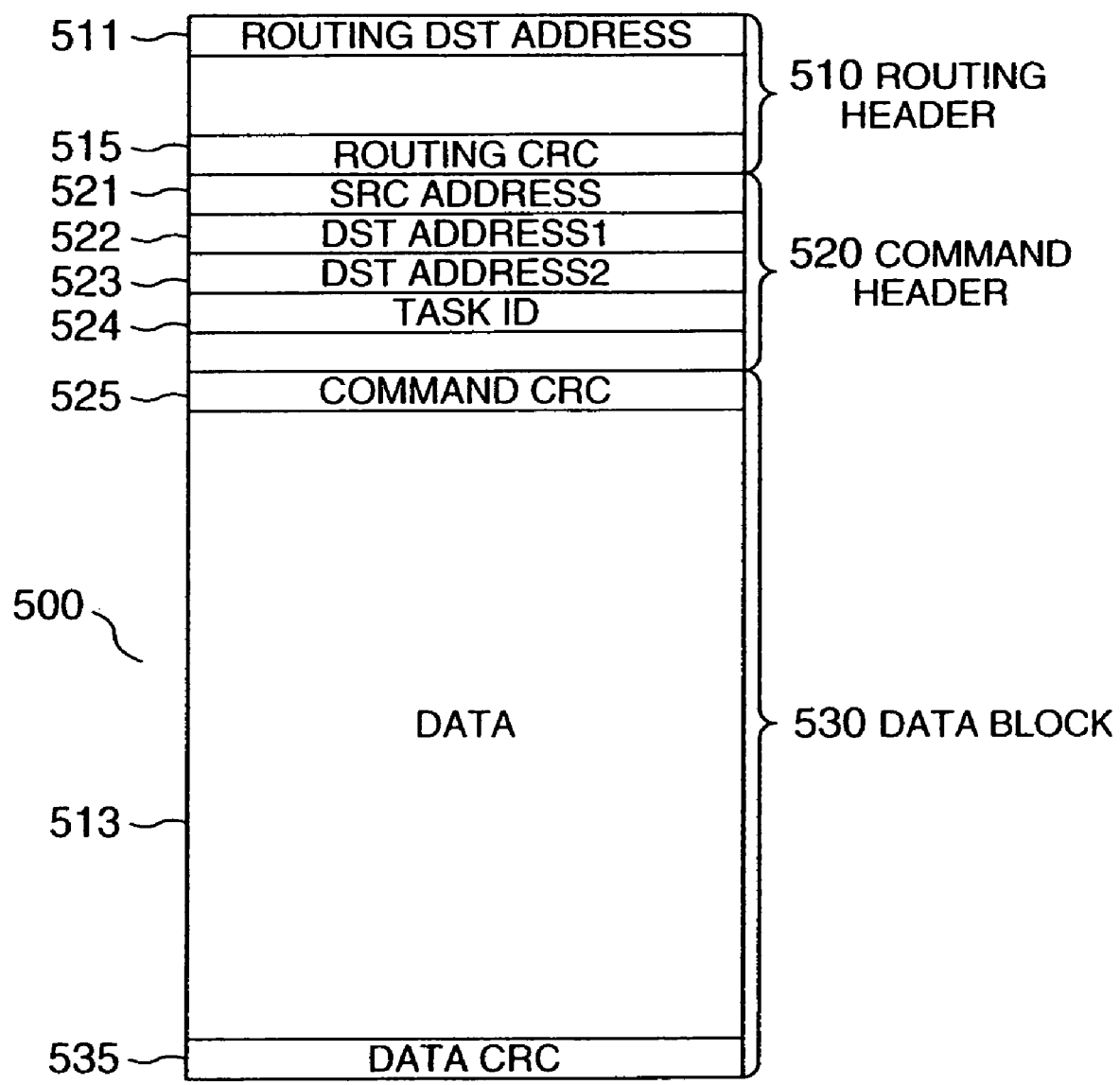
FIG. 8 is a diagram showing the structure of a packet used by the disk controller according to the embodiment.

FIG. 8 is a diagram showing an example of the specific structure of the packet to be transferred among a plurality of DMA controllers in the disk controller according to the embodiment of the invention. The packet 500 shown in FIG. 8 has at least an address field 511 for indicating a targeting DMA controller, an address field 521 for indicating an initiating DMA controller and a DMA sequence field 524 for managing the transfer sequence when one DMA transfer is divided into a plurality of packets.

In the disk controller according to the embodiment of the invention, since DMA transfer is performed by connection-less type multiplex communication, it is necessary to guarantee the transfer sequence of DMA and properly perform an error check process and a failure recovery process. As a means for this, the DMA sequential field is provided so as to reliably identify the packet, and this field is controlled (preferably sequentially incremented) so as to make it unique (distinguishable) in one DMA transfer.

With the example of the packet structure shown in FIG. 8, a proper sequence guarantee and its check are possible in the DMA transfer by connection-less type multiplex communication, and a proper failure recovery process can be performed when a failure occurs. With this structure, it becomes possible to realize a disk controller having a high reliability equivalent to the reliability of a conventional disk controller.

The packet 500 shown in FIG. 8 has a first address 511 for designating a packet relay DMA controller, second and third addresses 522 and 523 for designating targeting DMA controllers and transfer data 531 to be transferred to the targeting DMA controllers. When a WRITE request is issued from the channel adapter 100 to the memory adapter 300, the first address designates DMAC 420 of the switch adapter and the second and third addresses designate DMACs 320 of the memory adapter. A plurality of addresses of the memory adapters are designated in order to improve the reliability perform duplicate WRITE for the cache memories.

With this packet structure, the DMA transfer function including duplicate WRITE can be applied to connection-less multiplex communication so that the disk controller of a high reliability can be realized.

The packet 500 shown in FIG. 8 also has a routing header 510 containing control information for DLE, a command header 520 containing control information for the DMA controller, and a data block 530 containing other data. The routing header 510 has a routing header error check code 515 for checking any transfer error in the routing header. The command header 520 has a command header error check code 525 for checking any transfer error in the command header. The data block 530 has a data block error check code 535 for checking any transfer error in the data block.

With this packet structure, the routing control information, DMAC control information and data information can be protected by different error check codes, resulting in a finer DMA transfer control and a finer failure recovery process. Even if the routing control information is required to be rewritten such as when duplicate WRITE is performed via the switching adapter, it is possible to minimize the recalculation range of the error check code and realize the disk controller of a high reliability and a high performance.

Figure 9:
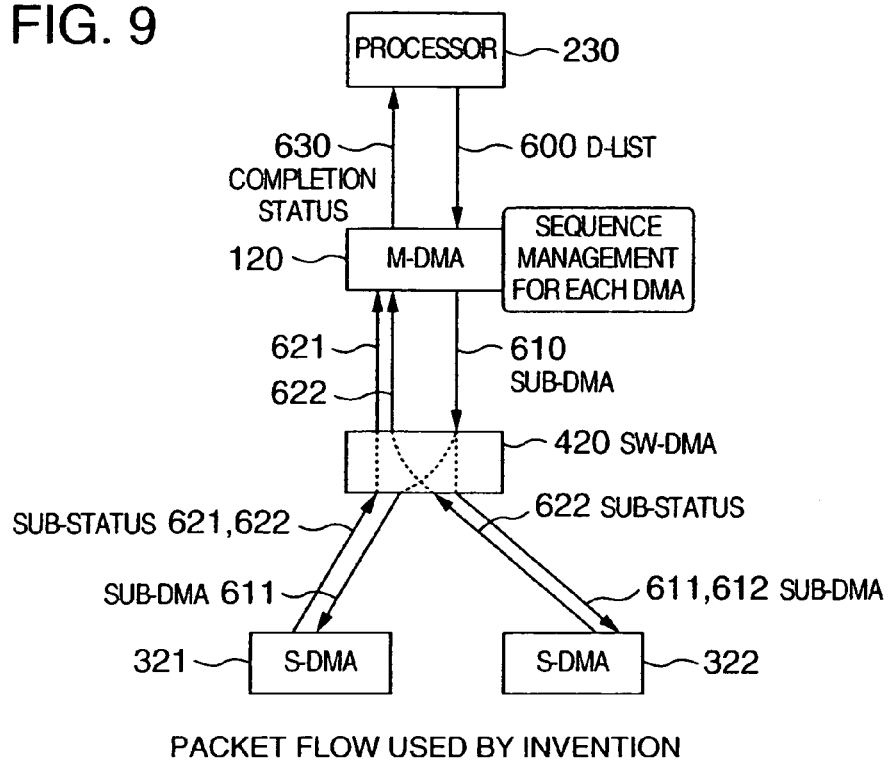
FIG. 9 is a diagram illustrating a packet flow used by the disk controller according to the embodiment.
Figure 10:
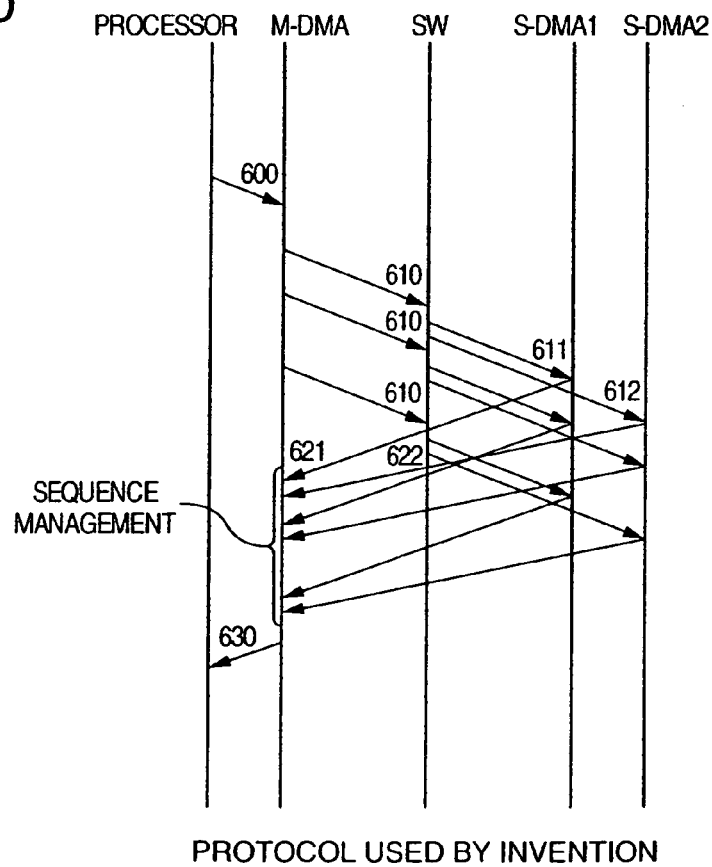
FIG. 10 is a diagram illustrating a protocol used by the disk controller according to the embodiment.

FIG. 9 is a diagram showing the flow of a packet used by the disk controller according to the embodiment of the invention, and FIG. 10 is a diagram illustrating a protocol used by the disk controller according to the embodiment of the invention.

In the example shown in FIGS. 9 and 10, a DMA sub-request 610 is issued from DMAC 120 of the channel adapter to DMAC 420 of the switch adapter. In the packet of the DMA sub-request 610, the initiating address field 521 designates the channel adapter DMAC 120 as the master DMA and the targeting address field 511 designates the switch adapter DMAC 420.

The DMA controller 420 sends back completion sub-statuses 621 and 622 corresponding to the DMA transfer sub-request 610 to the DMA controller 120. The completion sub-statuses 621 and 622 contain the information of the DMA sequence field 524 contained in the DMA transfer sub-request 610. The DMA controller 120 confirms the information in this DMA sequence field in order to confirm the transfer sequence of DMA sub-transfers.

Figure 12:
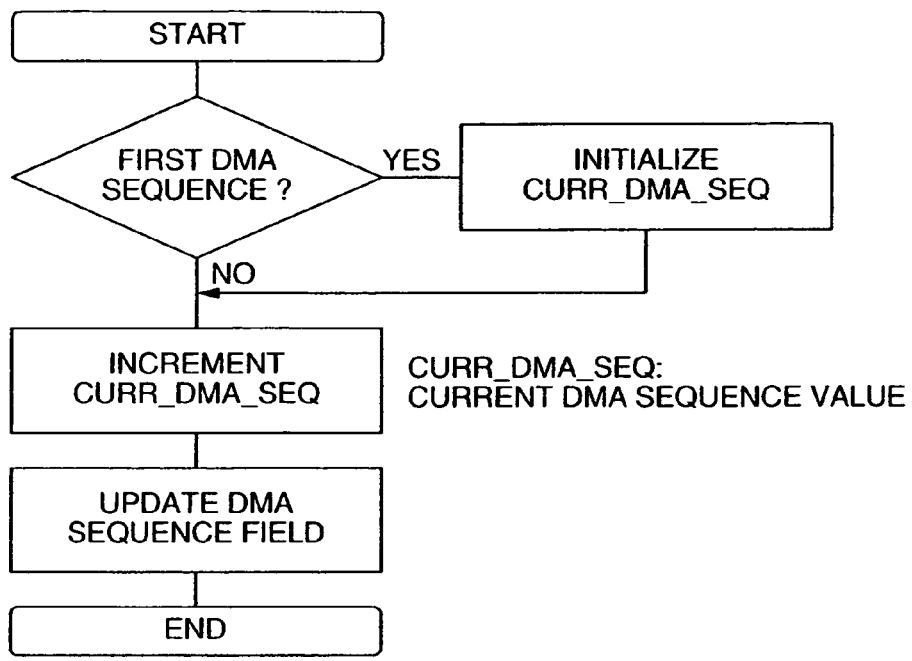
FIG. 12 is a diagram illustrating a DMA sequence field update flow during DMA sub-transmission used by the disk controller according to the embodiment.
Figure 13:
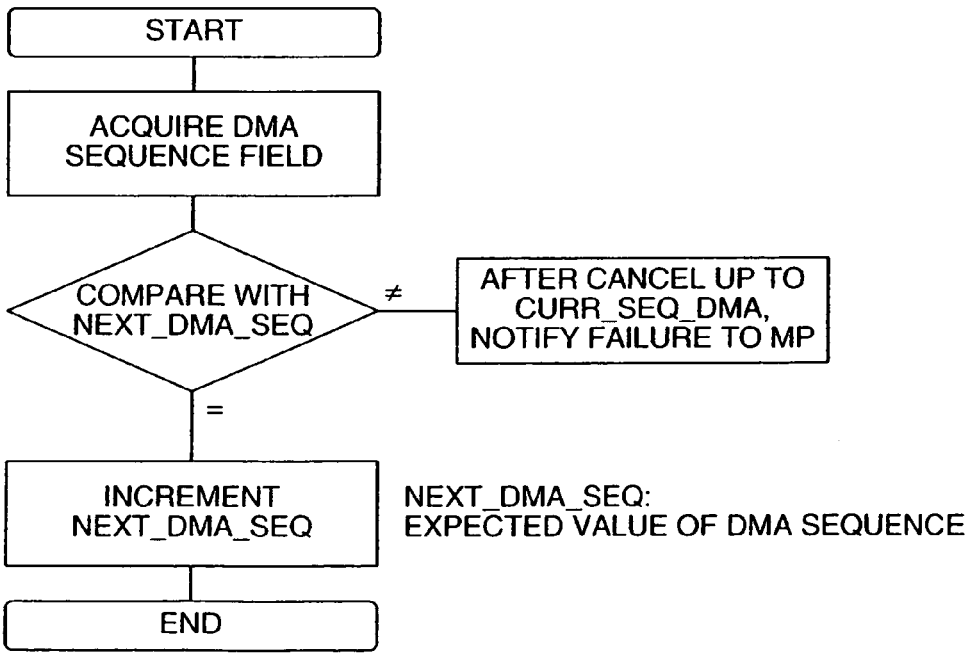
FIG. 13 is a diagram illustrating a DMA sequence field confirmation flow during sub-status reception used by the disk controller according to the embodiment.

FIG. 12 is a diagram illustrating a DMA sequence field update flow during DMA sub-transmission used by the disk controller according to the embodiment of the invention, and FIG. 13 is a diagram illustrating a DMA sequence field confirmation flow during sub-status reception used by the disk controller according to the embodiment of the invention. Each DMAC holds the value of a current DMA sequence field in a variable CURR_DMA_SEQ. During the DMA sub-transmission, while CURR_DMA_SEQ is incremented, it is inserted into the DMA sequence field 524 of each transfer packet. Each DMAC holds the value of the DMA sub-status to be returned next, in a variable NEXT_DMA_SEQ. When the DMA sub-status is returned, the value of the DMA sequence is compared with an expected value. If both are coincide with each other, the coincident NEXT_DMA_SEQ is incremented. If both are not coincide, the DMA transfer sub-requests under execution (from NEXT_DMA_SEQ to CURR_DMA_SEQ) are cancelled and thereafter a failure is notified to the processor.

In the example of the structure shown in FIGS. 9 and 10 and FIGS. 12 and 13, also for the DMA sub-transfer, the transfer sequence of each DMA can be reliably controlled by using the DMA sequence field 524. Namely, with this structure, a disk controller of a high reliability can be realized using connection-less multiplex communication.

FIGS. 9 and 10 also illustrate a packet flow (protocol) of duplicate WRITE used by the disk controller according to the embodiment of the invention. In this example of the structure, DMA sub-requests 611 and 612 are issued from the channel adapter DMAC 120 to the memory adapter DMACs 321 and 322 via the switch adapter DMAC 420. In the packet of the DMA sub-request 610, the initiating address field 521 designates the channel adapter DMAC 120, the targeting address field 511 designates the switch adapter DMAC 420, the targeting field 511 designates the memory adapter DMACs 321 and 322, and the data block (field) 531 stores the transfer data.

The DMA controller 420 of the switch adapter generates a DMA sub-request packet 611 and a DMA sub-request packet 612 and transfers the packets to the respective targeting addresses. The former packet 611 has DMAC 321 as the targeting address field and contains the transfer data 531, and the latter packet 612 has DMAC 322 as the targeting address field and contains the transfer data 531. In response to the DMA sub-requests 611 and 612, the DMACs 321 and 322 of the memory adapter return sub-statuses 621 and 622 to the channel adapter DMAC 120 via the switch adapter DMAC 420.

The example of the structure shown in FIGS. 9 and 10 can realize cache memory duplicate WRITE by the switch adapter DMAC. Since DMAC 420 of the switch adapter 400 near the memory adapter 300 generates the packets for duplicate WRITE, the bandwidth of the inner network will not be consumed wastefully and the path efficiency can be improved. With the example of this structure, a disk controller of a high performance and a high reliability can be realized.

Figure 7:
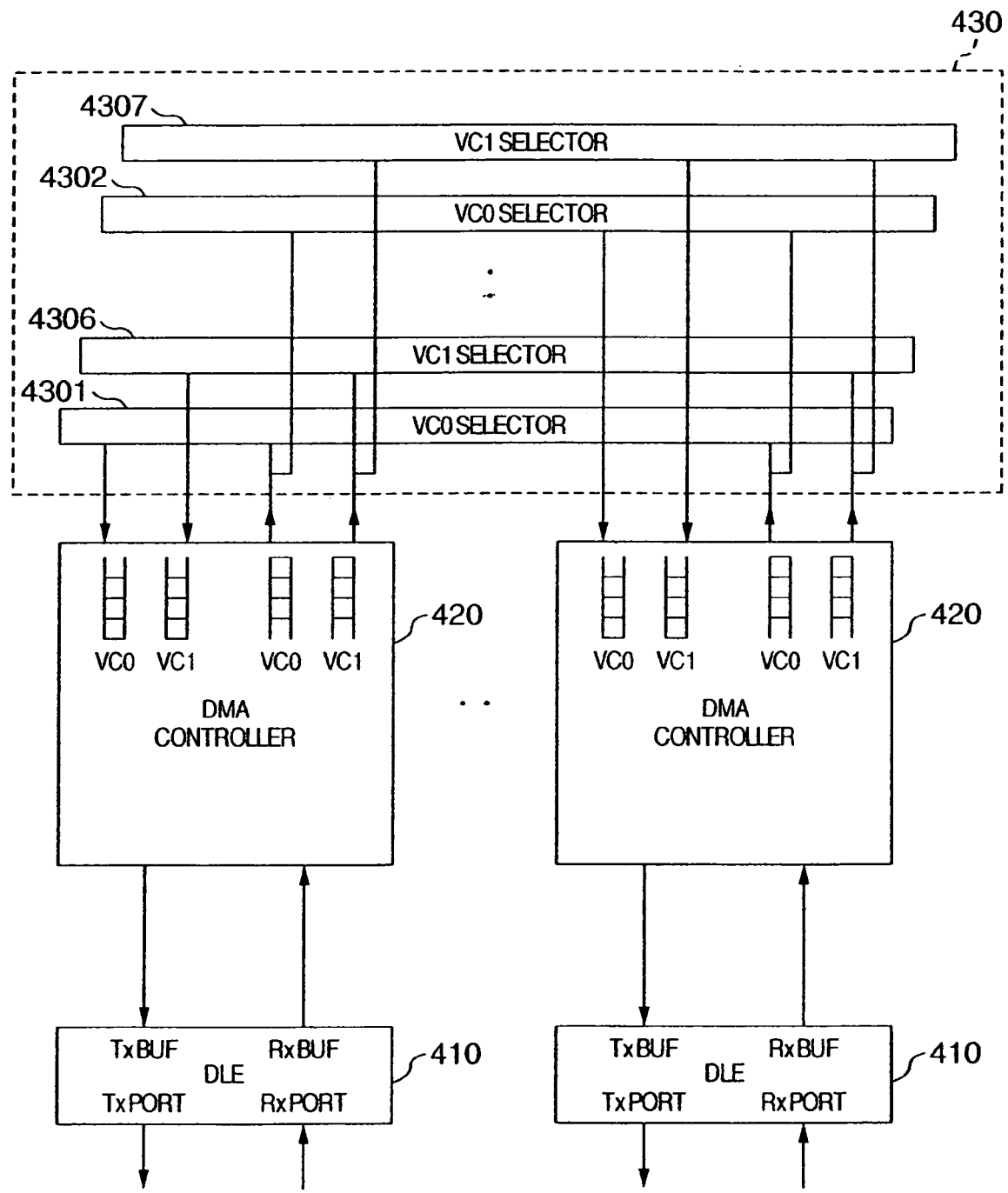
FIG. 7 is a diagram showing the structure of a switch adapter of the disk controller according to the embodiment.

FIG. 7 is a diagram showing an example of the specific structure of the switch adapter of the disk controller according to the embodiment of the invention. The switch adapter shown in FIG. 7 has a plurality of DLEs 410, a plurality of DMACs 420 and a selector 430. A packet received from a reception side DLE 410 is stored distributively in a plurality of reception FIFO buffers (VC0, VC1) in a reception side DMAC 420, and thereafter, sent to transmission FIFO buffers in a transmission DMAC 420 via selector logic circuits 4301, 4302, 4306 and 4307 prepared for the respective transmission FIFO buffers, and transmitted from a transmission side DLE 410.

With the example of the structure shown in FIG. 7, similar to the packet having the routing control information, DMAC control information and data information shown in FIG. 8, a packet to be transferred among a plurality of DMA controllers has a header including targeting DMAC information and a data field including other data. The header includes a header error check code for checking any transfer error in the header. The data field includes a data field error check code for checking any transfer error in the data field.

Until the header error check code is confirmed, the reception side DMA controller 420 in the switch adapter will not send the packet to the transmission side DMAC. After the header error check code is confirmed, the header and data field of the packet are sent to the transmission side DMAC in a pipeline processing manner. If an error is found by the header error check code, the packet is discarded and a proper error recovery process is executed.

With the example of the structure shown in FIG. 7, the switch adapter can start a transmission process from the transmission DLE before the whole data field is fetched from the reception DLE and the data field error check code is confirmed, and the packet having an illegal targeting address field because of an error in the header is discarded to prevent the propagation of the error. With the example of the structure, a disk controller of a high performance and a high reliability can be realized.

The adapter used by the disk controller according to the embodiment of the invention, such as the channel adapter shown in FIG. 4 and the processor adapter shown in FIG. 5, has the structure that a plurality of DMACs share a plurality of DLEs. In the case of the channel adapter shown in FIG. 4, two DLEs and sixteen DMACs are provided and there may be the case wherein each DMAC shares a few DLEs. With this redundancy structure, for example, during DMA communication by DMAC via some DLE, even if a failure occurs at this DLE, the DMAC arbiter 1150 (refer to FIG. 4) or 2150 (refer to FIG. 5) performs a routing control to connect another DLE. Similarly, the DMAC arbiter 1150 or 2150 performs a routing control for a plurality of DMAC processes to distribute the processes to a plurality of DLEs and realize load distribution.

With the example of the structure, the arbiter 1150 or 2150 controls to make the same DLE deal with transmission/reception for a series of DMA sub-requests and sub-statuses from the same DMAC. More preferably, a transmission/reception in the normal operation is fixed for the requests and statuses from the same DMAC.

With the example of the structure shown in FIGS. 4 and 5, the inner network route is fixed for a series of DMA sub-requests and sub-statuses. Therefore, there is no possibility of a sequence exchange (outrun) due to different routes. The sequence control of DMA sub-requests and sub-statuses can be facilitated greatly. Namely, with the example of the structure, a disk controller of a high reliability can be realized easily.

Figure 14:
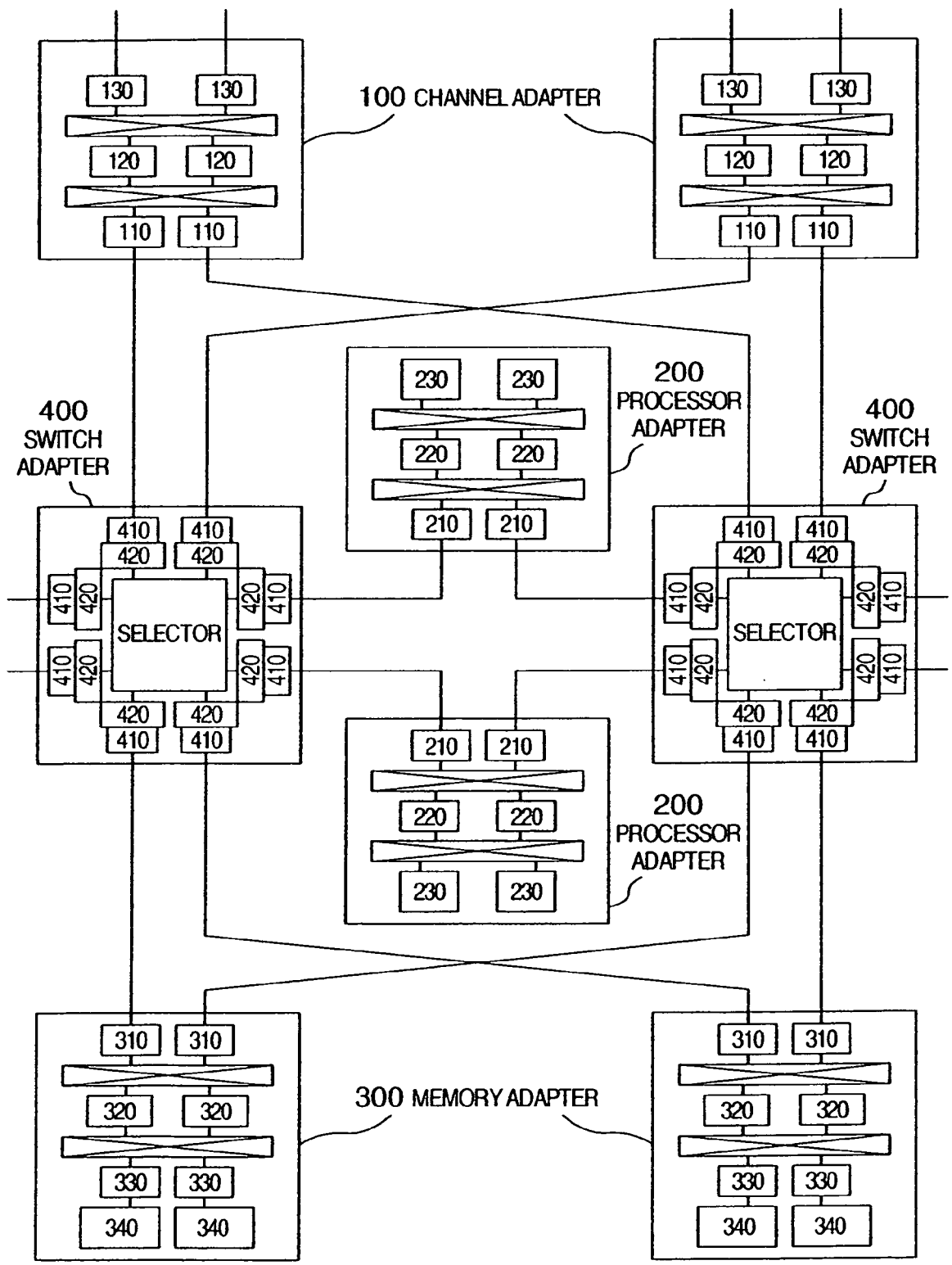
FIG. 14 is a diagram showing the overall structure of a disk controller according to another embodiment of the invention.

FIG. 14 is a diagram showing the overall structure of a disk controller according to another embodiment of the invention. In this embodiment of the invention shown in FIG. 14, a plurality of channel adapters 100, a plurality of processor adapters 200 and a plurality of memory adapters 300 are interconnected by a plurality of switch adapters 400. By providing a plurality of paths among all the adapters, it becomes possible to realize redundancy capable of recovering an arbitrary one-point failure. The connection of each adapter is as shown in FIG. 14. Each adapter has the paths for corresponding two adapters.

According to this embodiment of the invention, the reliability can be improved by enhancing the redundancy of the disc controller system.

Figure 15:
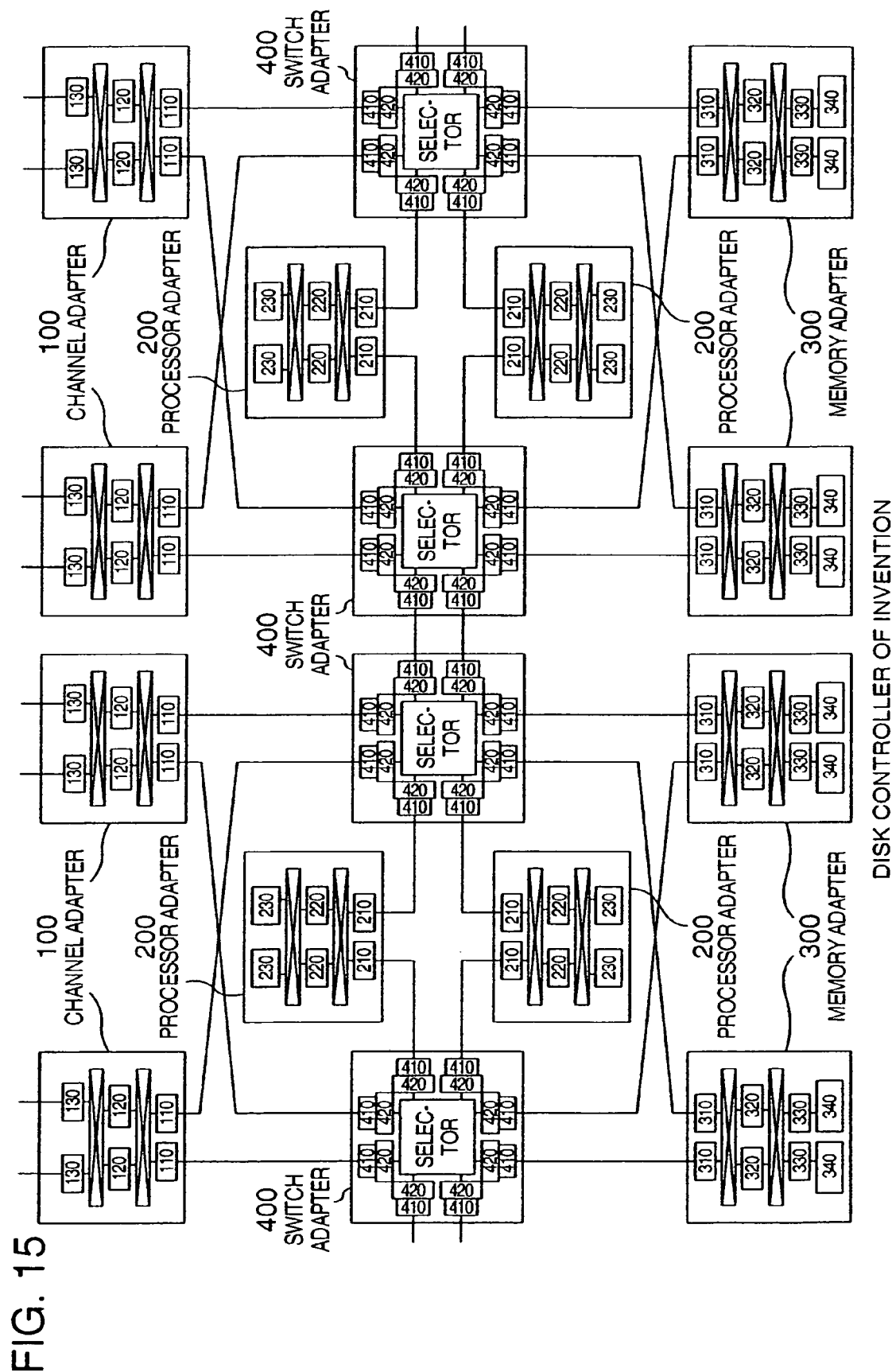
FIG. 15 is a diagram showing the overall structure of a disk controller according to still another embodiment of the invention.
Figure 16:
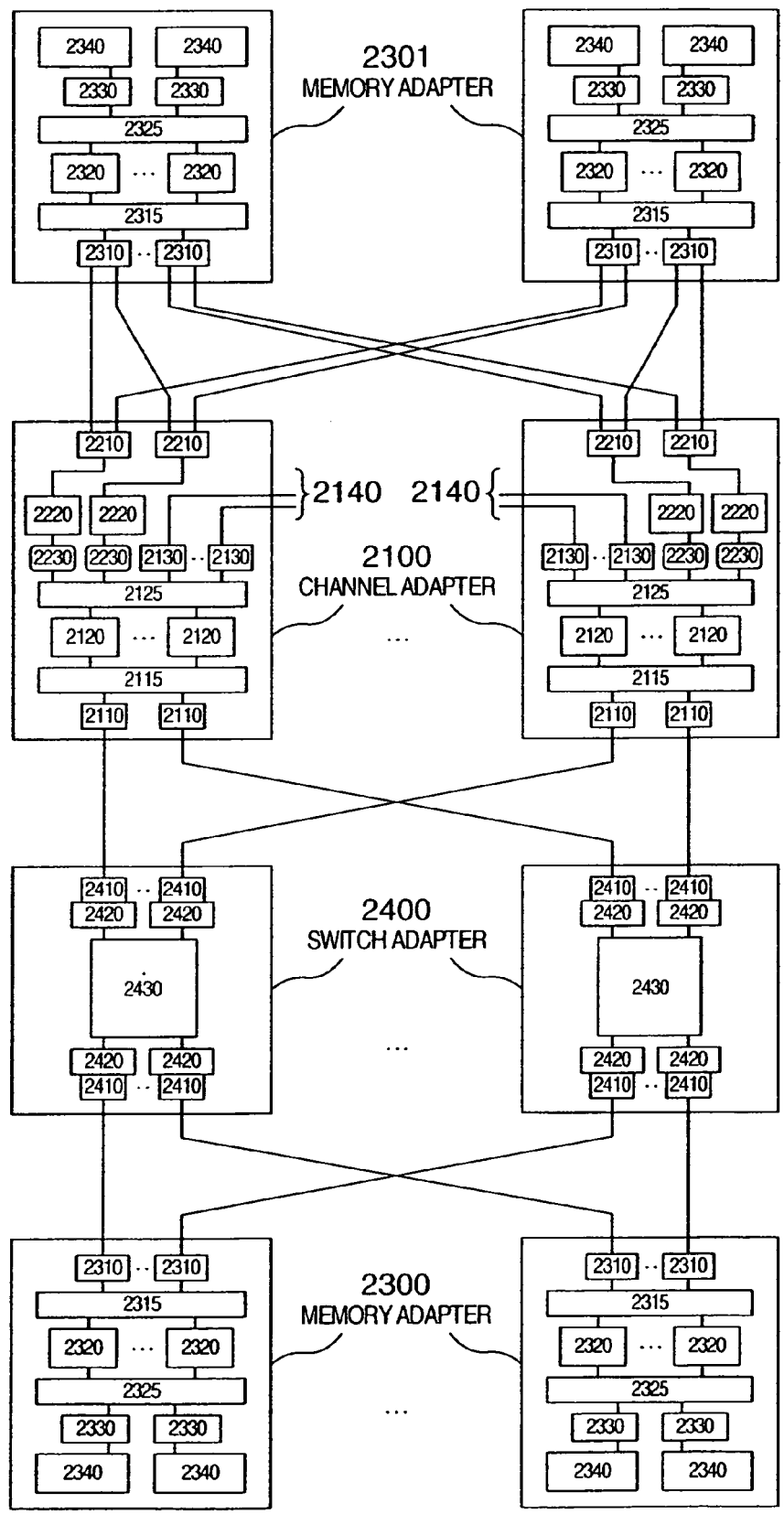
FIG. 16 is a diagram showing the overall structure of a conventional disk controller.
Figure 17:
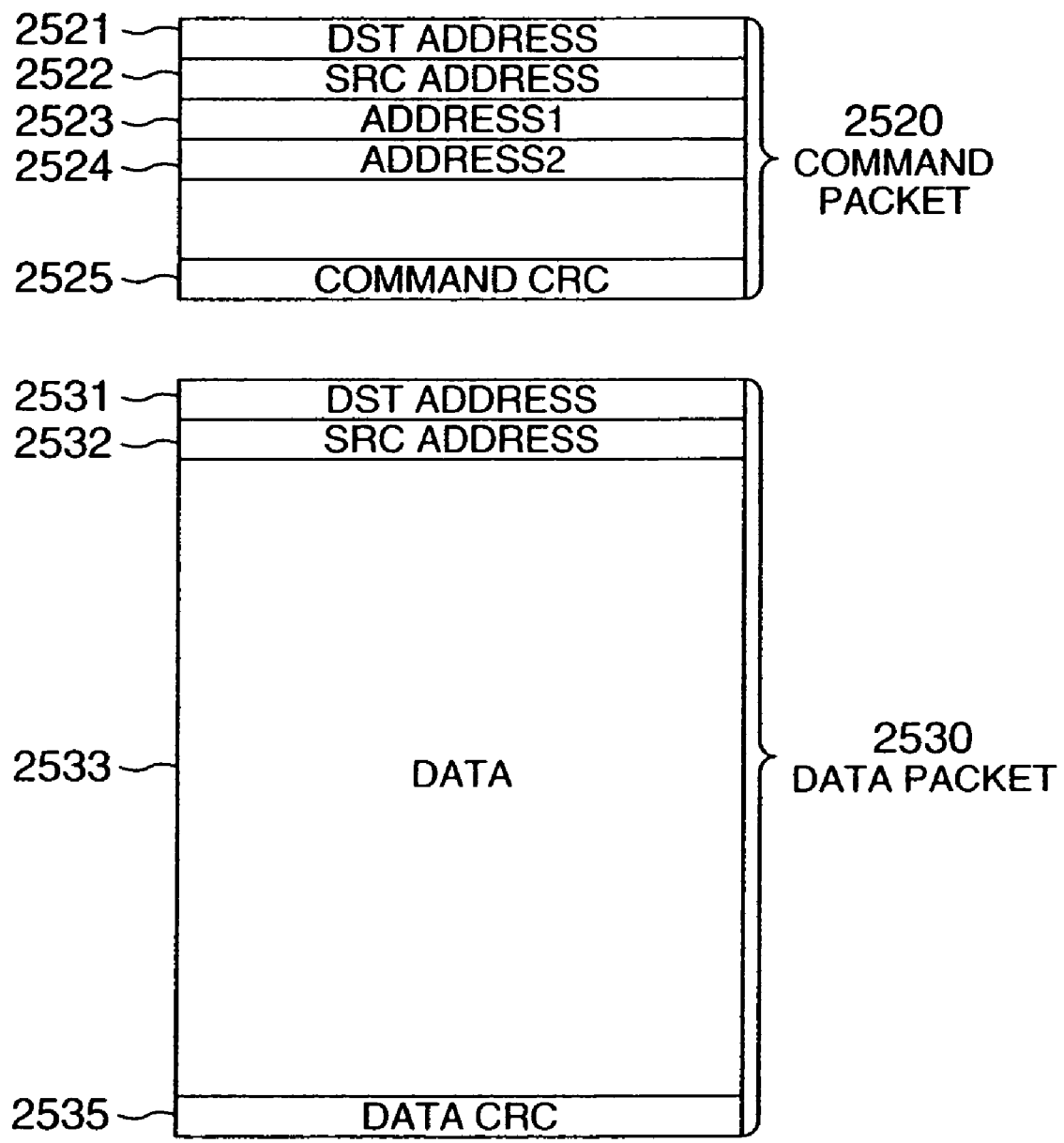
FIG. 17 is a diagram showing the structure of a packet used by the conventional disk controller.
Figure 18:
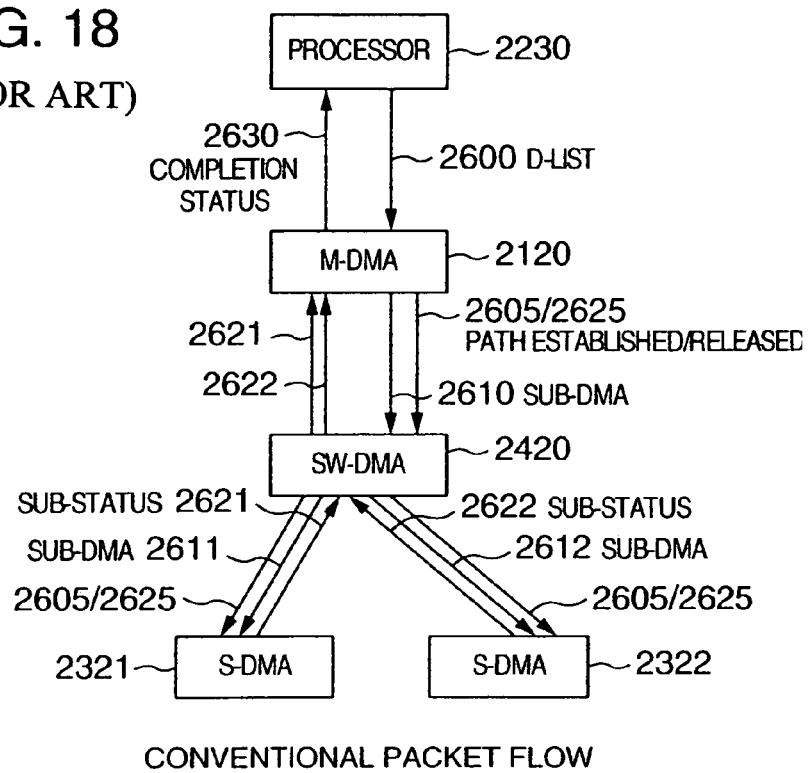
FIG. 18 is a diagram illustrating a packet flow used by the conventional disk controller.
Figure 19:
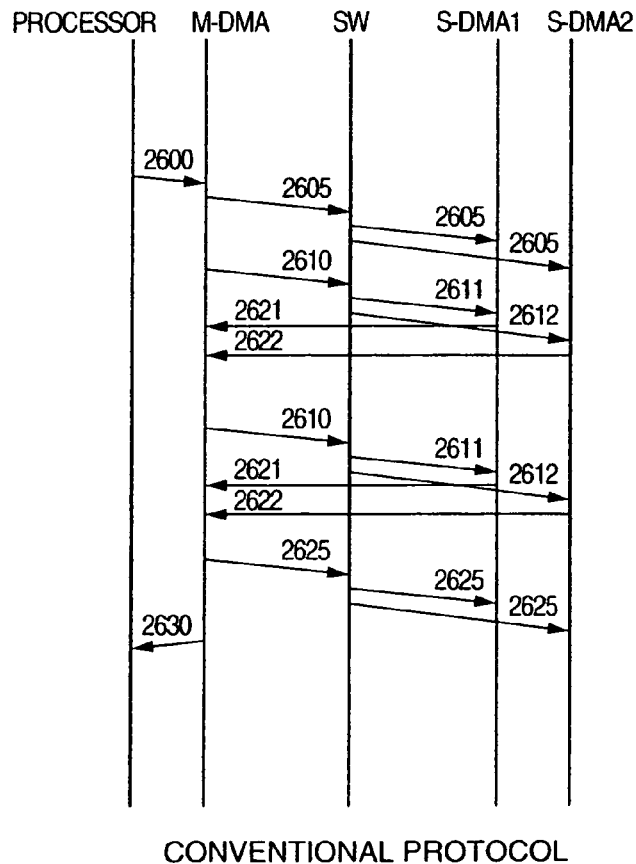
FIG. 19 is a diagram illustrating a protocol used by the conventional disk controller.
Figure 20:
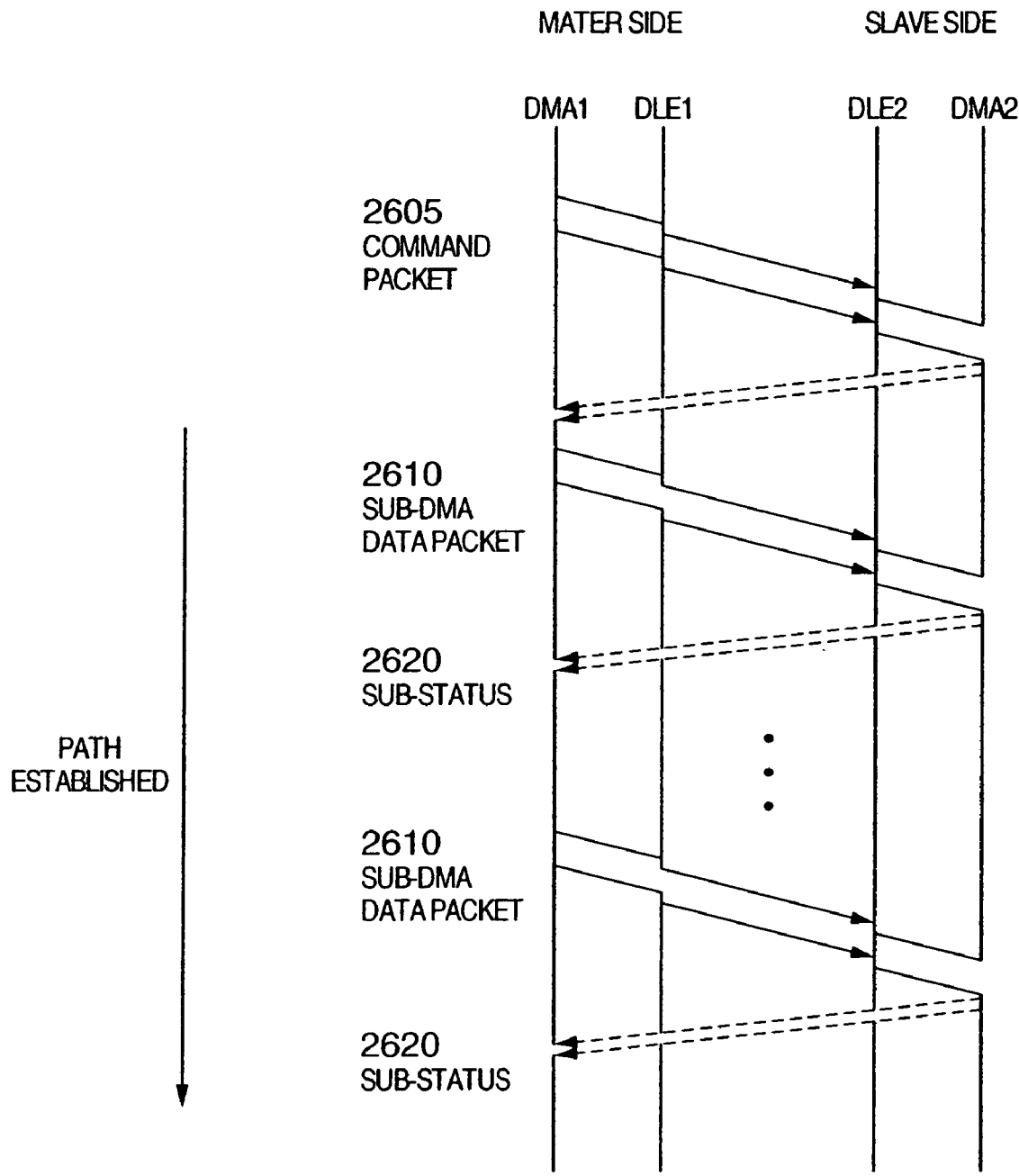
FIG. 20 is a diagram illustrating a non-multiplex communication protocol used by the conventional disk controller.

FIG. 15 is a diagram showing the overall structure of a disk controller according to still another embodiment of the invention. In this embodiment of the invention shown in FIG. 16, two disk controllers of the embodiment shown in FIG. 14 are used by coupling expansion ports of the switch adapters. With this connection, additional channel adapters, processor adapters and memory adapters can be installed so that the system scalability can be improved by using the same architecture. With this embodiment of the invention, the scalability of the disk controller can be improved.

As described so far, adopting the disk controller of the embodiments of the invention shown in FIGS. 1 to 15 can provide the following functions and effects. According to the embodiments, a plurality of buffers can be set in one-to-one correspondence with one DLE. For example, the control system inner network and data system inner network can be mixed in one DLE. The arbiter can set the priority order of a plurality of buffers. For example, if the control system inner network is set to have a priority over the data system inner network, it is possible to avoid a longer access delay time of the control system inner network otherwise caused by a mixture of both the networks. With this arrangement, it is possible to realize a disk controller of a simpler inner network configuration and both the performance improvement and low cost.

According to the embodiments, a plurality of DMACs can be set in one-to-one correspondence with one DLE. For example, the control system inner network and data system inner network can be mixed in one DLE. A plurality of DMACs can be set in one-to-one correspondence with one MC, so that the control system inner network and data system inner network can be mixed. A disk controller of a simpler inner network structure can be realized, satisfying both the performance improvement and low cost.

According to the embodiments, a proper sequence guarantee and its check are possible in the DMA transfer by connection-less type multiplex communication, and a proper failure recovery process can be performed when a failure occurs. With this structure, it becomes possible to realize a disk controller having a high reliability equivalent to the reliability of a conventional disk controller. According to the embodiments, the routing control information, DMAC control information and data information can be protected by different error check codes, resulting in a finer DMA transfer control and a finer failure recovery process. Even if the routing control information is required to be rewritten such as when duplicate WRITE is performed via the switching adapter, it is possible to minimize the recalculation range of the error check code and realize the disk controller of a high reliability and a high performance.

According to the embodiments, it becomes possible to realize cache memory duplicate WRITE by the switch adapter DMAC. Since DMAC of the switch adapter near the memory adapter generates the packets for duplicate WRITE, the bandwidth of the inner network will not be consumed wastefully and the path efficiency can be improved.

According to the embodiments, the switch adapter can start a transmission process from the transmission DLE before the whole data field is fetched from the reception DLE and the data field error check code is confirmed, and the packet having an illegal targeting address field because of an error in the header is discarded to prevent the propagation of the error. According to the embodiments, since the inner network route is fixed for a series of DMA sub-requests and sub-statuses, there is no possibility of a sequence exchange (outrun) due to different routes. The sequence control of DMA sub-requests and sub-statuses can be facilitated greatly.

According to the embodiments, the reliability can be improved by providing the redundancy with the disk controller system. According to the embodiments, the scalability of the disk controller can be improved.

Storage System

FIGS. 21-39 show embodiments of a storage system which includes a hard disk drive and is capable of expanding the configuration scalably from small scale to large scale.

Figure 21:
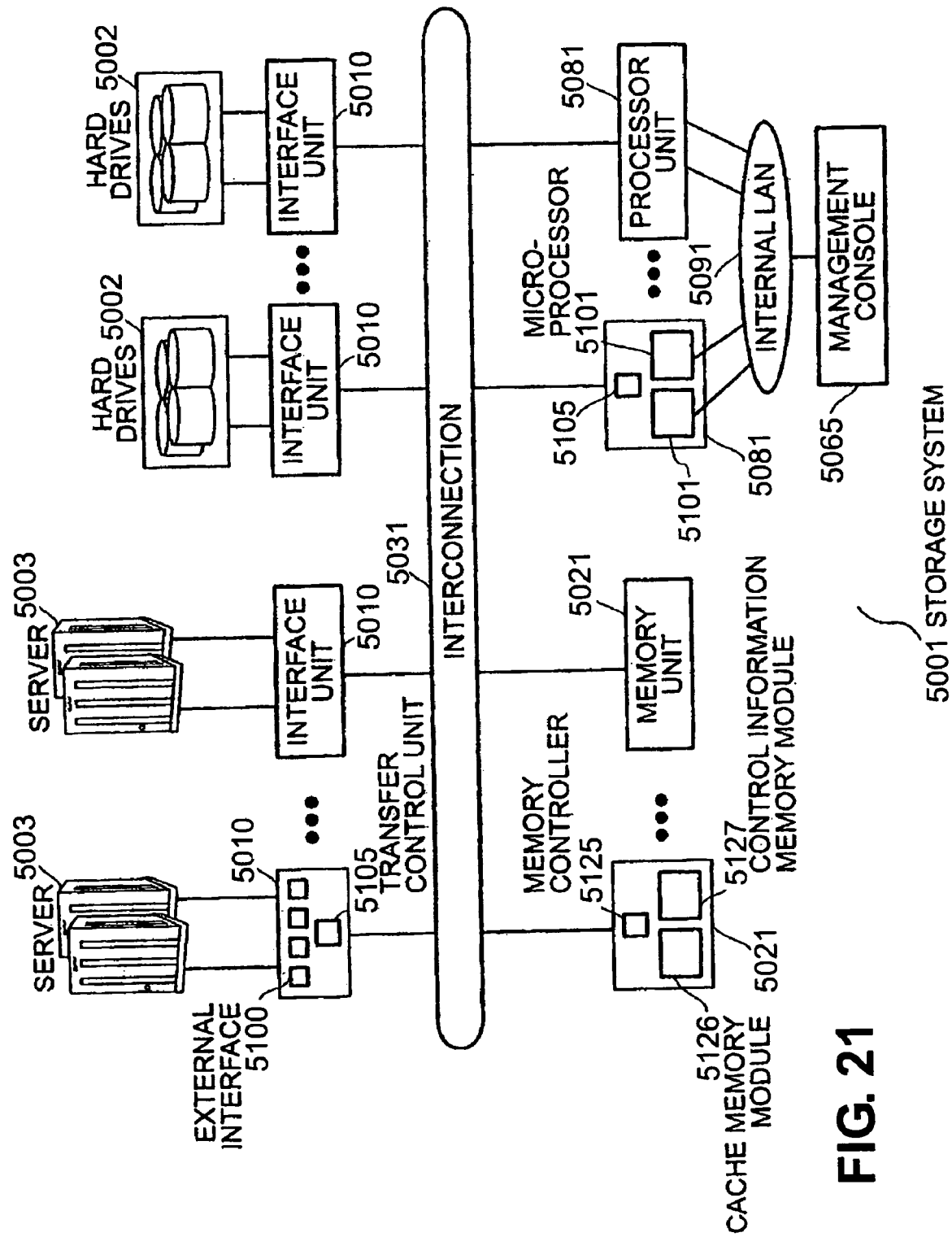
FIG. 21 is a diagram depicting a configuration example of the storage system 5001.

FIG. 21 is a diagram depicting a configuration example of the storage system according to the first embodiment. The storage system 5001 is comprised of interface units 5010 for transmitting/receiving data to/from a server 5003 or hard drives 5002, processor units 5081, memory units 5021 and hard drives 5002. The interface unit 5010, processor unit 5081 and the memory unit 5021 are connected via the interconnection 5031.

Figure 22:
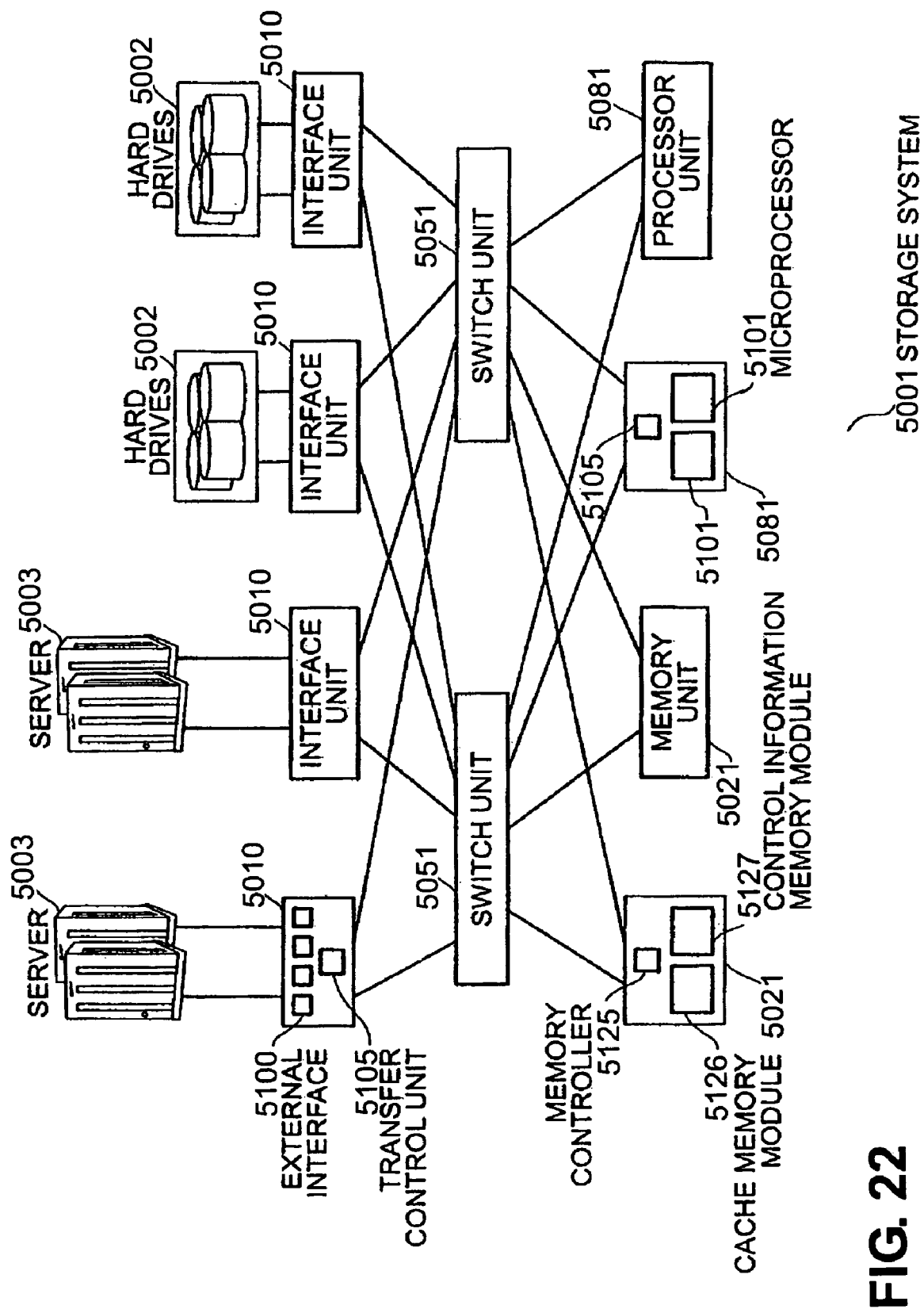
FIG. 22 is a diagram depicting a detailed configuration example of the interconnection of the storage system 5001.

FIG. 22 is an example of a concrete configuration of the interconnection 5031. The interconnection 5031 has two switch units 5051. The interface units 5010, processor unit 5081 and memory unit 5021 are connected to each one of the two switch units 5051 via one communication path respectively. In this case, the communication path is a transmission link comprised of one or more signal lines for transmitting data and control information. This makes it possible to secure two communication routes between the interface unit 5010, processor unit 5081 and memory unit 5021 respectively, and improve reliability. The above number of units or number of lines are merely an example, and the numbers are not limited to these. This can be applied to all the embodiments to be described herein below.

The interconnection shown as an example uses switches, but critical here is that the units can be interconnected so that control information and data are transferred, so the interconnection may be comprised of buses, for example.

Figure 23:
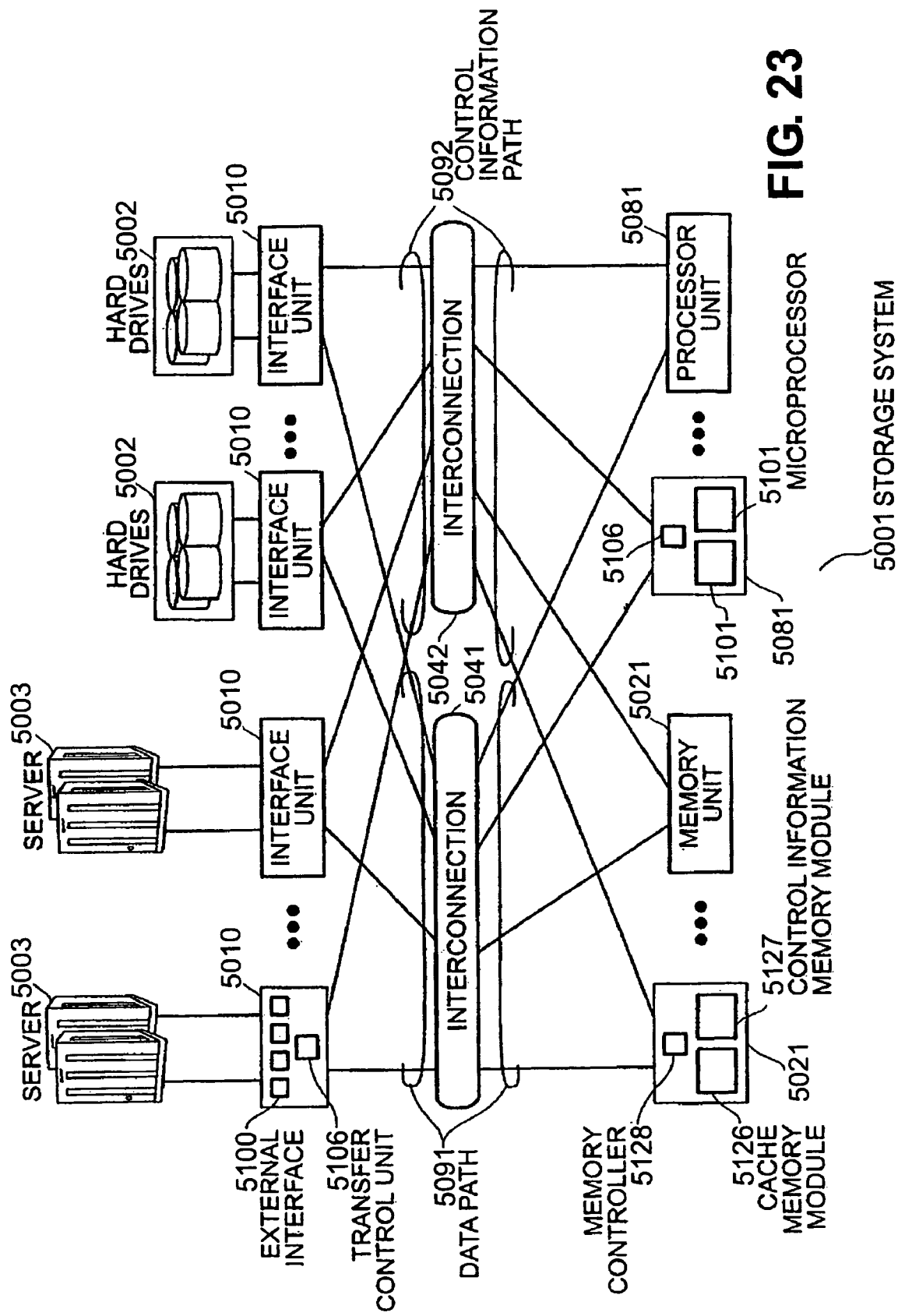
FIG. 23 is a diagram depicting another configuration example of the storage system 5001.

As FIG. 23 shows, the interconnection 5031 may be separated into the interconnection 5041 for transferring data and the interconnection 5042 for transferring control information. This prevents the mutual interference of the data transfer and the control information transfer, compared with the case of transferring data and control information by one communication path (FIG. 21). As a result, the transfer performance of data and control information can be improved.

Figure 24:
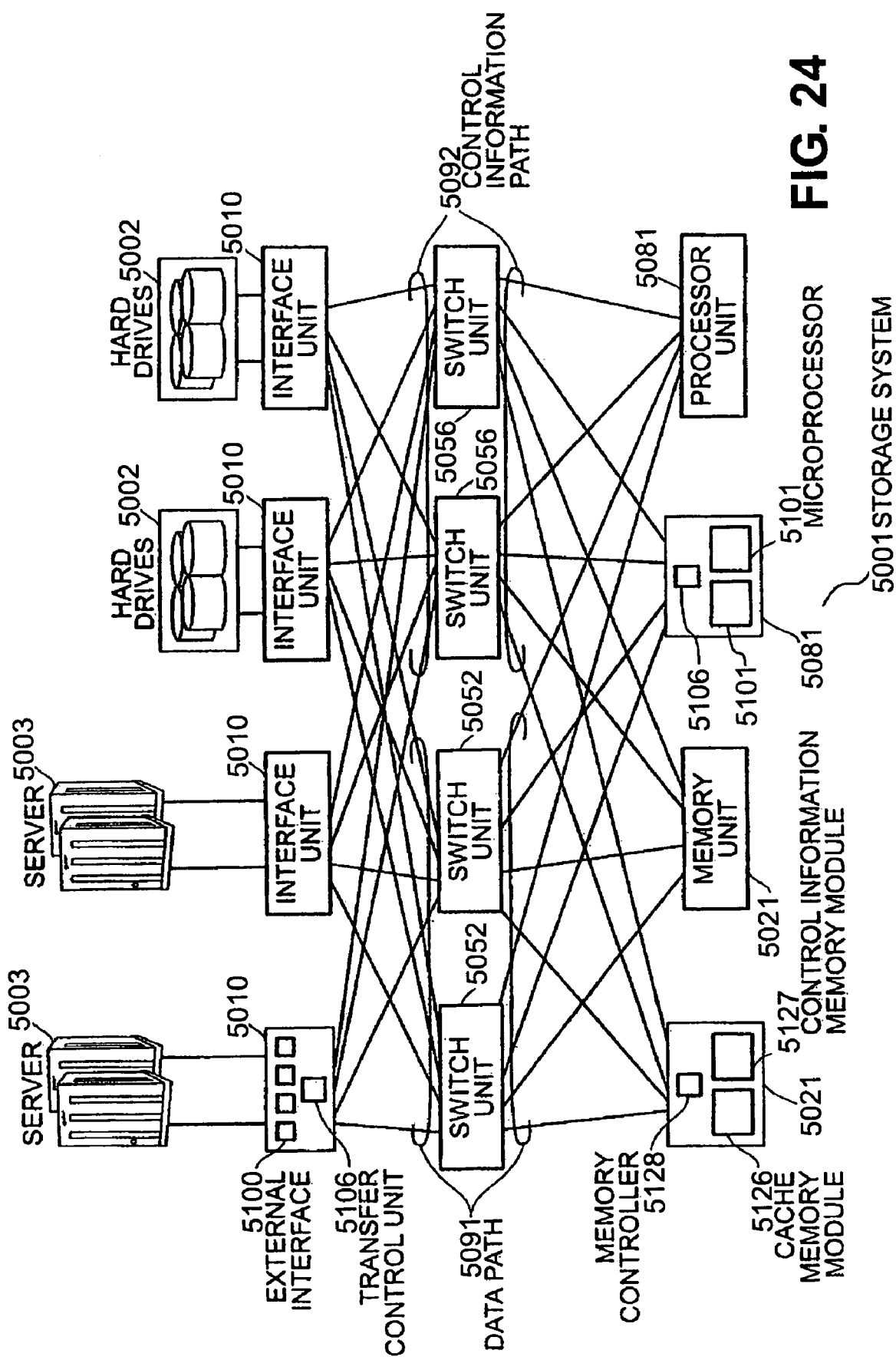
FIG. 24 is a detailed configuration example of the interconnection shown in FIG. 23.

FIG. 24 is a diagram depicting an example of a concrete configuration of the interconnections 5041 and 5042. The interconnections 5041 and 5042 have two switch units 5052 and 5056 respectively. The interface unit 5010, processor unit 5081 and memory unit 5021 are connected to each one of the two switch units 5052 and two switch units 5056 via one communication path respectively. This makes it possible to secure two data paths 5091 and two control information paths 5092 respectively between the interface unit 5010, processor unit 5081 and memory unit 5021, and improve reliability.

Figure 28:
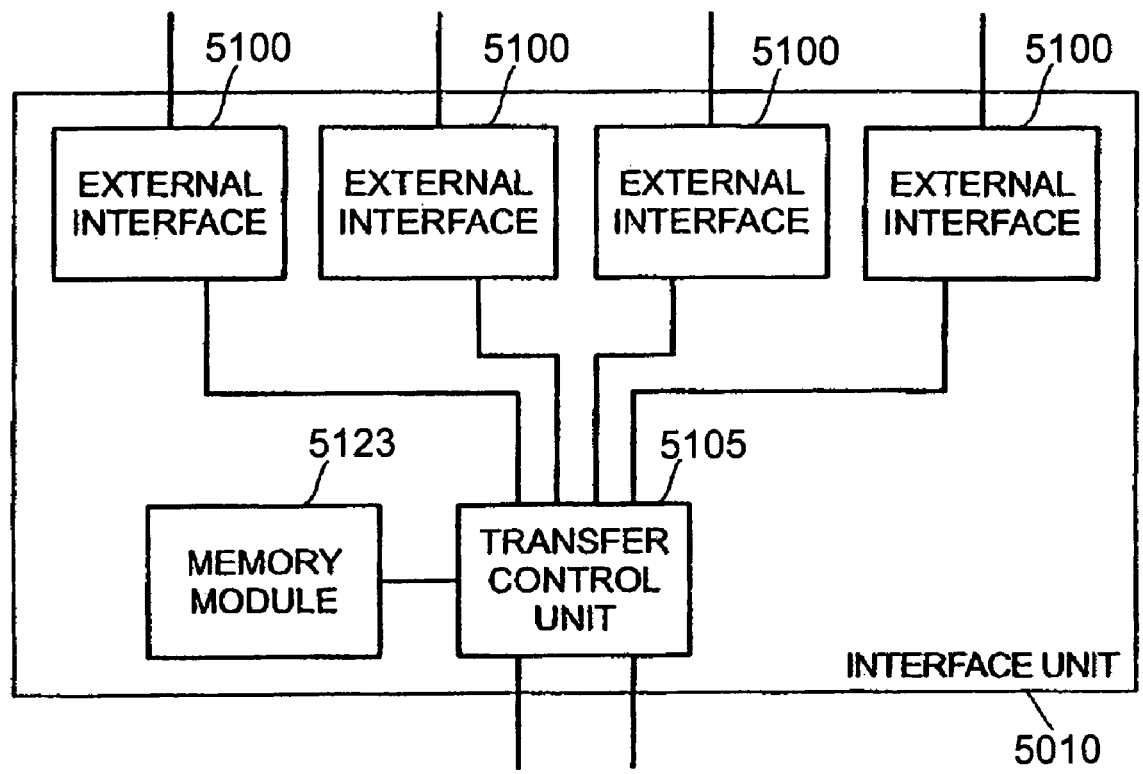
FIG. 28 is a diagram depicting a configuration example of the interface unit.

FIG. 28 is a diagram depicting a concrete example of the configuration of the interface unit 5010. The interface unit 5010 is comprised of four interfaces (external interfaces) 5100 to be connected to the server 5003 or hard drives 5002, a transfer control unit 5105 for controlling the transfer of data/control information with the processor unit 5081 or memory unit 5021, and memory module 5123 for buffering data and storing control information.

The external interface 5100 is connected with the transfer control unit 5105. Also the memory module 5123 is connected to the transfer control unit 5105. The transfer control unit 5105 also operates as a memory controller for controlling read/write of the data/control information to the memory module 5123.

The connection configuration between the external interface 5100 or the memory module 5123 and the transfer control unit 5105 in this case are merely an example, and is not limited to the above mentioned configuration. As long as the data/control information can be transferred from the external interface 5100 to the processor unit 5081 and memory unit 5021 via the transfer control unit 5105, any configuration is acceptable.

In the case of the interface unit 5010 in FIG. 24, where the data path 5091 and the control information path 5092 are separated, two data paths 5091 and two control information paths 5092 are connected to the transfer control unit 5106.

Figure 29:
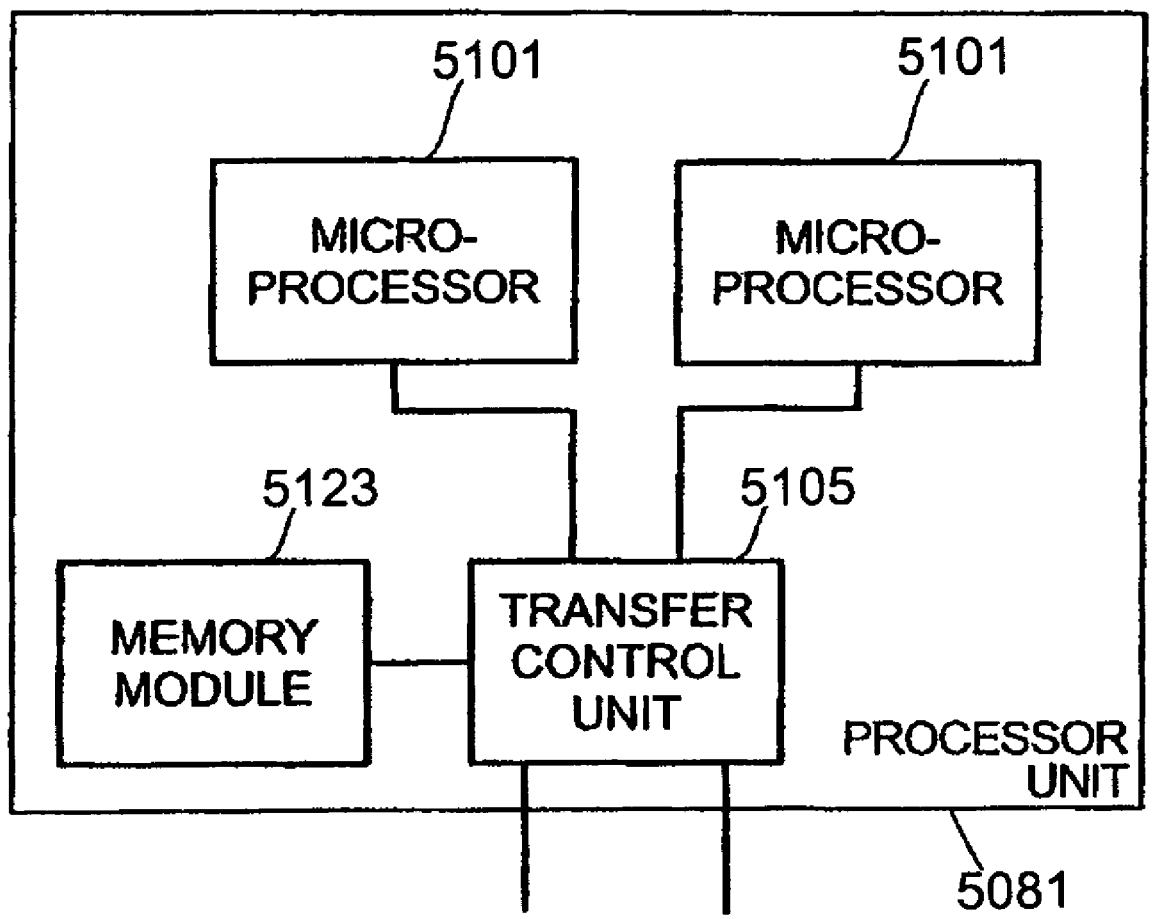
FIG. 29 is a diagram depicting a configuration example of the processor unit.

FIG. 29 is a diagram depicting a concrete example of the configuration of the processor unit 5081. The processor unit 5021 is comprised of two microprocessors 5101, a transfer control unit 5105 for controlling the transfer of data/control information with the interface unit 5010 or memory unit 5021, and a memory module 5123. The memory module 5123 is connected to the transfer control unit 5105. The transfer control unit 5105 also operates as a memory controller for controlling read/write of data/control information to the memory module 5123. The memory module 5123 is shared by the two microprocessors 5101 as a main memory, and stores data and control information. The processor unit 5021 may have dedicated memory modules for each microprocessor 5101 for the number of microprocessors, instead of the memory module 5123, which is shared by two microprocessors 5101.

The microprocessor 5101 is connected to the transfer control unit 5105. The microprocessor 5101 controls read/write of data to the cache memory of the memory unit 5021, directory management of the cache memory, and data transfer between the interface unit 5010 and the memory unit 5021 based on the control information stored in the control memory module 5127 of the memory unit 5021 of FIG. 24.

Specifically, for example, the external interface 5100 in the interface unit 5010 writes the control information to indicate an access request for read or write of data to the memory module 5123 in the processor unit 5081. Then the microprocessor 5101 reads out the written control information, interprets it, and writes the control information, to indicate which memory unit 5021 the data is transferred from the external interface 5100 and the parameters to be required for the data transfer, to the memory module 5123 in the interface unit 5010. The external interface 5100 executes data transfer to the memory unit 5021 according to that control information and parameters.

The microprocessor 5101 executes the data redundant process of data to be written to the hard drives 5002 connected to the interface unit 5010, that is the so called RAID process. This RAID process may be executed in the interface unit 5010 and memory unit 5021. The microprocessor 5101 also manages the storage area in the storage system 5001 (e.g., address transformation between a logical volume and physical volume).

The connection configuration between the microprocessor 5101, the transfer control unit 5105 and the memory module 5123 in this case is merely an example, and is not limited to the above mentioned configuration. As long as data/control information can be mutually transferred between the microprocessor 5101, the transfer control unit 5105 and the memory module 5123, any configuration is acceptable.

If the data path 5091 and the control information path 5092 are separated, as shown in FIG. 24, the data paths 5091 (two paths in this case) and the control information paths 5092 (two paths in this case) are connected to the transfer control unit 5106 of the processor unit 5081.

Figure 30:
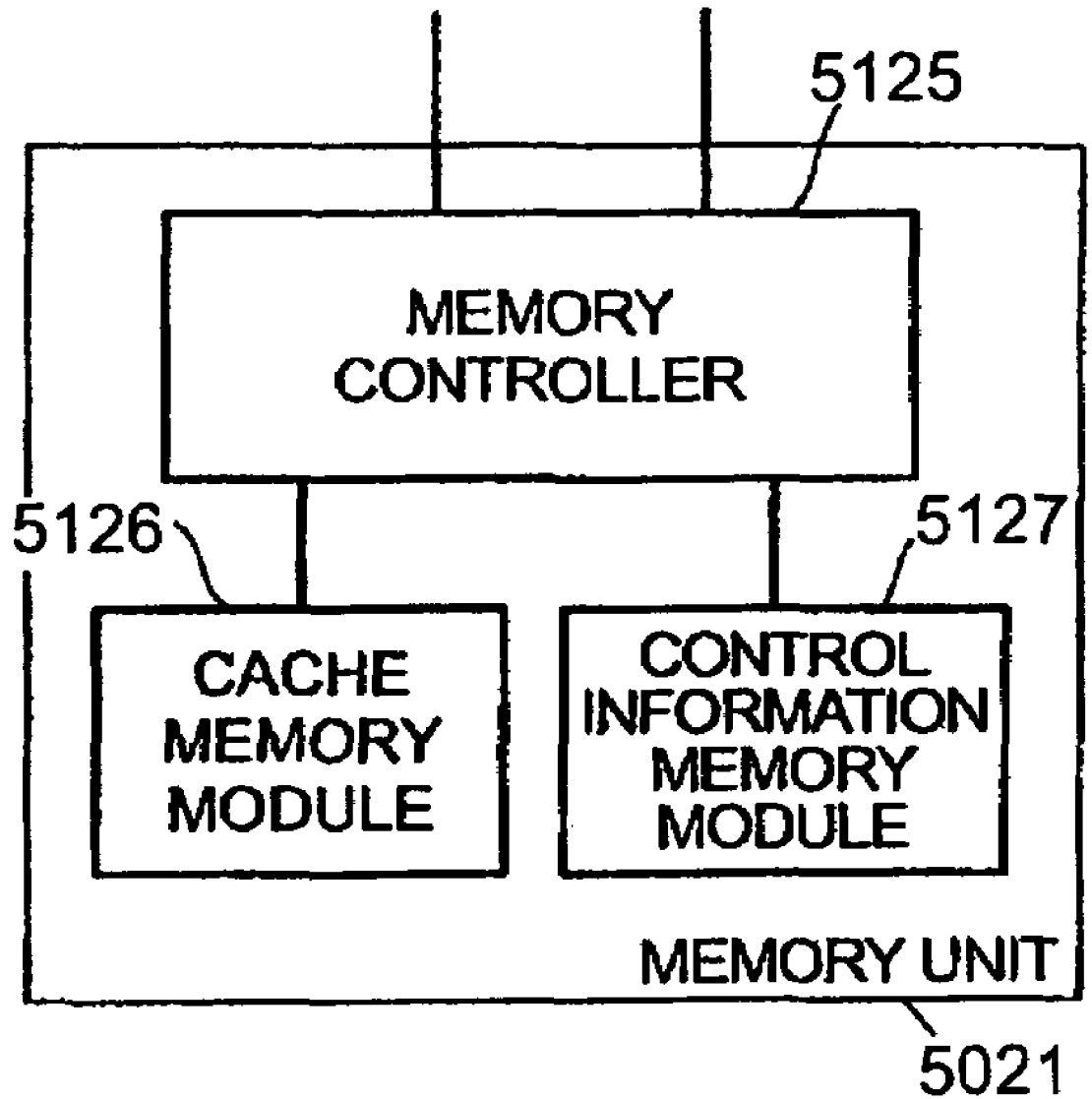
FIG. 30 is a diagram depicting a configuration example of the memory unit.

FIG. 30 is a diagram depicting a concrete example of the configuration of the memory unit 5021. The memory unit 5021 is comprised of a cache memory module 5126, control information memory module 5127 and memory controller 5125. In the cache memory module 5126, data to be written to the hard drives 5002 or data read from the hard drives 5002 is temporarily stored (hereafter called "caching"). In the control memory module 5127, the directory information of the cache memory module 5126 (information on a logical block for storing data in cache memory), information for controlling data transfer between the interface unit 5010, processor unit 5081 and memory unit 5021, and management information and configuration information of the storage system 5001 are stored. The memory controller 5125 controls read/write processing of data to the cache memory module 5126 and control information to the control information memory module 127 independently. The memory controller 5125 controls transfer of data/control information between the interface unit 5010, processor unit 5081 and other memory units 5021.

Here the cache memory module 5126 and the control memory module 5127 may be physically integrated into one unit, and the cache memory area and the control information memory area may be allocated in logically different areas of one memory space. This makes it possible to decrease the number of memory modules and decrease component cost. The memory controller 5125 may be separated for cache memory module control and for control information memory module control.

If the storage system 5001 has a plurality of memory units 5021, the plurality of memory units 5021 may be divided into two groups, and data and control information to be stored in the cache memory module and control memory module may be duplicated between these groups. This makes it possible to continue operation when an error occurs to one group of cache memory modules or control information memory modules, using the data stored in the other group of cache memory modules or control information memory modules, which improves the reliability of the storage system 5001.

In the case when the data path 5091 and the control information path 5092 are separated, as shown in FIG. 24, the data paths 5091 (two paths in this case) and the control information paths 5092 (two paths in this case) are connected to the memory controller 5128.

Figure 31:
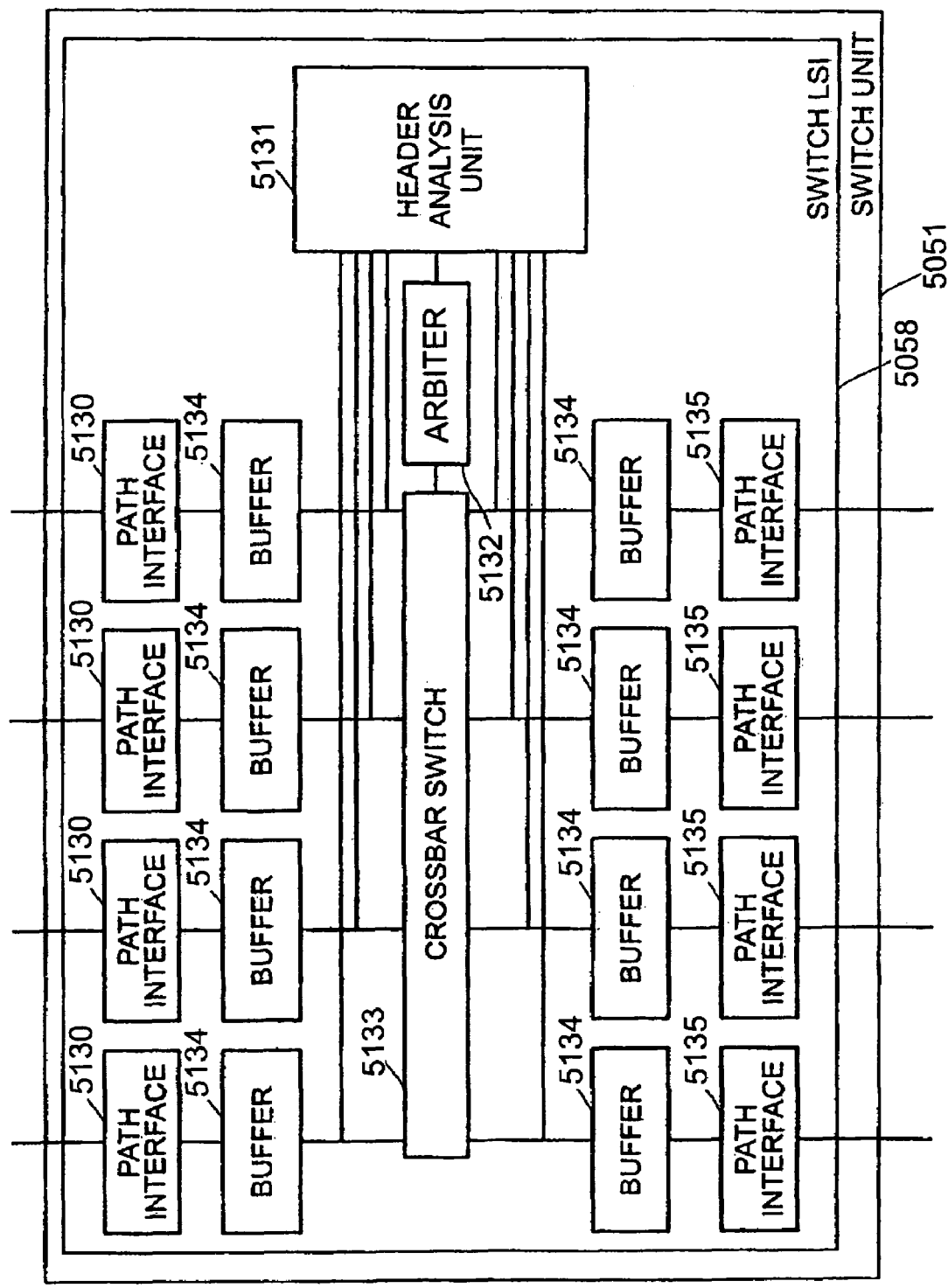
FIG. 31 is a diagram depicting a configuration example of the switch unit.

FIG. 31 is a diagram depicting a concrete example of the configuration of the switch unit 5051. The switch unit 5051 has a switch LSI 5058. The switch LSI 5058 is comprised of four path interfaces 5130, header analysis unit 5131, arbiter 5132, crossbar switch 5133, eight buffers 5134 and four path interfaces 5135.

he path interface 5130 is an interface where the communication path to be connected with the interface unit 5010 is connected. The interface unit 5010 and the path interface 5130 are connected one-to-one. The path interface 5135 is an interface where the communication path to be connected with the processor unit 5081 or the memory unit 5021 is connected. The processor unit 5081 or the memory unit 5021 and the path interface 5135 are connected one-to-one. In the buffer 5134, the packets to be transferred between the interface unit 5010, processor unit 5081 and memory unit 5021 are temporarily stored (buffering).

Figure 32:
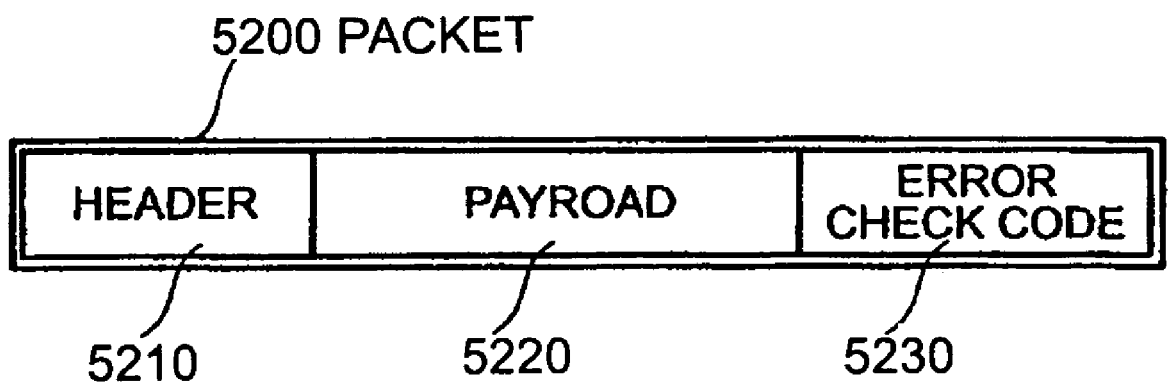
FIG. 32 is a diagram depicting an example of the packet format.

FIG. 32 is a diagram depicting an example of the format of a packet to be transferred between the interface unit 5010, processor unit 5081 and memory unit 5021. A packet is a unit of data transfer in the protocol used for data transfer (including control information) between each unit. The packet 5200 has a header 5210, payload 5220 and error check code 5230. In the header 5210, at least the information to indicate the transmission source and the transmission destination of the packet is stored. In the payload 5220, such information as a command, address, data and status is stored. The error check code 5230 is a code to be used for detecting an error which is generated in the packet during packet transfer.

When the path interface 5130 or 5135 receives a packet, the switch LSI 5158 sends the header 5210 of the received packet to the header analysis unit 5131. The head analysis unit 5131 detects the connection request between each path interface based on the information on the packet transmission destination included in the header 5210. Specifically, the header analysis unit 5131 detects the path interface connected with the unit (e.g., memory unit) at the packet transmission destination specified by the header 5210, and generates a connection request between the path interface that received the packet and the detected path interface.

Then the header analysis unit 5131 sends the generated connection request to the arbiter 5132. The arbiter 5132 arbitrates each path interface based on the detected connection request of each path interface. Based on this result, the arbiter 5132 outputs the signal to switch connection to the crossbar switch 5133. The crossbar switch 5133 which received the signal switches connection in the crossbar switch 5133 based on the content of the signal, and implements connection between the desired path interfaces.

In the configuration of the present embodiment, each path interface has a buffer one-to-one, but the switch LSI 5058 may have one large buffer, and a packet storage area is allocated to each path interface in the large buffer. The switch LSI 5058 has a memory for storing error information in the switch unit 5051.

Figure 36:
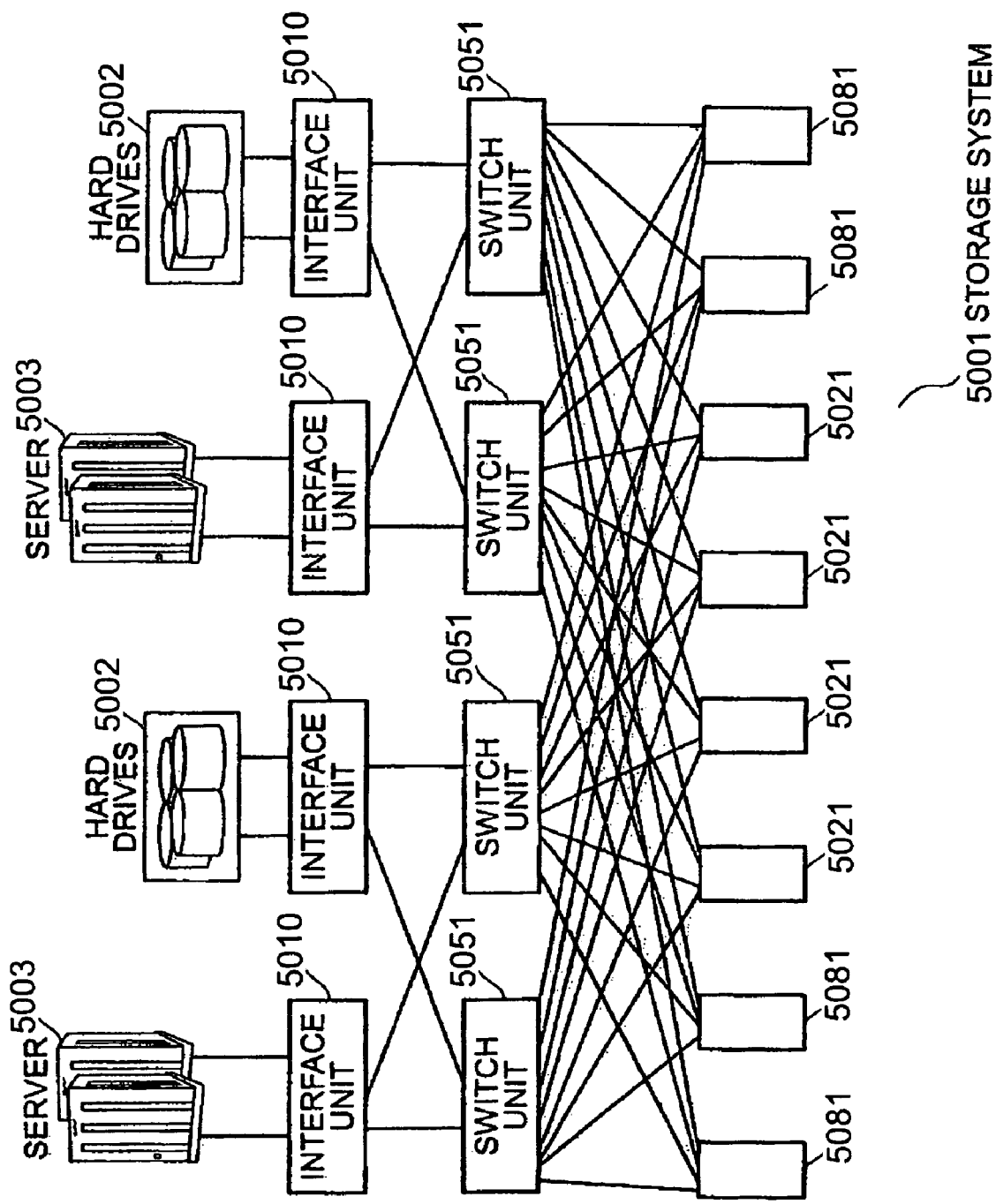
FIG. 36 is a diagram depicting another detailed configuration example of the interconnection.

FIG. 36 is a diagram depicting another configuration example of the interconnection 5031. In FIG. 36, the number of path interfaces of the switch unit 5051 is increased to ten, and the number of the switch units 5051 is increased to four. As a result, the number of interface units 5010, processor units 5081 and memory units 5021 are double those of the configuration in FIG. 22. In FIG. 36, the interface unit 5010 is connected only to a part of the switch units 5051, but the processor units 5081 and memory units 5021 are connected to all the switch units 5051. This also makes it possible to access from all the interface units 5010 to all the memory units 5021 and all the processor units 5081.

Conversely, each one of the ten interface units may be connected to all the switch units 5051, and each of the processor units 5081 and memory units 5021 may be connected to a part of the switch units. For example, the processor units 5081 and memory units 5021 are divided into two groups, where one group is connected to two switch units 5051 and the other group is connected to the remaining two switch units 5051. This also makes it possible to access from all the interface units 5010 to all the memory units 5021 and all the processor units 5081.

Now an example of the process procedure when the data recorded in the hard drives 5002 of the storage system 5001 is read from the server 5003. In the following description, the packets are always used for data transfer which uses the switches 5051. In the communication between the processor unit 5081 and the interface unit 5010, the area for the interface unit 5010 to store the control information (information required for data transfer), which is sent from the processor unit 5081, is predetermined.

Figure 42:
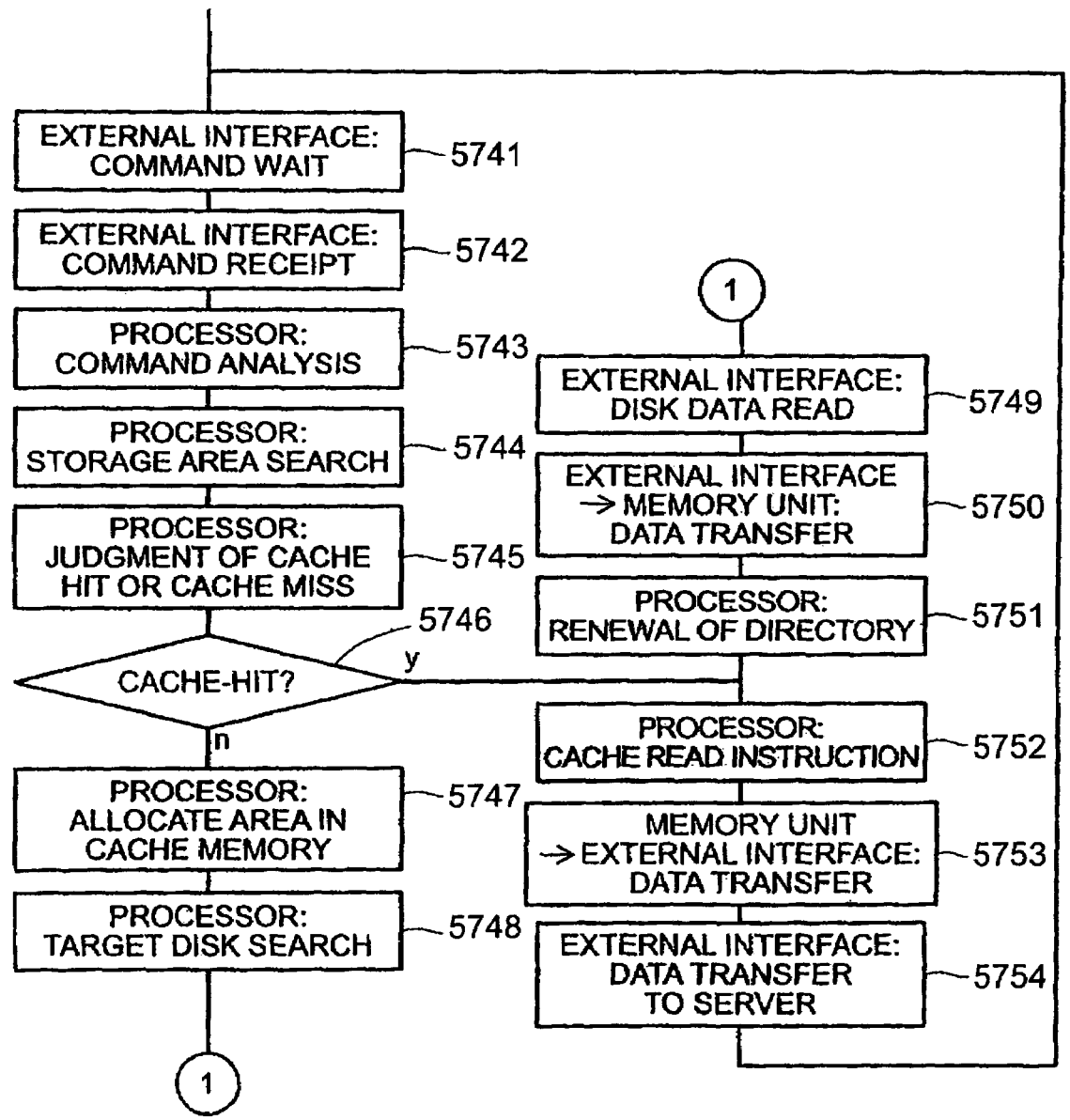
FIG. 42 is a flow chart depicting the read operation of the storage system 5001.

FIG. 42 is a flow chart depicting a process procedure example when the data recorded in the hard disks 5002 of the storage system 5001 is read from the server 5003. At first, the server 5003 issues the data read command to the storage system 5001. When the external interface 5100 in the interface unit 5010 receives the command (5742), the external interface 5100 in the command wait status (5741) transfers the received command to the transfer control unit 5105 in the processor unit 5081 via the transfer control unit 5105 and the interconnection 5031 (switch unit 5051 in this case). The transfer control unit 5105 that received the command writes the received command to the memory module 5123.

The microprocessor 5101 of the processor unit 5081 detects that the command is written to the memory module 5123 by polling to the memory module 5123 or by an interrupt to indicate writing from the transfer control unit 5105. The microprocessor 5101, which detected the writing of the command, reads out this command from the memory module 5123 and performs the command analysis (5743). The microprocessor 5101 detects the information that indicates the storage area where the data requested by the server 5003 is recorded in the result of command analysis (5744).

The microprocessor 5101 checks whether the data requested by the command (hereafter also called "request data") is recorded in the cache memory module 5126 in the memory unit 5021 from the information on the storage area acquired by the command analysis and the directory information of the cache memory module stored in the memory module 5123 in the processor unit 5081 or the control information memory module 5127 in the memory unit 5021 (5745).

If the request data exists in the cache memory module 5126 (hereafter also called a "cache hit") (5746), the microprocessor 5101 transfers the information required for transferring the request data from the cache memory module 5126 to the external interface 5100 in the interface unit 5010, specifically the information of the address in the cache memory module 5126 where the request data is stored and the address in the memory module 5123, which the interface unit 5010 to be the transfer destination has, to the memory module 5123 in the interface unit 5010 via the transfer control unit 5105 in the processor unit 5081, the switch unit 5051 and the transfer control unit 5105 in interface unit 5010.

Then the microprocessor 5101 instructs the external interface 5100 to read the data from the memory unit 5021 (5752). The external interface 5100 in the interface unit 5010, which received the instruction, reads out the information necessary for transferring the request data from a predetermined area of the memory module 5123 in the local interface unit 5010. Based on this information, the external interface 5100 in the interface unit 5010 accesses the memory controller 5125 in the memory unit 5021, and requests to read out the request data from the cache memory module 5126. The memory controller 5125 which received the request reads out the request data from the cache memory module 5126, and transfers the request data to the interface unit 5010 which received the request (5753). The interface unit 5010 which received the request data sends the received request data to the server 5003 (5754).

If the request data does not exist in the cache memory module 5126 (hereafter also called "cache-miss") (5746), the microprocessor 5101 accesses the control memory module 5127 in the memory unit 5021, and registers the information for allocating the area for storing the request data in the cache memory module 5126 in the memory unit 5021, specifically information for specifying an open cache slot, in the directory information of the cache memory module (hereafter also called "cache area allocation") (5747). After cache area allocation, the microprocessor 5101 accesses the control information memory module 5127 in the memory unit 5021, and detects the interface unit 5010, to which the hard drives 5002 for storing the request data are connected (hereafter also called "target interface unit 5010"), from the management information of the storage area stored in the control information memory module 5127 (5748).

Then the microprocessor 5101 transfers the information, which is necessary for transferring the request data from the external interface 5100 in the target interface unit 5010 to the cache memory module 5126, to the memory module 5123 in the target interface unit 5010 via the transfer control unit 5105 in the processor unit 5081, switch unit 5051 and the transfer control unit 5105 in the target interface unit 5010. And the microprocessor 5101 instructs the external interface 5100 in the target interface unit 5010 to read the request data from the hard drives 5002, and to write the request data to the memory unit 5021.

The external interface 5100 in the target interface 5010, which received the instruction, reads out the information necessary for transferring request data from the predetermined area of the memory module 5123 in the local interface unit 5010 based on the instructions. Based on this information, the external interface 5100 in the target interface unit 5010 reads out the request data from the hard drives 5002 (5749), and transfers the data which was read out to the memory controller 5125 in the memory unit 5021. The memory controller 5125 writes the received request data to the cache memory module 5126 (5750). When writing of the request data ends, the memory controller 5125 notifies the end to the microprocessor 5101.

The microprocessor 5101, which detected the end of writing to the cache memory module 5126, accesses the control memory module 5127 in the memory unit 5021, and updates the directory information of the cache memory module. Specifically, the microprocessor 5101 registers the update of the content of the cache memory module in the directory information (5751). Also the microprocessor 5101 instructs the interface unit 5010, which received the data read request command, to read the request data from the memory unit 5021.

The interface unit 5010, which received instructions, reads out the request data from the cache memory module 5126, in the same way as the process procedure at cache-hit, and transfers it to the server 5003. Thus the storage system 5001 reads out the data from the cache memory module or the hard drives 5002 when the data read request is received from the server 5003, and sends it to the server 5003.

Figure 43:
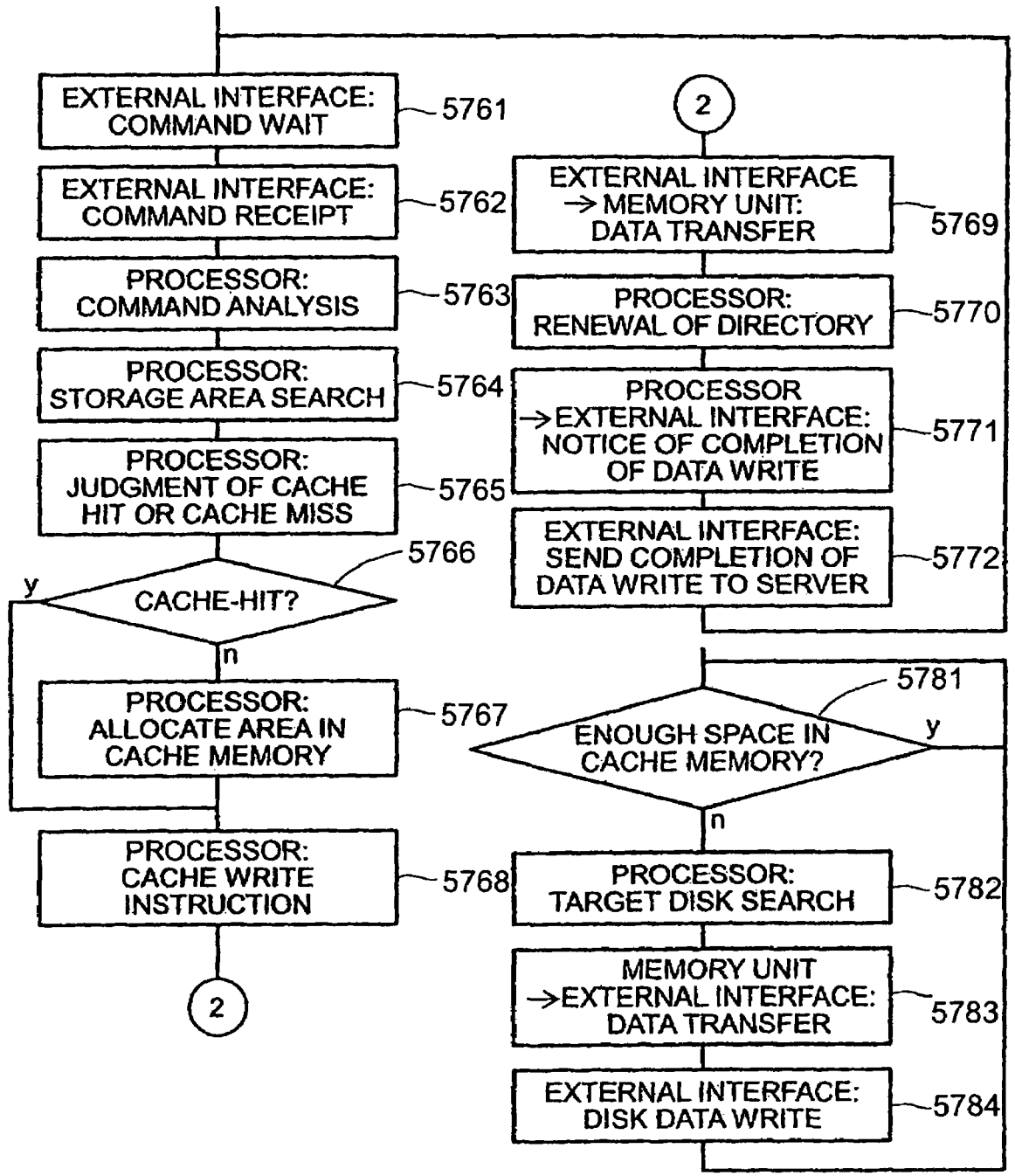
FIG. 43 is a flow chart depicting the write operation of the storage system 5001.

Now an example of the process procedure when the data is written from the server 5003 to the storage system 5001 will be described. FIG. 43 is a flow chart depicting a process procedure example when the data is written from the server 5003 to the storage system 5001.

At first, the server 5003 issues the data write command to the storage system 5001. In the present embodiment, the description assumes that the write command includes the data to be written (hereafter also called "update data"). The write command, however, may not include the update data. In this case, after the status of the storage system 5001 is confirmed by the write command, the server 5003 sends the update data.

When the external interface 5100 in the interface unit 5010 receives the command (5762), the external interface 5100 in the command wait status (5761) transfers the received command to the transfer control unit 5105 in the processor unit 5081 via the transfer control unit 5105 and the switch unit 5051. The transfer control unit 5105 writes the received command to the memory module 5123 of the processor unit. The update data is temporarily stored in the memory module 5123 in the interface unit 5010.

The microprocessor 5101 of the processor unit 5081 detects that the command is written to the memory module 5123 by polling to the memory module 5123 or by an interrupt to indicate writing from the transfer control unit 5105. The microprocessor 5101, which detected writing of the command, reads out this command from the memory module 5123, and performs the command analysis (5763). The microprocessor 5101 detects the information that indicates the storage area where the update data, which the server 5003 requests writing, is recorded in the result of command analysis (5764). The microprocessor 5101 decides whether the write request target, that is the data to be the update target (hereafter called "update target data"), is recorded in the cache memory module 5126 in the memory unit 5021, based on the information that indicates the storage area for writing the update data and the directory information of the cache memory module stored in the memory module 5123 in the processor unit 5081 or the control information memory module 5127 in the memory unit 5021 (5765).

If the update target data exists in the cache memory module 5126 (hereafter also called "write-hit") (5766), the microprocessor 5101 transfers the information, which is required for transferring update data from the external interface 5100 in the interface unit 5010 to the cache memory module 5126, to the memory module 5123 in the interface unit 5010 via the transfer control unit 5105 in the processor unit 5081, the switch unit 5051 and the transfer control unit 5105 in the interface unit 5010. And the microprocessor 5101 instructs the external interface 5100 to write the update data which was transferred from the server 5003 to the cache memory module 5126 in the memory unit (5768).

The external interface 5100 in the interface unit 5010, which received the instruction, reads out the information necessary for transferring the update data from a predetermined area of the memory module 5123 in the local interface unit 5010. Based on this read information, the external interface 5100 in the interface unit 5010 transfers the update data to the memory controller 5125 in the memory unit 5021 via the transfer control unit 5105 and the switch unit 5051. The memory controller 5125, which received the update data, overwrites the update target data stored in the cache memory module 5126 with the request data (5769). After the writing ends, the memory controller 5125 notifies the end of writing the update data to the microprocessor 5101 which sent the instructions.

The microprocessor 5101, which detected the end of writing of the update data to the cache memory module 5126, accesses the control information memory module 5127 in the memory unit 5021, and updates the directory information of the cache memory (5770). Specifically, the microprocessor 5101 registers the update of the content of the cache memory module in the directory information. Along with this, the microprocessor 5101 instructs the external interface 5100, which received the write request from the server 5003, to send the notice of completion of the data write to the server 5003 (5771). The external interface 5100, which received this instruction, sends the notice of completion of the data write to the server 5003 (5772).

If the update target data does not exist in the cache memory module 5126 (hereafter also called "write-miss") (5766), the microprocessor 5101 accesses the control memory module 5127 in the memory unit 5021, and registers the information for allocating an area for storing the update data in the cache memory module 5126 in the memory unit 5021, specifically, information for specifying an open cache slot in the directory information of the cache memory (cache area allocation) (5767). After cache area allocation, the storage system 5001 performs the same control as the case of a write-hit. In the case of a write-miss, however, the update target data does not exist in the cache memory module 5126, so the memory controller 5125 stores the update data in the storage area allocated as an area for storing the update data.

Then the microprocessor 5101 judges the vacant capacity of the cache memory module 5126 (5781) asynchronously with the write request from the server 5003, and performs the process for recording the update data written in the cache memory module 5126 in the memory unit 5021 to the hard drives 5002. Specifically the microprocessor 5101 accesses the control information memory module 5127 in the memory unit 5021, and detects the interface unit 5010 to which the hard drives 5002 for storing the update data are connected (hereafter also called "update target interface unit 5010") from the management information of the storage area (5782). Then the microprocessor 5101 transfers the information, which is necessary for transferring the update data from the cache memory module 5126 to the external interface 5100 in the update target interface unit 5010, to the memory module 5123 in the update target interface unit 5010 via the transfer control unit 5105 of the processor unit 501, switch unit 5051 and transfer control unit 5105 in the interface unit 5010.

Then the microprocessor 5101 instructs the update target interface unit 5010 to read out the update data from the cache memory module 5126, and transfer it to the external interface 5100 in the update target interface unit 5010. The external interface 5100 in the update target interface unit 5010, which received the instruction, reads out the information necessary for transferring the update data from a predetermined area of the memory module 5123 in the local interface unit 5010. Based on this read information, the external interface 5100 in the update target interface unit 5010 instructs the memory controller 5125 in the memory unit 5021 to read out the update data from the cache memory module 5126, and transfer this update data from the memory controller 5125 to the external interface 5100 via the transfer control unit 5105 in the update target interface unit 5010.

The memory controller 5125, which received the instruction, transfers the update data to the external interface 5100 of the update target interface unit 5010 (5783). The external interface 5100, which received the update data, writes the update data to the hard drives 5002 (5784). In this way, the storage system 5001 writes data to the cache memory module and also writes data to the hard drives 5002, in response to the data write request from the server 5003.

In the storage system 5001 according to the present embodiment, the management console 5065 is connected to the storage system 5001, and from the management console 5065, the system configuration information is set, system startup/shutdown is controlled, the utilization, operating status and the error information in each unit of the system are corrected, the blockade/replacement process of the error portion is performed when errors occur, and the control program is updated. Here the system configuration information, utilization, operating status and error information are stored in the control information memory module 5127 in the memory unit 5021. In the storage system 5001, an internal LAN (Local Area Network) 5091 is installed. Each processor unit 5081 has a LAN interface, and the management console 5065 and each processor unit 5081 are connected via the internal LAN 5091. The management console 5065 accesses each processor unit 5081 via the internal LAN, and executes the above mentioned various processes.

Figure 34:
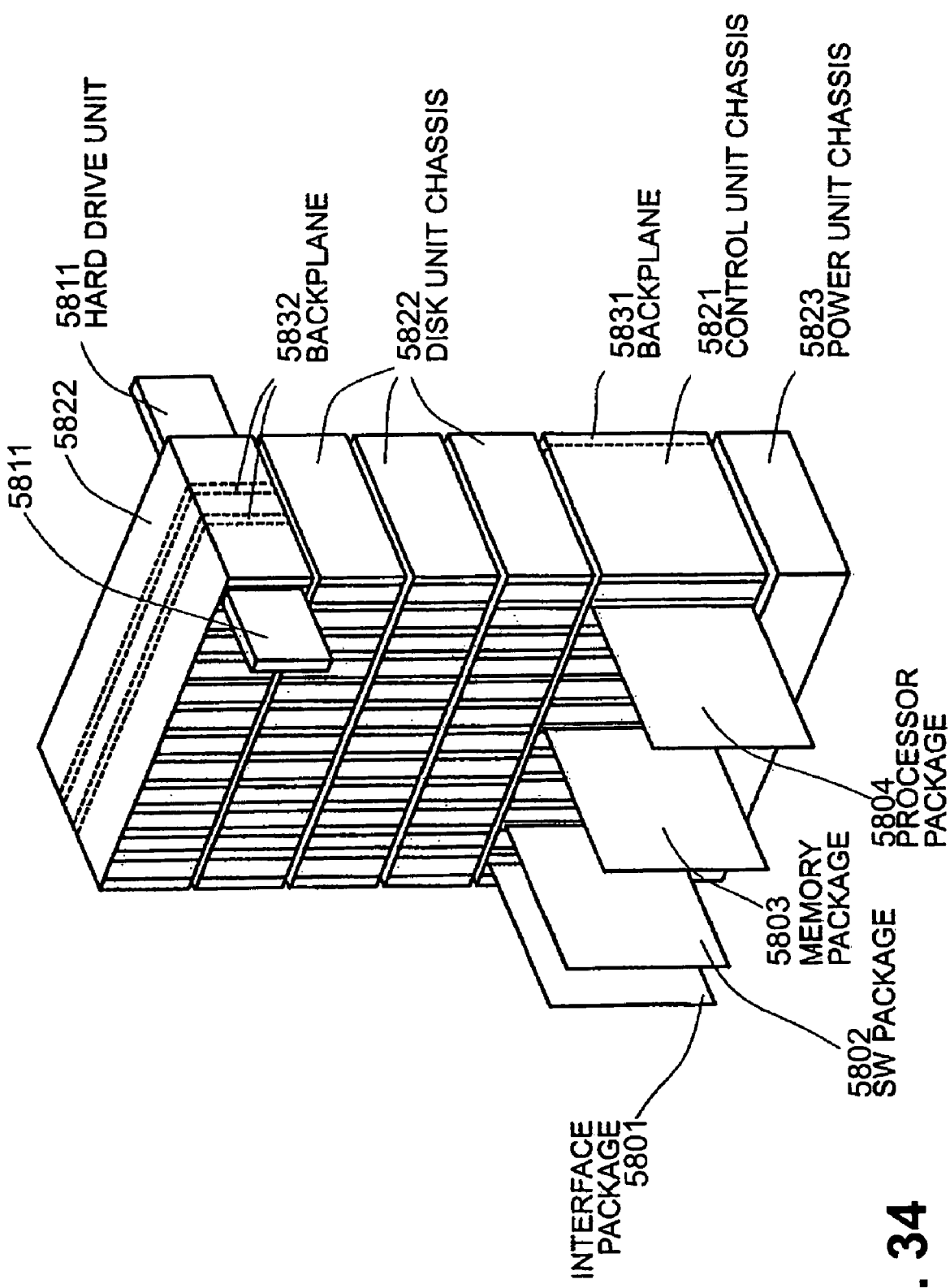
FIG. 34 is a diagram depicting an example of the storage system mounted in the rack.
Figure 35:
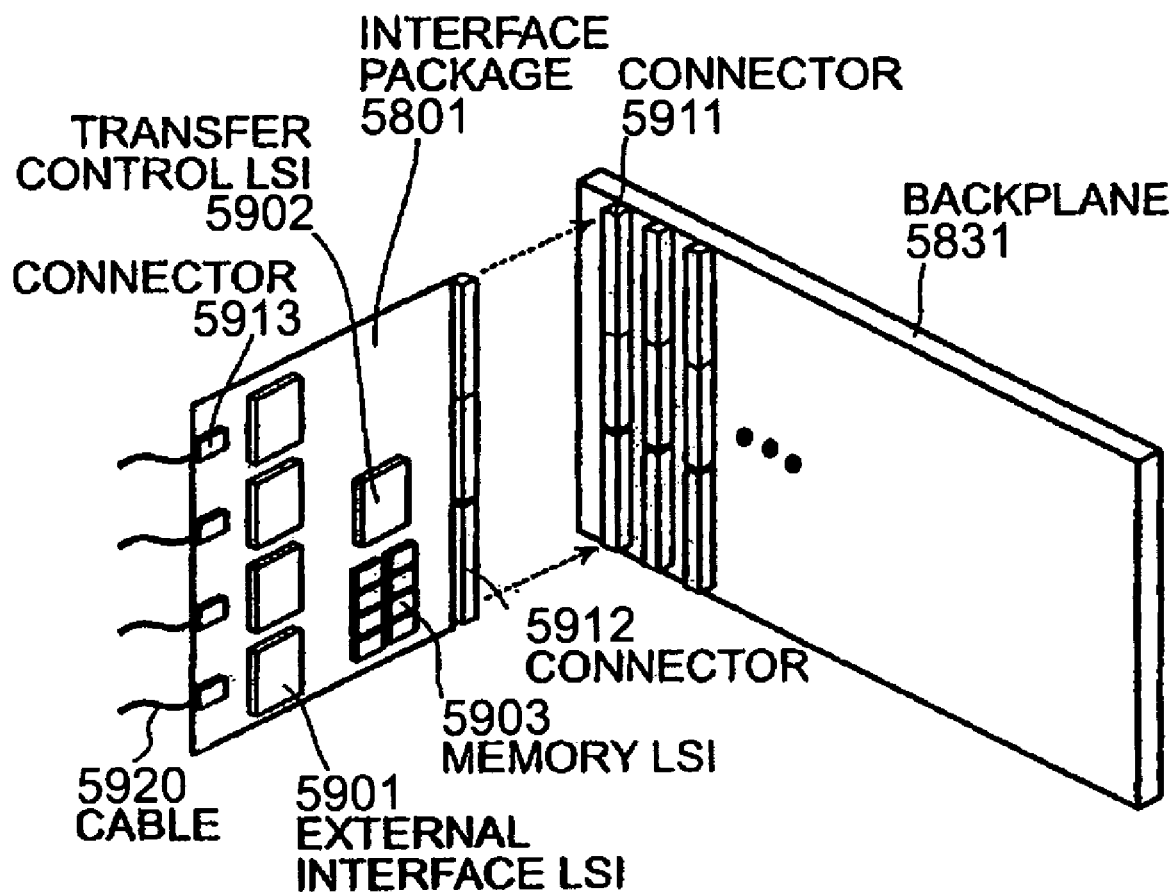
FIG. 35 is a diagram depicting a configuration example of the package and the backplane.

FIG. 34 and FIG. 35 are diagrams depicting configuration examples of mounting the storage system 5001 with the configuration according to the present embodiment in a rack. In the rack to be a frame of the storage system 5001, a power unit chassis 5823, control unit chassis 5821 and a disk unit chassis 5822 are mounted. In these chassis, the above mentioned units are packaged respectively. On one surface of the control unit chassis 5821, a backplane 5831, where signal lines connecting the interface unit 5010, switch unit 5051, processor unit 5081 and memory unit 5021 are printed, is disposed (FIG. 35). The backplane 5831 is comprised of a plurality of layers of circuit boards where signal lines are printed on each layer. The backplane 5831 has a connector 5911 to which an interface package 5801, SW package 5802 and memory package 5803 or processor package 5804 are connected. The signal lines on the backplane 5831 are printed so as to be connected to predetermined terminals in the connector 5911 to which each package is connected. Signal lines for power supply for supplying power to each package are also printed on the backplane 5831.

The interface package 5801 is comprised of a plurality of layers of circuit boards where signal lines are printed on each layer. The interface package 5801 has a connector 5912 to be connected to the backplane 5831. On the circuit board of the interface package 5801, signal lines for connecting a signal line between the external interface 5100 and the transfer control unit 5105 in the configuration of the interface unit 5010 shown in FIG. 28, a signal line between the memory module 5123 and the transfer control unit 5105, and a signal line for connecting the transfer control unit 5105 to the switch unit 5051 are printed. Also on the circuit board of the interface package 5801, an external interface LSI 5901 for playing the role of the external interface 5100, a transfer control LSI for playing a role of the transfer control unit 5105, and a plurality of memory LSIs 5903 constituting the memory module 5123 are packaged according to the wiring on the circuit board.

A power supply for driving the external interface LSI 5901, transfer control LSI 5902 and memory LSI 5903 and a signal line for a clock are also printed on the circuit board of the interface package 5801. The interface package 5801 also has a connector 5913 for connecting the cable 5920, which connects the server 5003 or the hard drives 5002 and the external interface LSI 5901, to the interface package 5801. The signal line between the connector 5913 and the external interface LSI 5901 is printed on the circuit board.

The SW package 5802, memory package 5803 and processor package 5804 have configurations basically the same as the interface package 5801. In other words, the above mentioned LSIs which play roles of each unit are mounted on the circuit board, and signal lines which interconnect them are printed on the circuit board. Other packages, however, do not have connectors 5913 and signal lines to be connected thereto, which the interface package 5801 has.

On the control unit chassis 5821, the disk unit chassis 5822 for packaging the hard drive unit 5811, where a hard drive 5002 is mounted, is disposed. The disk unit chassis 5822 has a backplane 5832 for connecting the hard disk unit 5811 and the disk unit chassis. The hard disk unit 5811 and the backplane 5832 have connectors for connecting to each other. Just like the backplane 5831, the backplane 5832 is comprised of a plurality of layers of circuit boards where signal lines are printed on each layer. The backplane 5832 has a connector to which the cable 5920, to be connected to the interface package 5801, is connected. The signal line between this connector and the connector to connect the disk unit 5811 and the signal line for supplying power are printed on the backplane 5832. A dedicated package for connecting the cable 5920 may be disposed, so as to connect this package to the connector disposed on the backplane 5832.

Under the control unit chassis 5821, a power unit chassis 5823, where a power unit for supplying power to the entire storage system 5001 and a battery unit are packaged, is disposed. These chassis are housed in a 19 inch rack (not illustrated). The positional relationship of the chassis is not limited to the illustrated example, but the power unit chassis may be mounted on the top, for example.

The storage system 5001 may be constructed without hard drives 5002. In this case, the hard drives 5002, which exist separately from the storage system 5001, and another storage system 5001 and storage system 5001, are connected via the connection cable 5920 disposed in the interface package 5801. Also in this case, the hard drives 5002 are packaged in the disk unit chassis 5822, and the disk unit chassis 5822 is packaged in the 19 inch rack dedicated to the disk unit chassis. The storage system 5001, which has the hard drives 5002, may be connected to another storage system 5001. In this case as well, the storage system 5001 and another storage system 5001 are interconnected via the connection cable 5920 disposed in the interface package 5801.

In the above description, the interface unit 5010, processor unit 5081, memory unit 5021 and switch unit are mounted in separate packages respectively, but it is also possible to mount the switch unit 5051, processor unit 5081 and memory unit 5021, for example, in one package together. It is also possible to mount all of the interface unit 5010, switch unit 5051, processor unit 5081 and memory unit 5021 in one package. In this case, the sizes of the packages are different, and the width and height of the control unit chassis 5821 shown in FIG. 38 must be changed accordingly. In FIG. 34, the package is mounted in the control unit chassis 5821 in a format vertical to the floor face, but it is also possible to mount the package in the control unit chassis 5821 in a format horizontal with respect to the floor surface. It is arbitrary which combination of the above mentioned interface unit 5010, processor unit 5081, memory unit 5021 and switch unit 5051 will be mounted in one package, and the above mentioned packaging combination is an example.

The number of packages that can be mounted in the control unit chassis 5821 is physically determined depending on the width of the control unit chassis 5821 and the thickness of each package. On the other hand, as the configuration in FIG. 22 shows, the storage system 5001 has a configuration where the interface unit 5010, processor unit 5081 and memory unit 5021 are interconnected via the switch unit 5051, so the number of each unit can be freely set according to the system scale, the number of connected servers, the number of connected hard drives and the performance to be required. Therefore the number of interface packages 5801, memory packages 5803 and processor packages 5804 can be freely selected and mounted, where the upper limit is the number when the number of SW packages is subtracted from the number of packages that can be mounted in the control unit chassis 5821, by sharing the connector with the backplane 5831 disposed on the interface package 5801, memory package 5803 and processor package 5804 shown in FIG. 34, and by predetermining the number of SW packages 5802 to be mounted and the connector on the backplane 5831 for connecting the SW package 5802. This makes it possible to flexibly construct a storage system 5001 according to the system scale, number of connected servers, number of connected hard drives and the performance that the user demands.

Figure 40:
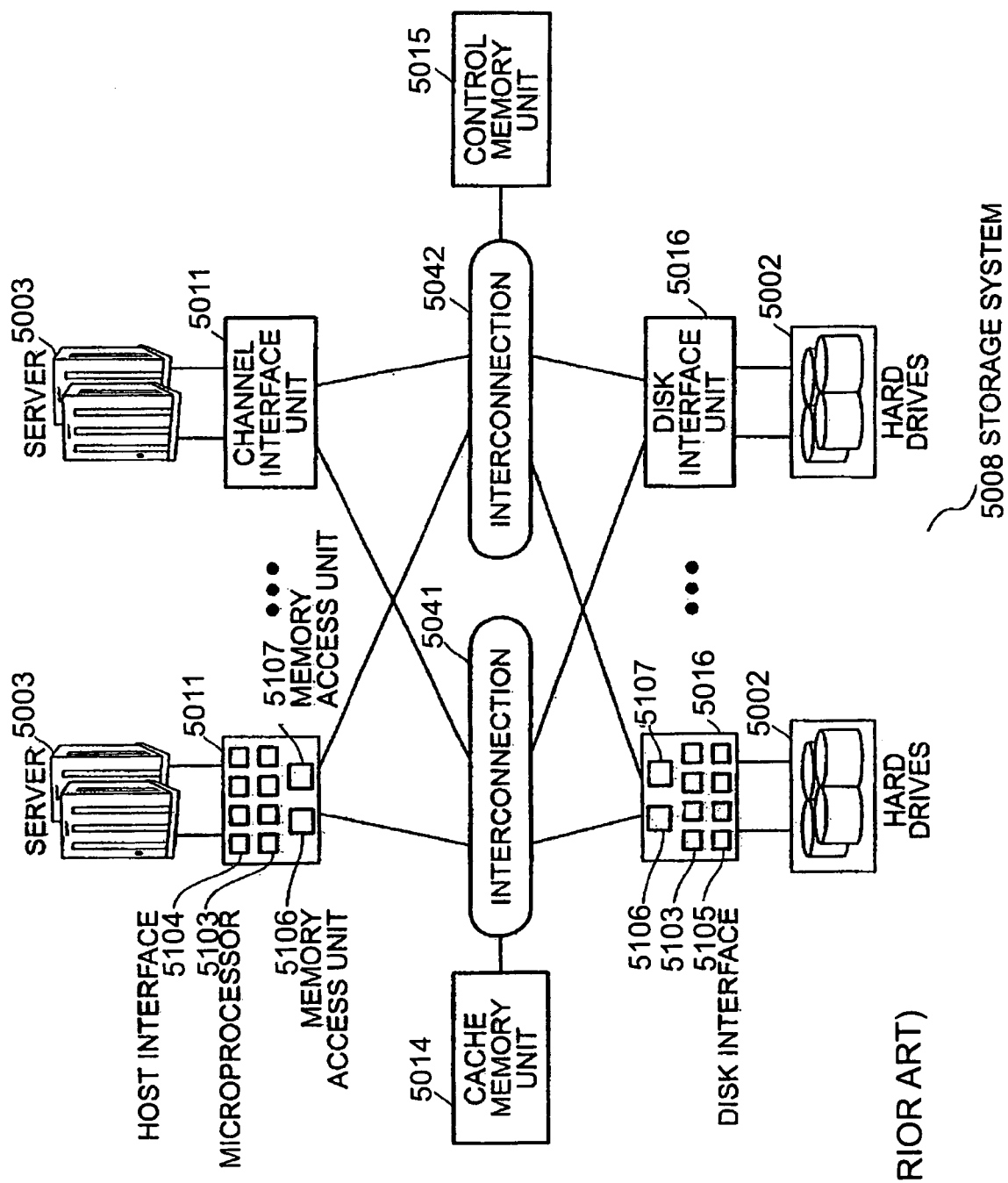
FIG. 40 is a diagram depicting a configuration example of a conventional storage system.
Figure 41:
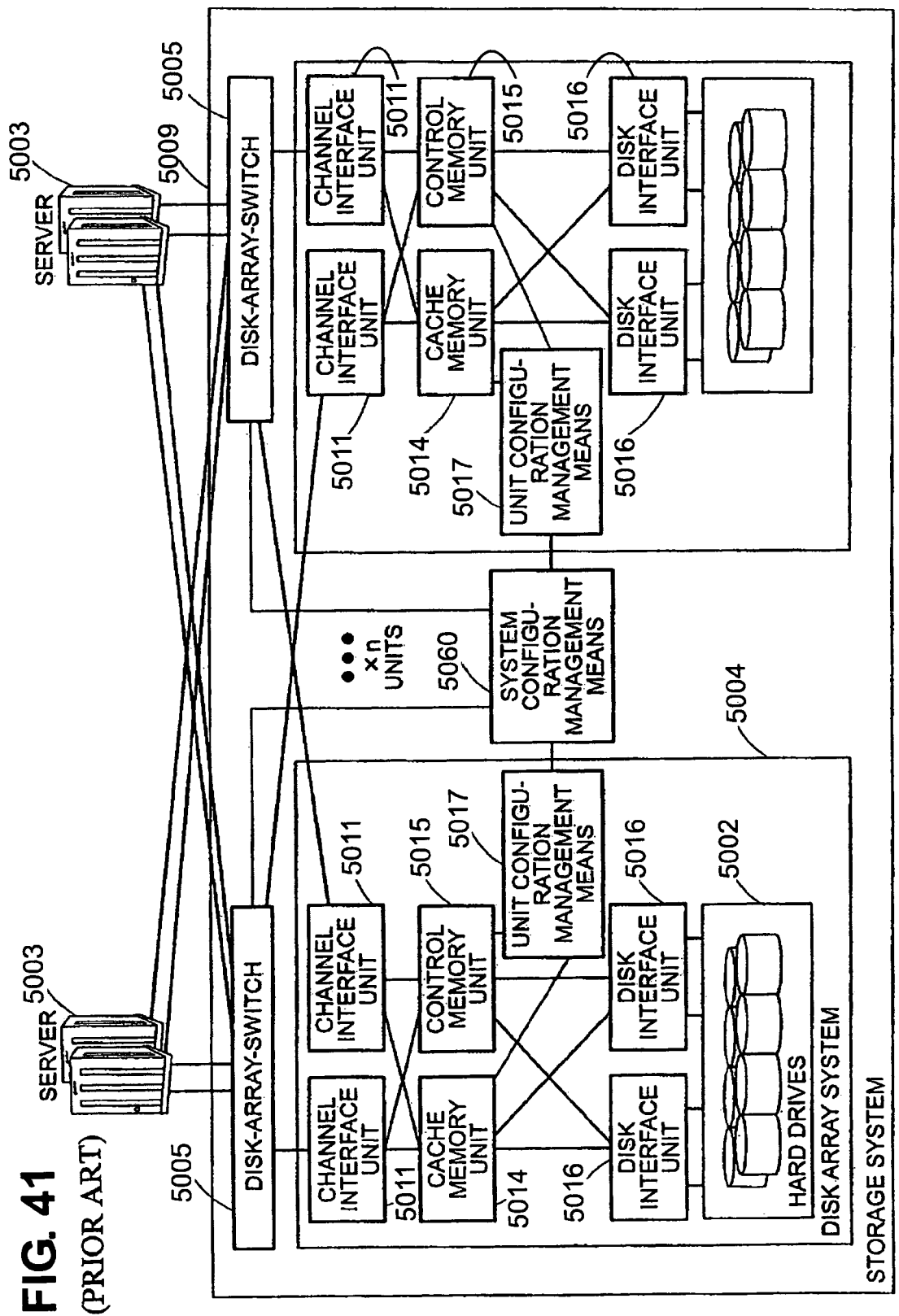
FIG. 41 is a diagram depicting another configuration example of a conventional storage system.

The present embodiment is characterized in that the microprocessor 5103 is separated from the channel interface unit 5011 and the disk interface unit 5016 in the prior art shown in FIG. 40, and is made to be independent as the processor unit 5081. This makes it possible to increase/decrease the number of microprocessors independently from the increase/decrease in the number of interfaces connected with the server 5003 or hard drives 5002, and to provide a storage system with a flexible configuration that can flexibly support the user demands, such as the number of connected servers 5003 and hard drives 5002, and the system performance.

Also according to the present embodiment, the process which the microprocessor 5103 in the channel interface unit 5011 used to execute and the process which the microprocessor 5103 in the disk interface unit 5016 used to execute during a read or write of data are integratedly executed by one microprocessor 5101 in the processor unit 5081 shown in FIG. 21. This makes it possible to decrease the overhead of the transfer of processing between the respective microprocessors 5103 of the channel interface unit and the disk interface unit, which was required in the prior art.

By two microprocessors 5101 of the processor unit 5081 or two microprocessors 5101, each of which is selected from different processor units 5081, one of the two microprocessors 5101 may execute processing at the interface unit 5010 with the server 5003 side, and the other may execute processing at the interface unit 5010 with the hard drives 5002 side.

If the load of the processing at the interface with the server 5003 side is greater than the load of the processing at the interface with the hard drives 5002 side, more processing power of the microprocessor 5101 (e.g., number of processors, utilization of one processor) can be allocated to the former processing. If the degree of load are reversed, more processing power of the microprocessor 5101 can be allocated to the latter processing. Therefore the processing power (resource) of the microprocessor can be flexibly allocated depending on the degree of the load of each processing in the storage system.

Figure 25:
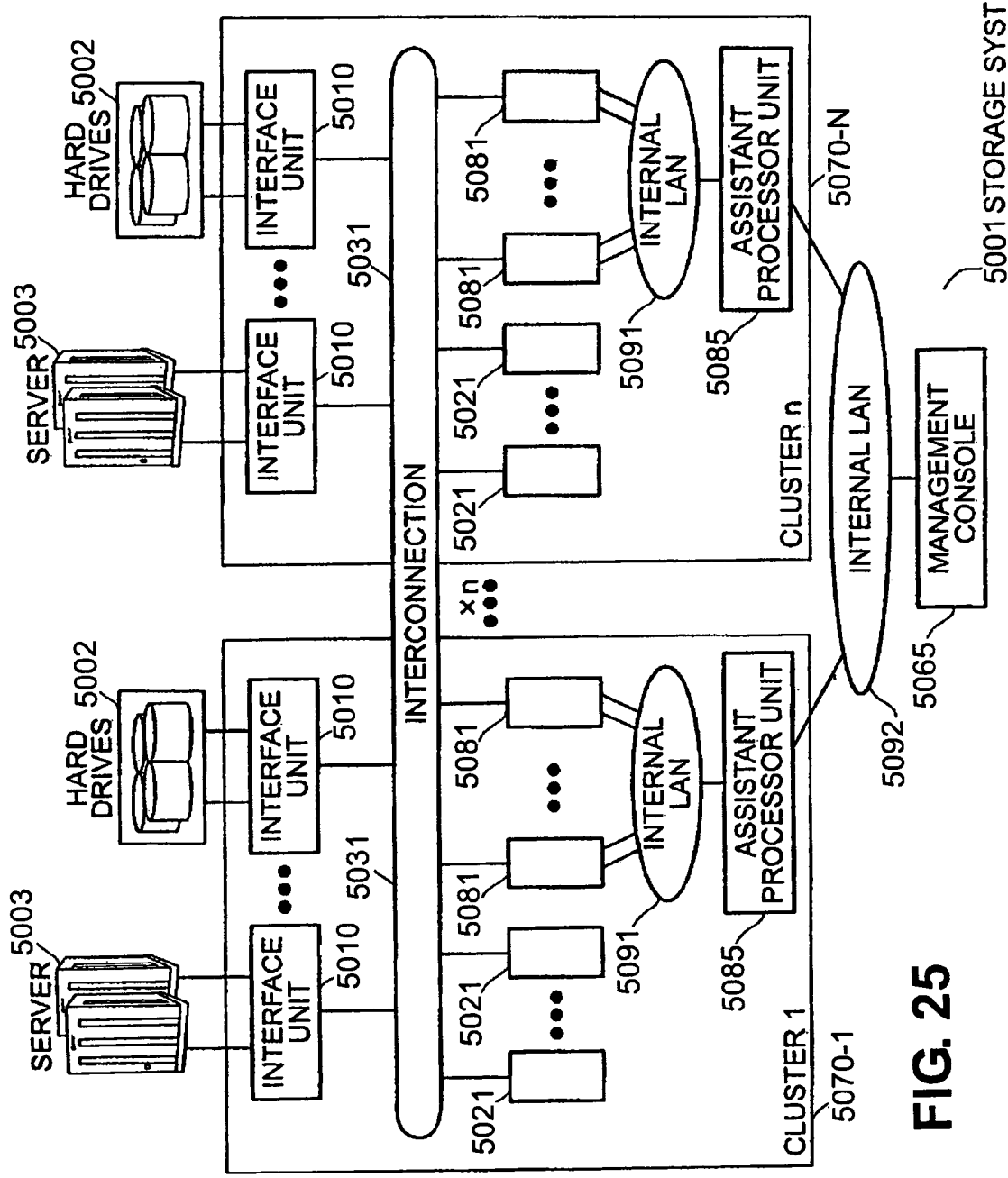
FIG. 25 is a diagram depicting a configuration example of the storage system.

FIG. 25 is a diagram depicting a configuration example of the second embodiment. The storage system 5001 has a configuration where a plurality of clusters 5070-1 to 5070-n are interconnected with the interconnection 5031. One cluster 5070 has a predetermined number of interface units 5010 to which the server 5003 and hard drives 5002 are connected, memory units 5021, and processor units 5081, and a part of the interconnection. The number of each unit that one cluster 5070 has is arbitrary. The interface units 5010, memory units 5021 and processor units 5081 of each cluster 5070 are connected to the interconnection 5031. Therefore each unit of each cluster 5070 can exchange packets with each unit of another cluster 5070 via the interconnection 5031. Each cluster 5070 may have hard drives 5002. So in one storage system 5001, clusters 5070 with hard drives 5002 and clusters 5070 without hard drives 5002 may coexist. Or all the clusters 5070 may have hard drives.

Figure 26:
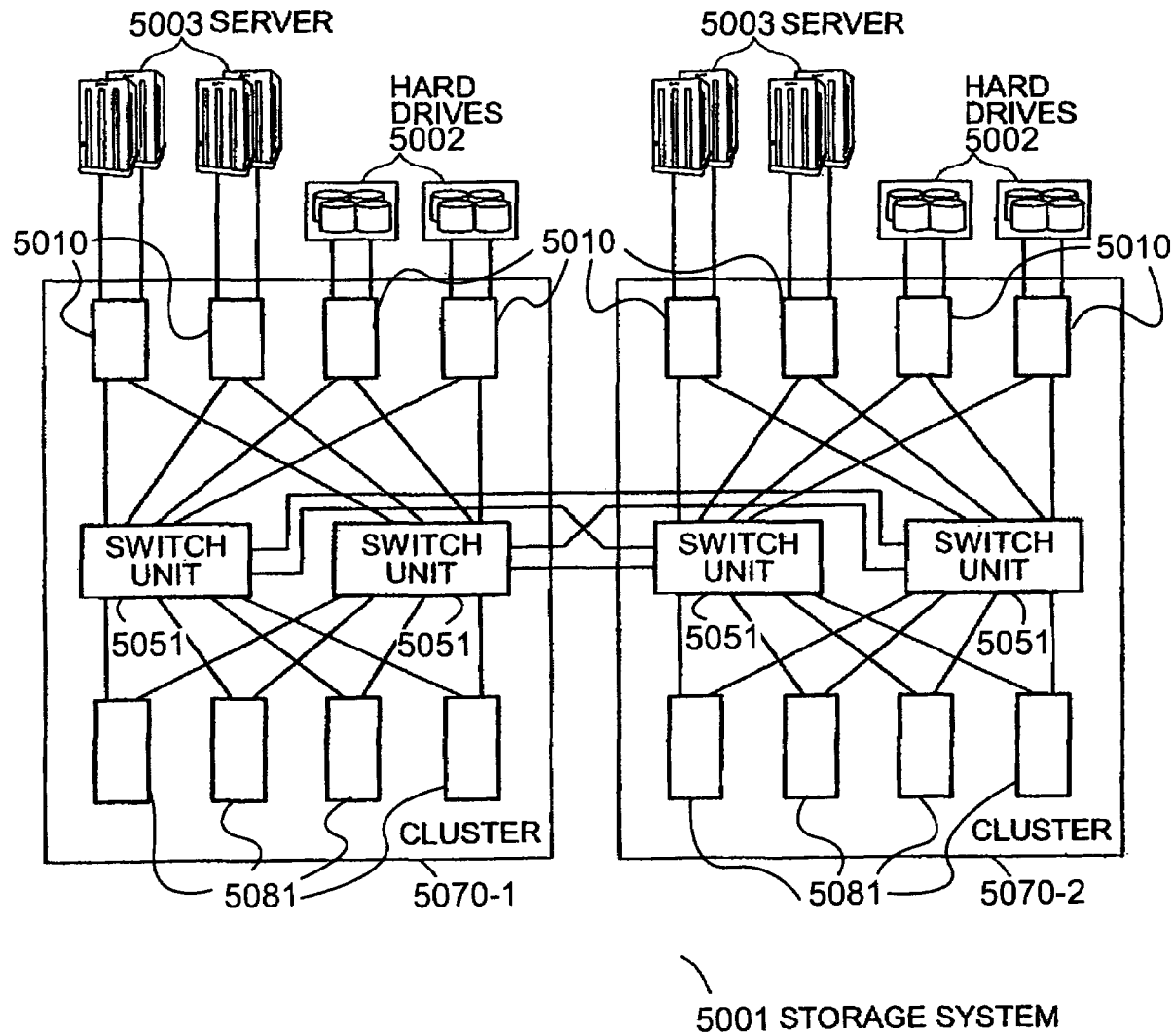
FIG. 26 is a diagram depicting a detailed configuration example of the interconnection of the storage system.

FIG. 26 is a diagram depicting a concrete configuration example of the interconnection 5031. The interconnection 5031 is comprised of four switch units 5051 and communication paths for connecting them. These switches 5051 are installed inside each cluster 5070. The storage system 5001 has two clusters 5070. One cluster 5070 is comprised of four interface units 5010, two processor units 5081 and memory units 5021. As mentioned above, one cluster 5070 includes two out of the switches 5051 of the interconnection 5031.

The interface units 5010, processor units 5081 and memory units 5021 are connected with two switch units 5051 in the cluster 5070 by one communication path respectively. This makes it possible to secure two communication paths between the interface unit 5010, processor unit 5081 and memory 5021, and to increase reliability.

To connect the cluster 5070-1 and cluster 5070-2, one switch unit 5051 in one cluster 5070 is connected with the two switch units 5051 in another cluster 5070 via one communication path respectively. This makes it possible to access extending over clusters, even if one switch unit 5051 fails or if a communication path between the switch units 5051 fails, which increases reliability.

Figure 27:
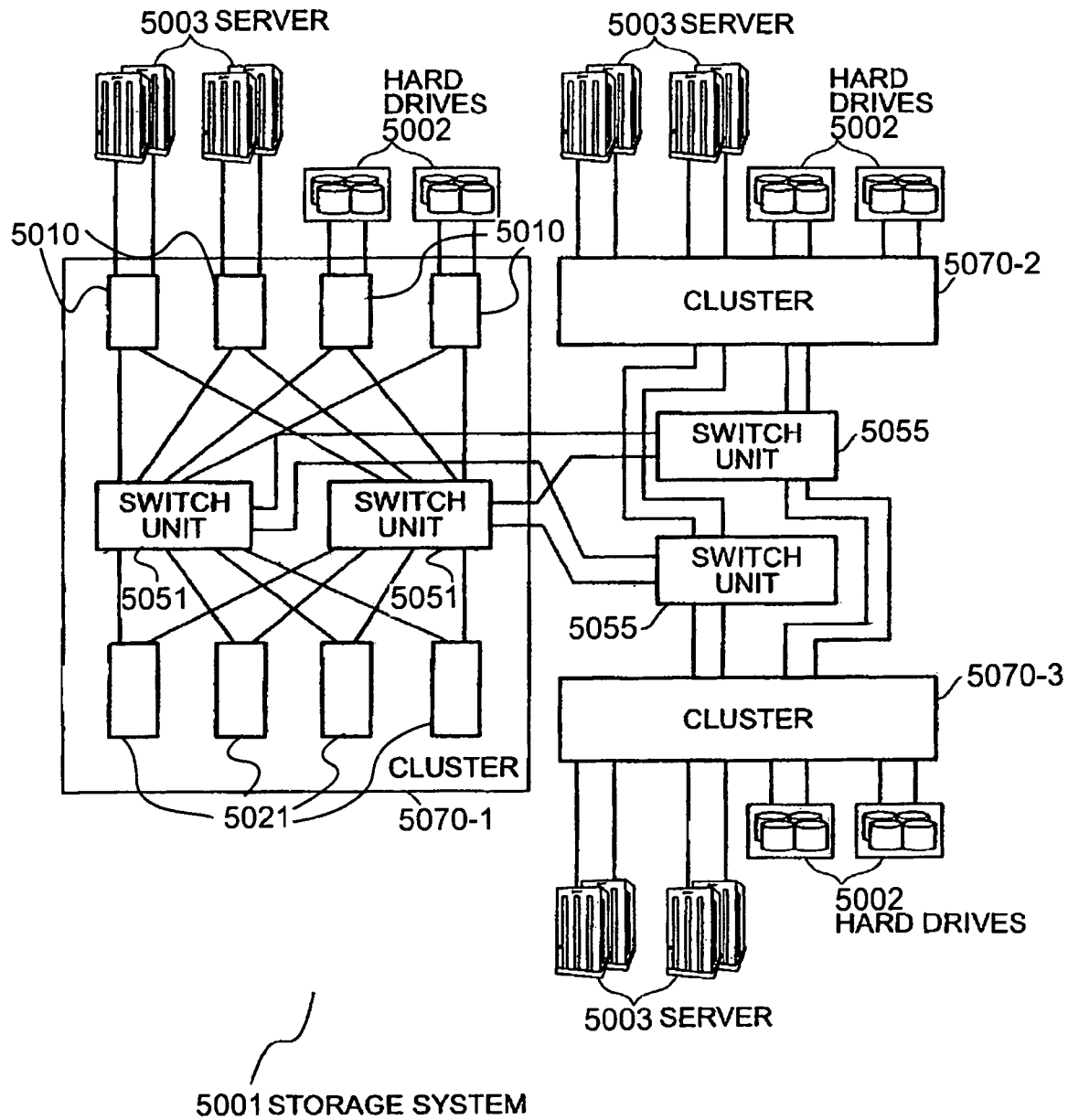
FIG. 27 is a diagram depicting another detailed configuration example of the interconnection of the storage system.

FIG. 27 is a diagram depicting an example of different formats of connection between clusters in the storage system 5001. As FIG. 27 shows, each cluster 5070 is connected with a switch unit 5055 dedicated to connection between clusters. In this case, each switch unit 5051 of the clusters 5070-1 to 5070-3 is connected to two switch units 5055 by one communication path respectively. This makes it possible to access extending over clusters, even if one switch unit 5055 fails or if the communication path between the switch unit 5051 and the switch unit 5055 fails, which increases reliability.

Also in this case, the number of connected clusters can be increased compared with the configuration in FIG. 26. In other words, the number of communication paths which can be connected to the switch unit 5051 is physically limited. But by using the dedicated switch 5055 for connection between clusters, the number of connected clusters can be increased compared with the configuration in FIG. 26.

In the configuration of the present embodiment as well, the microprocessor 5103 is separated from the channel interface unit 5011 and the disk interface unit 5016 in the prior art shown in FIG. 40, and is made to be independent in the processor unit 5081. This makes it possible to increase/decrease the number of microprocessors independently from the increase/decrease of the number of connected interfaces with the server 5003 or hard drives 5002, and can provide a storage system with a flexible configuration which can flexibly support user demands for the number of connected servers 5003 and hard drives 5002, and for system performance.

In the present embodiment as well, data read and write processing, the same as the first embodiment, are executed. This means that in the present embodiment as well, processing which used to be executed by the microprocessor 5103 in the channel interface unit 5011 and processing which used to be executed by the microprocessor 5103 in the disk interface unit 5016 during data read or write are integrated and processed together by one microprocessor 5101 in the processor unit 5081 in FIG. 21. This makes it possible to decrease the overhead of the transfer of processing between each microprocessor 5103 of the channel interface unit and the disk interface unit respectively, which is required in the prior art.

When data read or write is executed according to the present embodiment, data may be written or read from the server 5003 connected to one cluster 5070 to the hard drives 5002 of another cluster 5070 (or a storage system connected to another cluster 5070). In this case as well, read and write processing described in the first embodiment are executed. In this case, the processor unit 5081 of one cluster can acquire information to access the memory unit 5021 of another cluster 5070 by making the memory space of the memory unit 5021 of an individual cluster 5070 to be one logical memory space in the entire storage system 5001. The processor unit 5081 of one cluster can instruct the interface unit 5010 of another cluster to transfer data.

The storage system 5001 manages the volume comprised of hard drives 5002 connected to each cluster in one memory space so as to be shared by all the processor units. In the present embodiment, just like the first embodiment, the management console 5065 is connected to the storage system 5001, and the system configuration information is set, the startup/shutdown of the system is controlled, the utilization of each unit in the system, operation status and error information is controlled, the blockage/replacement processing of the error portion is performed when errors occur, and the control program is updated from the management console 5065. Here, configuration information, utilization, operating status and error information of the system are stored in the control information memory module 5127 in the memory unit 5021. In the case of the present embodiment, the storage system 5001 is comprised of a plurality of clusters 5070, so a board which has an assistant processor (assistant processor unit 5085) is disposed for each cluster 5070. The assistant processor unit 5085 plays a role of transferring the instructions from the management console 5065 to each processor unit 5081 or transferring the information collected from each processor unit 5081 to the management console 5065. The management console 5065 and the assistant processor unit 5085 are connected via the internal LAN 5092. In the cluster 5070, the internal LAN 5091 is installed, and each processor unit 5081 has a LAN interface, and the assistant processor unit 5085 and each processor unit 5081 are connected via the internal LAN 5091. The management console 5065 accesses each processor unit 5081 via the assistant processor unit 5085, and executes the above mentioned various processes. The processor unit 5081 and the management console 5065 may be directly connected via the LAN, without the assistant processor.

Figure 37:
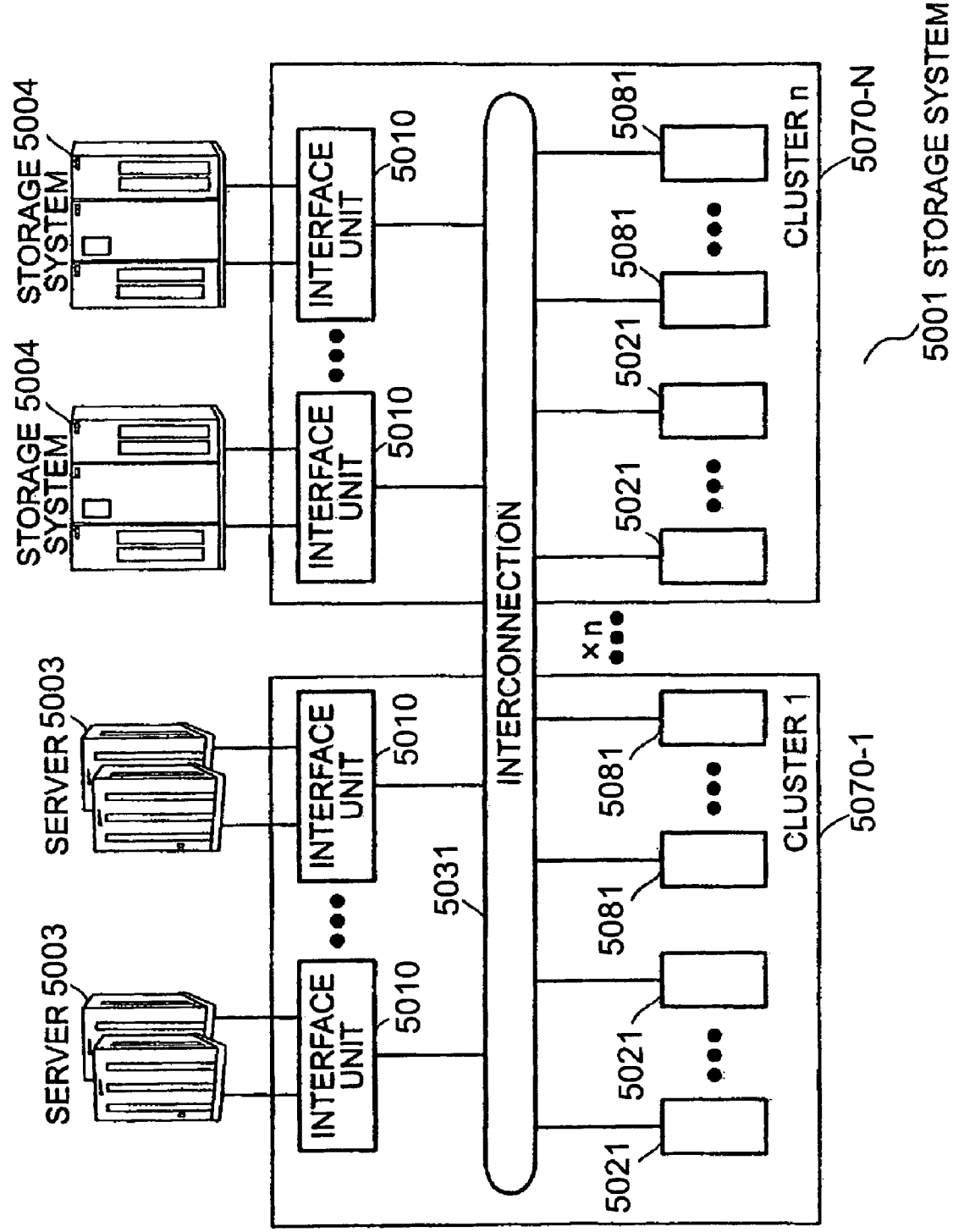
FIG. 37 is a diagram depicting a connection configuration example of the interface unit and the external unit.

FIG. 37 is a variant form of the present embodiment of the storage system 5001. As FIG. 37 shows, another storage system 5004 is connected to the interface unit 5010 for connecting the server 5003 or hard drives 5002. In this case, the storage system 5001 stores the information on the storage area (hereafter also called "volume") provided by another storage system 5004 and data to be stored in (or read from) another storage system 5004 in the control memory module 5126 and cache memory module 5127 in the cluster 5070, where the interface unit 5010, to which another storage system 5004 is connected, exists.

The microprocessor 5101 in the cluster 5070, to which another storage system 5004 is connected, manages the volume provided by another storage system 5004 based on the information stored in the control information memory module 5127. For example, the microprocessor 5101 allocates the volume provided by another storage system 5004 to the server 5003 as a volume provided by the storage system 5001. This makes it possible for the server 5003 to access the volume of another storage system 5004 via the storage system 5001.

In this case, the storage system 5001 manages the volume comprised of local hard drives 5002 and the volume provided by another storage system 5004 collectively.

In FIG. 37, the storage system 5001 stores a table which indicates the connection relationship between the interface units 5010 and servers 5003 in the control memory module 5127 in the memory unit 5021. And the microprocessor 5101 in the same cluster 5070 manages the table. Specifically, when the connection relationship between the servers 5003 and the host interfaces 5100 is added or changed, the microprocessor 5101 changes (updates, adds or deletes) the content of the above mentioned table. This makes communication and data transfer possible via the storage system 5001 between a plurality of servers 5003 connected to the storage system 5001. This can also be implemented in the first embodiment.

In FIG. 37, when the server 5003, connected to the interface unit 5010, transfers data with the storage system 5004, the storage system 5001 transfers data between the interface unit 5010 to which the server 5003 is connected and the interface unit 5010 to which the storage system 5004 is connected via the interconnection 5031. At this time, the storage system 5001 may cache the data to be transferred in the cache memory module 5126 in the memory unit 5021. This improves the data transfer performance between the server 5003 and the storage system 5004.

Figure 38:
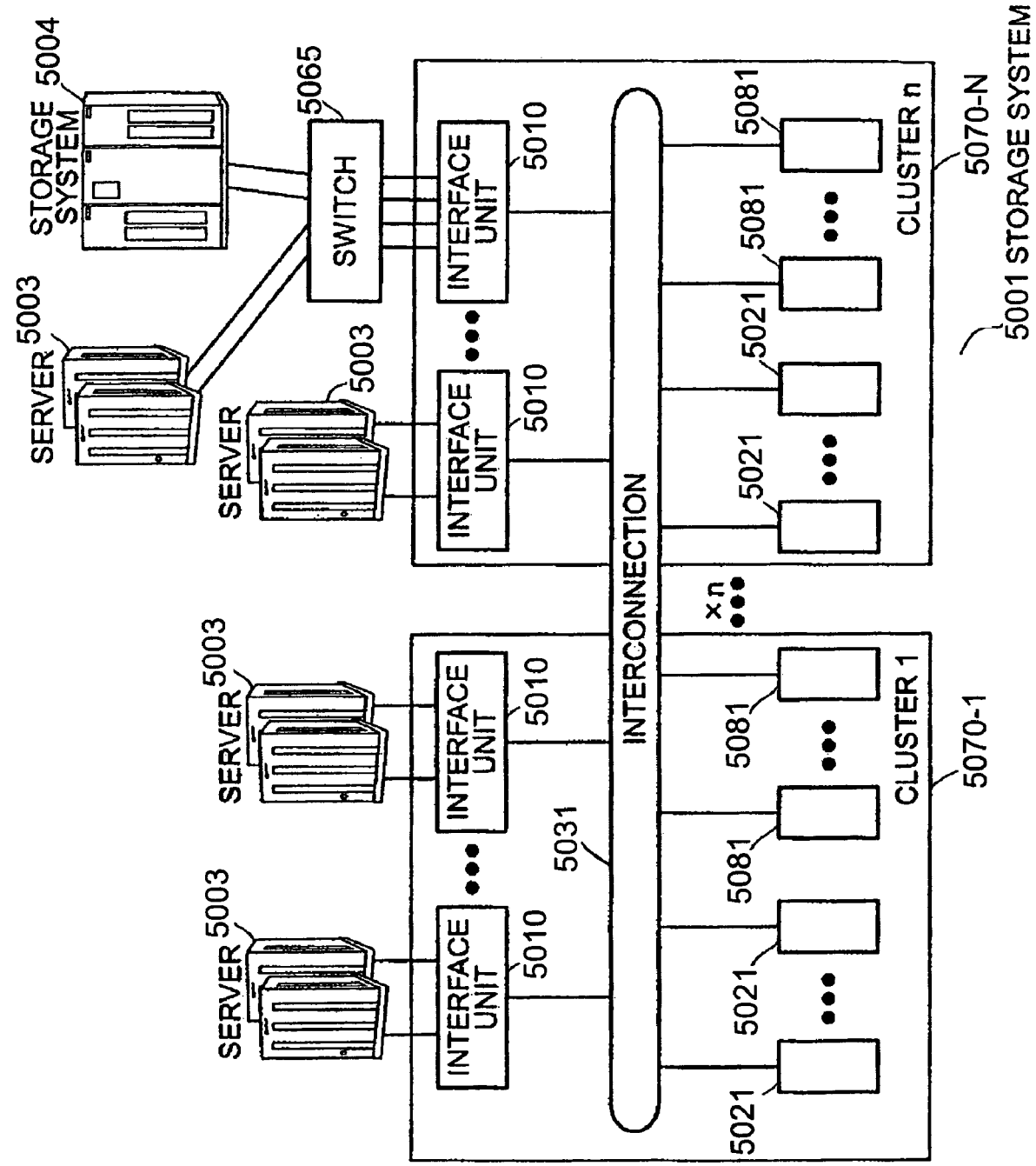
FIG. 38 is a diagram depicting another connection configuration example of the interface unit and the external unit.

In the present embodiment, the configuration of connecting the storage system 5001 and the server 5003 and another storage system 5004 via the switch 5065, as shown in FIG. 38, is possible. In this case, the server 5003 accesses the server 5003 and another storage system 5004 via the external interface 5100 in the interface unit 5010 and the switch 5065. This makes it possible to access from the server 5003 connected to the storage system 5001 to the server 5003 and another storage system 5004, which are connected to a switch 5065 or a network comprised of a plurality of switches 5065.

Figure 39:
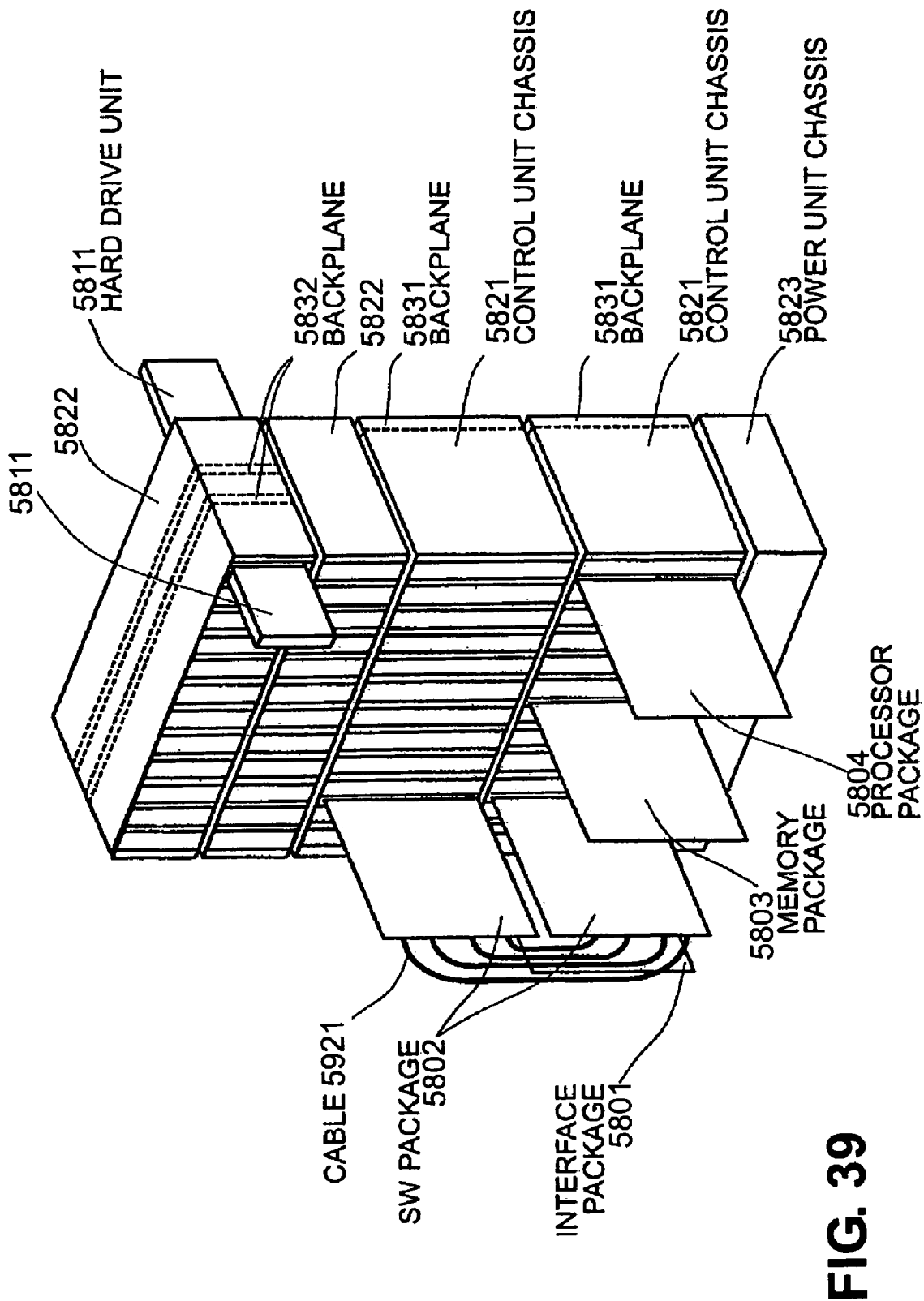
FIG. 39 is a diagram depicting another example of the storage system mounted in the rack.

FIG. 39 is a diagram depicting a configuration example when the storage system 5001, with the configuration shown in FIG. 26, is mounted in a rack. The mounting configuration is basically the same as the mounting configuration in FIG. 34. In other words, the interface unit 5010, processor unit 5081, memory unit 5021 and switch unit 5051 are mounted in the package and connected to the backplane 5831 in the control unit chassis 5821.

In the configuration in FIG. 26, the interface units 5010, processor units 5081, memory units 5021 and switch units 5051 are grouped as a cluster 5070. So one control unit chassis 5821 is prepared for each cluster 5070. Each unit of one cluster 5070 is mounted in one control unit chassis 5821. In other words, packages of different clusters 5070 are mounted in a different control unit chassis 5821. Also for the connection between clusters 5070, the SW packages 5802 mounted in different control unit chassis are connected with the cable 5921, as shown in FIG. 39. In this case, the connector for connecting the cable 5921 is mounted in the SW package 5802, just like the interface package 5801 shown in FIG. 39.

The number of clusters mounted in one control unit chassis 5821 may be one or zero. And the number of clusters to be mounted in one control unit chassis 5821 may be 2.

In the storage system 5001 with the configuration in embodiments 1 and 2, commands received by the interface unit 5010 are decoded by the processor unit 5081. However, there are many protocols followed by the commands to be exchanged between the server 5003 and the storage system 5001, so it is impractical to perform the entire protocol analysis process by a general processor. Protocols here includes the file I/O (input/output) protocol using a file name, iSCSI (internet Small Computer System interface) protocol and the protocol used when a large computer (main frame) is used as the server (channel command word: CCW), for example.

So in the present embodiment, a dedicated processor for processing these protocols at high-speed is added to all or a part of the interface units 5010 of the embodiments 1 and 2.

Figure 33:
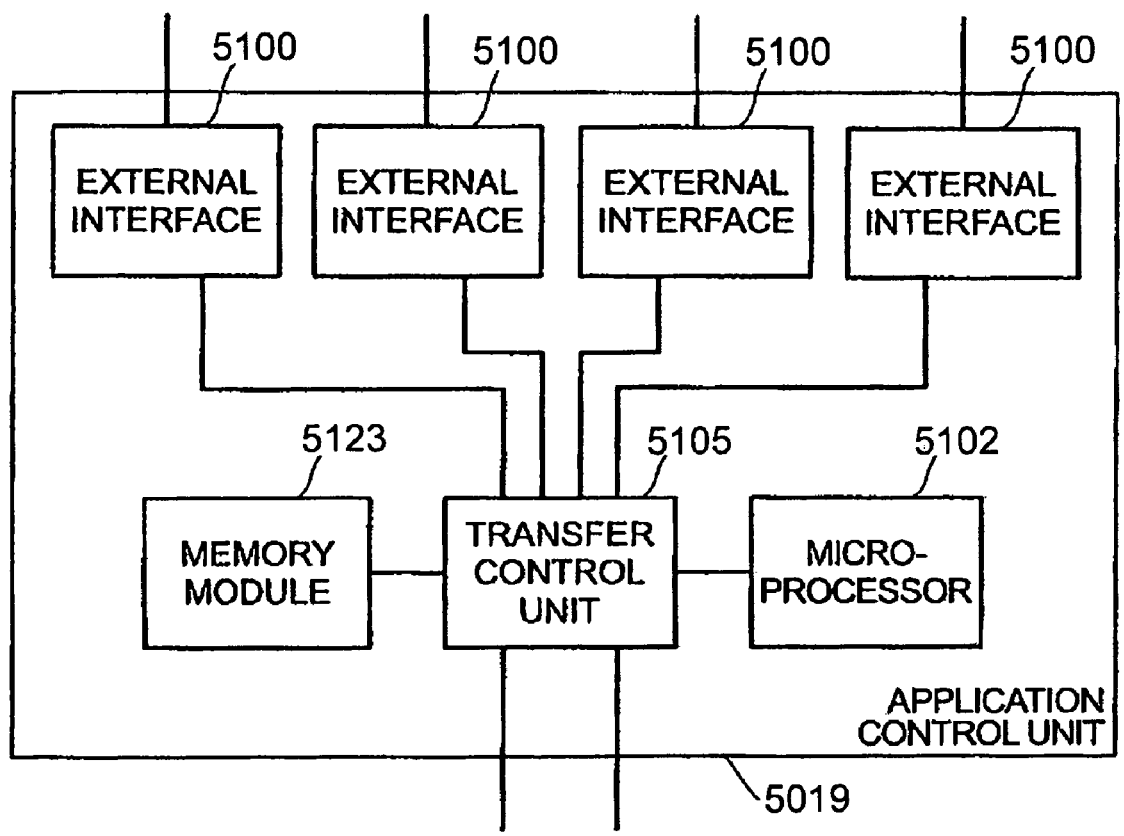
FIG. 33 is a diagram depicting a configuration example of the application control unit.

FIG. 33 is a diagram depicting an example of the interface unit 5010, where the microprocessor 5102 is connected to the transfer control unit 5105 (hereafter this interface unit 5010 is called "application control unit 5019").

The storage system 5001 of the present embodiment has the application control unit 5019, instead of all or a part of the interface units 5010 of the storage system 5001 in the embodiments 1 and 2. The application control unit 5019 is connected to the interconnection 5031. Here the external interfaces 5100 of the application control unit 5019 are assumed to be external interfaces which receive only the commands following the protocol to be processed by the microprocessor 5102 of the application control unit 5019. One external interface 5100 may receive a plurality of commands following different protocols.

The microprocessor 5102 executes the protocol transformation process together with the external interface 5100. Specifically, when the application control unit 5019 receives an access request from the server 5003, the microprocessor 5102 executes the process for transforming the protocol of the command received by the external interface into the protocol for internal data transfer.

It is also possible to use the interface unit 5010 as is, instead of preparing a dedicated application control unit 5019, and one of the microprocessors 5101 in the processor unit 5081 is used dedicated for protocol processing.

The data read and the data write process in the present embodiment are performed in the same way as the first embodiment. In the first embodiment, however, the interface unit 5010, which received the command, transfers it to the processor unit 5081 without command analysis, but in the present embodiment, the command analysis process is executed in the application control unit 5019. And the application control unit 5019 transfers the analysis result (e.g., content of the command, destination of data) to the processor unit 5081. The processor unit 5081 controls data transfer in the storage system 5001 based on the analyzed information.

As another embodiment of the present invention, the following configuration is also possible. Specifically, it is a storage system comprising a plurality of interface units each of which has an interface with a computer or hard disk drive, a plurality of memory units each of which has a cache memory for storing data to be read from/written to the computer or the hard disk drive, and a control memory for storing control information of the system, and a plurality of processor units each of which has a microprocessor for controlling read/write data between the computer and the hard disk drive, wherein the plurality of interface units, the plurality of memory units and the plurality of processor units are interconnected with interconnection which further comprises at least one switch unit, and data or control information is transmitted/received between the plurality of interface units, the plurality of memory units, and the plurality of processor units via the interconnection.

In this configuration, the interface unit, memory unit or processor unit have a transfer control unit for controlling the transmission/reception of data or control information. In this configuration, the interface units are mounted on the first circuit board, the memory units are mounted on the second circuit board, the processor units are mounted on the third circuit board, and at least one switch unit is mounted on the fourth circuit board. Also this configuration also comprises at least one backplane on which signal lines connecting between the first to fourth circuit boards are printed, and which has the first connector for connecting the first to fourth circuit boards to the printed signal lines. Also in the present configuration, the first to fourth circuit boards further comprise a second connector to be connected to the first connector of the backplane.

In the above mentioned aspect, the total number of circuit boards that can be connected to the backplane may be n, and the number of fourth circuit boards and connection locations thereof may be predetermined, so that the respective number of first, second and third circuit boards to be connected to the backplane can be freely selected in a range where the total number of first to fourth circuit boards does not exceed n.

Another aspect of the present invention may have the following configuration. Specifically, this is a storage system comprising a plurality of clusters, further comprising a plurality of interface units each of which has an interface with a computer or a hard disk drive, a plurality of memory units each of which has a cache memory for storing data to be read from/written to the computer or the hard disk drive and a control memory for storing the control information of the system, and a plurality of processor units each of which has a microprocessor for controlling the read/write of data between the computer and the hard disk drive.

In this configuration, the plurality of interface units, plurality of memory units and plurality of processor units which each cluster has are interconnected extending over the plurality of clusters by an interconnection which is comprised of a plurality of switch units. By this, data or control information is transmitted/received between the plurality of interface units, plurality of memory units and plurality of processor units in each cluster via the interconnection. Also in this configuration, the interface unit, memory unit and processor unit are connected to the switch respectively, and further comprise a transfer control unit for controlling the transmission/reception of data or control information.

Also in this configuration, the interface units are mounted on the first circuit board, the memory units are mounted on the second circuit board, the processor units are mounted on the third circuit board, and at least one of the switch units is mounted on the fourth circuit board. And this configuration further comprises a plurality of backplanes on which signal lines for connecting the first to fourth circuit boards are printed and has a first connector for connecting the first to fourth circuit boards to the printed signal line, and the first to fourth circuit board further comprise a second connector for connecting the backplanes to the first connector. In this configuration, the cluster is comprised of a backplane to which the first to fourth circuit boards are connected. The number of clusters and the number of backplanes may be equal in the configuration.

In this configuration, the fourth circuit board further comprises a third connector for connecting a cable, and signal lines for connecting the third connector and switch units are wired on the fourth board. This allows connecting the clusters interconnecting the third connectors by a cable.

As another aspect of the present invention, the following configuration is also possible. Specifically, this is a storage system comprising an interface unit which has an interface with the computer or the hard disk drive, a memory unit which has a cache memory for storing data to be read from/written to the computer or the hard disk drive, and a control memory for storing control information of the system, and a processor unit which has a microprocessor for controlling the read/write of data between a computer and a hard disk drive, wherein the interface unit, memory unit and processor unit are interconnected by an interconnection, which further comprises at least one switch unit. In this configuration, data or control information is transmitted/received between the interface unit, memory unit and processor unit via the interconnection.

In this configuration, the interface unit is mounted on the first circuit board, and the memory unit, processor unit and switch unit are mounted on the fifth circuit board. This configuration further comprises at least one backplane on which signal lines for connecting the first and fifth circuit boards are printed, and which has a fourth connector for connecting the first and fifth circuit boards to the printed signal lines, wherein the first and fifth circuit boards further comprise a fifth connector for connecting to the fourth connector of the backplane.

As another aspect of the present invention, the following configuration is possible. Specifically, this is a storage system comprising an interface unit which has an interface with a computer or a hard disk drive, a memory unit which has a cache memory for storing data to be read from/written to the computer or the hard disk drive and a control memory for storing control information of the system, and a processor unit which has a microprocessor for controlling the read/write of data between the computer and the hard disk drive, wherein the interface unit, memory unit and processor unit are interconnected by an interconnection which further comprises at least one switch unit. In this configuration, the interface unit, memory unit, processor unit and switch unit are mounted on a sixth circuit board.

According to the present invention, a storage system with a flexible configuration which can support user demands for the number of connected servers, number of connected hard disks and system performance can be provided. The bottleneck of shared memory of the storage system is solved, a small scale configuration can be provided with low cost, and a storage system which can implement a scalability of cost and performance, from a small scale to a large scale configuration, can be provided.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A storage system comprising:
    a plurality of interface units each of which is to be coupled to a host computer or a hard disk drive;
    a memory unit for temporarily storing data to be transmitted among the interface units;
    a processor unit controlling data transmission between the interface units and the memory unit; and
    a hard disk drive coupled to one of the interface units, wherein each of the interface units, the memory unit and the processor unit includes a Direct Memory Access (DMA) controller controlling packet which controls multiplex communication transfer protocol to transmit data via an interconnection among the interface units, the memory unit, and the processor unit.

2. A storage system according to claim 1, wherein each DMA controller controls to insert a sequence number to a packet to be transmitted from the DMA controller to control a transmission order of the packet.

3. A storage system according to claim 1, wherein when data transmission from an interface unit to the memory unit is required, the processor unit transmits control data to the interface unit, and the data is transmitted from the interface unit to the memory unit according to the control data received from the processor unit.

4. A storage system according to claim 3,
wherein the data is transmitted from the interface unit to the memory unit without being transmitted via the processor unit.

5. A storage system according to claim 1, further comprising:
a switch unit, wherein each of the interface units, the memory unit, and the processor unit is mounted on a different circuit board, and the circuit boards are interconnected by a switch unit.

6. A storage system according to claim 5,
wherein a circuit board, on which an interface unit is mounted, a circuit board, on which the processor unit is mounted, and a circuit board, on which the memory unit is mounted, are added to the storage system independently of each other.

7. A storage system according to claim 1,
wherein the DMA controller controls multiplex communication transfer protocol to perform multiplex communication during one DMA sub-transfer.

8. A storage system according to claim 1,
wherein a DMA transfer is a connection-less type communication in which a DMA transferred between a first DMA and a second DMA shares the same path as a DMA transferred between a third DMA and a fourth DMA.

9. A storage system according to claim 1,
wherein before receiving an acknowledgment that a first DMA transfer has been completed, a second DMA transfer is commenced.

* * * * *